US012629810B1

(12) United States Patent
Steer

(10) Patent No.: US 12,629,810 B1
(45) Date of Patent: May 19, 2026

(54) PORTABLE SYSTEMS AND METHODS FOR MANIPULATING AN OBJECT

(71) Applicant: David Steer, St. Albert (CA)

(72) Inventor: David Steer, St. Albert (CA)

( * ) Notice: Subject to any disclaimer, the term of this patent is extended or adjusted under 35 U.S.C. 154(b) by 0 days.

(21) Appl. No.: 19/271,887

(22) Filed: Jul. 17, 2025

(51) Int. Cl.
*B25F 1/02* (2006.01)

(52) U.S. Cl.
CPC .................................... *B25F 1/02* (2013.01)

(58) Field of Classification Search
CPC ........................................................ B25F 1/02
See application file for complete search history.

(56) References Cited

U.S. PATENT DOCUMENTS

| | | | | |
|---|---|---|---|---|
| 2,772,004 | A | 11/1956 | Noble | |
| 3,759,336 | A * | 9/1973 | Marcovitz | B25F 3/00 408/20 |
| 6,592,134 | B2 | 7/2003 | Abraham | |
| 6,758,291 | B1 | 7/2004 | Koch | |
| 7,374,390 | B2 | 5/2008 | Strong | |
| 7,681,847 | B2 | 3/2010 | Levin | |
| 8,573,334 | B2 | 11/2013 | Smith et al. | |
| 9,232,855 | B2 | 1/2016 | Ergun et al. | |
| 9,421,682 | B2 * | 8/2016 | McClaskey | B25F 3/00 |
| 9,675,170 | B2 | 6/2017 | Klinke | |
| 9,776,315 | B2 * | 10/2017 | Cannaliato | B25F 5/021 |
| 9,848,696 | B2 | 12/2017 | Tseng | |
| 10,384,873 | B2 | 8/2019 | Kilibarda et al. | |
| 10,568,418 | B2 | 2/2020 | Applegate et al. | |
| 10,758,039 | B2 | 9/2020 | Allen et al. | |
| 11,214,469 | B2 | 1/2022 | West et al. | |
| 11,412,845 | B2 | 8/2022 | Knapp et al. | |
| 11,612,238 | B2 | 3/2023 | Schaerer et al. | |
| 11,787,674 | B2 | 10/2023 | Borofka et al. | |
| 12,082,694 | B2 | 9/2024 | Hoeglund | |
| 12,096,841 | B2 | 9/2024 | Hamon | |
| 2009/0057636 | A1 | 3/2009 | Flagg et al. | |
| 2016/0099606 | A1 * | 4/2016 | Zhang | H02J 7/0045 320/108 |
| 2019/0217459 | A1 * | 7/2019 | Gregorich | B23D 51/16 |
| 2023/0234206 | A1 * | 7/2023 | Yamanaka | B25B 23/147 173/46 |

(Continued)

FOREIGN PATENT DOCUMENTS

| | | |
|---|---|---|
| DE | 20313535 | 12/2003 |
| GB | 2337037 | 11/1999 |
| KR | 102659401 | 4/2024 |

*Primary Examiner* — Michelle Lopez
(74) *Attorney, Agent, or Firm* — Burris Law, PLLC

(57) ABSTRACT

A system and a method for manipulating a position of an object includes at least one drive device system. The drive device system includes a housing, and an electric motor. The drive device system includes a coupler exposed to an exterior portion of the housing, and a drive mechanism coupled to the electric motor. The drive device system includes a controller in communication with the electric motor, and a communication system. The system includes at least one receiver to be coupled to the object and the receiver includes a receiver coupler to receive the coupler of the drive device system to manipulate the position of the object. The receiver includes a receiver communication system to communicate data associated with the receiver or the object. The system includes a master controller to communicate with the drive device system.

20 Claims, 62 Drawing Sheets

(56) References Cited

U.S. PATENT DOCUMENTS

| | | | | |
|---|---|---|---|---|
| 2023/0356644 | A1 | 11/2023 | Weskamp | |
| 2024/0008635 | A1 | 1/2024 | Rong | |
| 2024/0057762 | A1 | 2/2024 | Hoeglund | |
| 2024/0213812 | A1 * | 6/2024 | Kuter-Arnebeck | ... H02J 50/005 |
| 2024/0294104 | A1 | 9/2024 | Iriarte | |
| 2024/0359310 | A1 | 10/2024 | Liverman et al. | |

* cited by examiner

PORTABLE SYSTEMS AND METHODS FOR MANIPULATING AN OBJECT

FIELD

The present disclosure generally relates to portable systems and methods for manipulating an object, and more particularly relates to portable systems and methods for manipulating a position of an object.

BACKGROUND

The statements in this section merely provide background information related to the present disclosure and may not constitute prior art.

It may be desirable to move a stationary object, such as a chair, desk, cart or the like from one position to another or to lift the stationary object from one position to another vertical position. Depending upon the size or weight of the stationary object or other limitations, it may be difficult for an individual to move or raise the object without requiring assistance.

The present disclosure addresses these issues related to the manipulation of an object, and the manipulation of a position of an object.

SUMMARY

This section provides a general summary of the disclosure and is not a comprehensive disclosure of its full scope or all of its features.

According to various embodiments, provided is a system for manipulating a position of an object. The system includes at least one drive device system. The at least one drive device system includes a housing, and an electric motor disposed within the housing. The at least one drive device system includes a coupler exposed to an exterior portion of the housing, and a drive mechanism coupled to the electric motor. The at least one drive device system includes a controller disposed within the housing and in communication with the electric motor, and a communication system in communication with the controller. The system includes at least one receiver configured to be mounted to the object. The at least one receiver includes a receiver coupler configured to receive the coupler of the at least one drive device system, and a receiver communication system configured to communicate with the communication system of the at least one drive device system. The receiver communication system is configured to communicate data associated with the at least one receiver or the object. The system includes a master controller configured to communicate with the at least one drive device system to manipulate the position of the object.

The at least one drive device system comprises a wireless power source disposed within the housing and configured to power the electric motor. The wireless power source is selected from the group consisting of a battery, a vibrational generator, a thermal power generator, and a storage component. The system includes a wired power receiver coupled to the electric motor, and the wired power receiver is configured to receive electrical power from an external power supply. The system further comprises mechanical latches disposed within the housing of the at least one drive device system, and the mechanical latches are configured to engage with the receiver coupler. The system includes an induction charging pad disposed proximate an exterior portion of the housing of the at least one drive device system. The system includes at least one second drive device system, and the at least one second drive device system includes a second housing, a second coupler exposed to an exterior portion of the second housing and a second drive mechanism extending at least partially into the second coupler, and the at least one second drive device system is configured to be coupled to the at least one drive device system via the coupler and the drive mechanism. The second drive mechanism is configured to be operated manually. The system includes a plurality of the at least one second drive device systems arranged in a stack and configured to be coupled together via the respective couplers and the second drive mechanisms of each of the plurality of the at least one second drive device systems. The includes at least one Ethernet connector disposed within and exposed through an exterior surface of the housing. The housing is hermetically sealed. The system includes one of a display or a graphical user interface disposed on an exterior surface of the housing, the display or graphical user interface communicatively coupled to the controller. The coupler defines a non-circular geometry. The system includes at least one illumination system coupled to the housing, and the at least one illumination system is in communication with the controller. The system includes at least one imaging system coupled to the housing, and the at least one imaging system is in communication with the controller. The system includes at least one status light coupled to the housing, and the at least one status light is in communication with the controller. The system includes a plurality of the at least one drive device system, and the plurality of the at least one drive device systems is communicatively coupled to each other. The at least one receiver comprises at least one wheel configured to be coupled to at least one drive module, and the at least one drive device system and the at least one wheel is configured to manipulate the position of the object. The at least one wheel is rotationally mounted to a shaft such that the at least one wheel is configured to swivel. The drive mechanism extends at least partially into the coupler.

Also provided is a system for manipulating a position of an object that includes at least one drive device system. The at least one drive device system includes a housing and an electric motor disposed within the housing. The at least one drive device system includes a coupler exposed to an exterior portion of the housing and a drive mechanism coupled to the electric motor. The at least one drive device system includes a controller disposed within the housing and in communication with the electric motor and a communication system in communication with the controller. The system includes at least one receiver configured to be coupled to the object. The at least one receiver includes a receiver coupler configured to receive the coupler of the at least one drive device system to manipulate the position of the object and a receiver communication system configured to communicate with the communication system of the at least one drive device system. The receiver communication system configured to communicate data associated with the at least one receiver or the object.

Further provided is a system for manipulating a position of an object that includes at least one drive device system. The at least one drive device system includes a housing and an electric motor disposed within the housing. The at least one drive device system includes a coupler exposed to an exterior portion of the housing, and the coupler has a non-circular geometry. The at least one drive device system includes a drive mechanism coupled to the electric motor. The drive mechanism is coupled to the coupler. The at least one drive device system includes a controller disposed within the housing and in communication with the electric motor and a communication system in communication with the controller. The at least one drive device system includes a human-machine interface coupled to the housing and in communication with the controller. The system includes at least one receiver configured to be coupled to the object. The at least one receiver includes a receiver coupler configured to receive at least a portion of the coupler of the at least one drive device system to manipulate the position of the object.

Also provided is a method for manipulating a position of an object. The method includes providing the object with a receiver having a receiver coupler configured to receive a coupler of at least one drive device system. The receiver coupler includes a receiver communication system configured to communicate data associated with the receiver or the object. The method includes coupling at least one drive device system to the receiver coupler with the coupler. The at least one drive device system includes an electric motor disposed within a housing, a drive mechanism coupled to the electric motor, a controller disposed within the housing and in communication with the electric motor, and a communication system in communication with the controller and configured to communicate with the receiver communication system. The method includes outputting one or more control signals to the motor to manipulate the position of the object based on the data associated with the receiver or the object.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
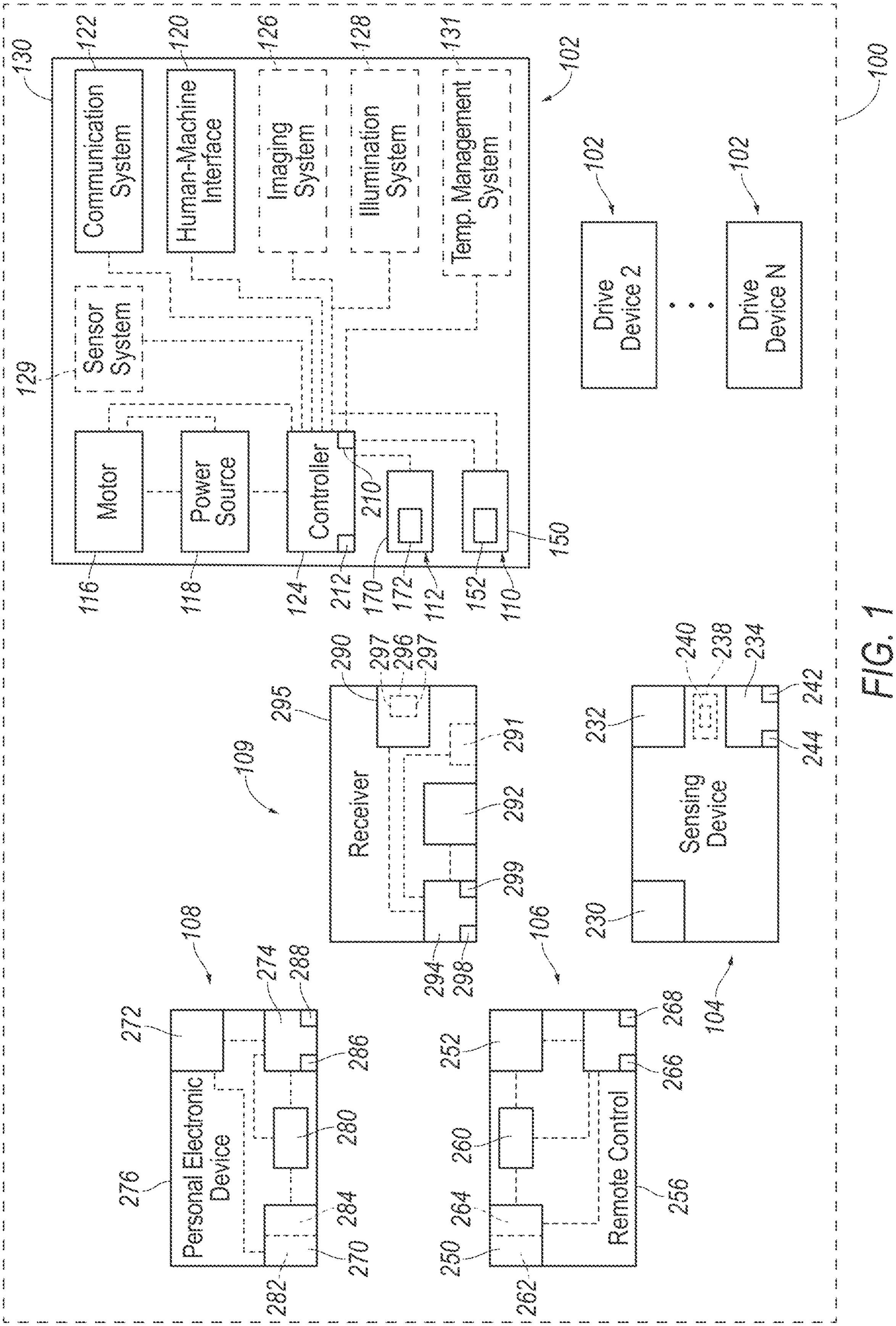
FIG. 1 is a functional block diagram of a system for manipulating a position of an object in accordance with the various teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. Furthermore, there is no intention to be bound by any expressed or implied theory presented in the preceding technical field, background, brief summary or the following detailed description.

With reference to FIG. 1, a portable system 100 for manipulating an object according to the teachings of the present disclosure is shown. In one example, the portable system 100 includes at least one or more drive device systems 102, a sensing device 104, a remote control 106, a personal electronic device 108 and a receiver 109. In certain instances, the sensing device 104, the remote control 106 and the receiver 109 may be optional. As will be discussed, each of the drive device systems 102 is substantially the same or the same and may be used individually or coupled together to manipulate the object. Generally, the drive device systems 102 are responsive to one or more control signals from the remote control 106 and/or the personal electronic device 108 to manipulate the object, such as a position of an object. As used herein an “object” includes, but is not limited to, a skateboard, a bicycle, a scooter, a walker, a stroller, a cart, a drill bit, a wheelchair, a wheelbarrow, a lawnmower, a snowblower, a cooler, a golf bag, a golf cart, a chair, a table, a desk, a workbench, a bed, a dolly, a camera crane, a camera tripod, a ladder, microphone stand, a pole, an appliance, a winch, a power tool, a fishing rod, a generator, a car jack, a robot, an outboard motor, a shipping container, a recreational vehicle, a tracked vehicle, etc. In certain instances, the receiver 109 may be coupled to the object and may be configured to communicate information regarding the object to the drive device system 102, the remote control 106 and/or the personal electronic device 108. The drive device system 102 may be used with or without the receiver 109 to move or manipulate the position of the object. Given the compact size of the drive device system 102, a user may easily connect the drive device system 102 and the receiver 109, if employed, to the object to manipulate the position of the object without requiring assistance. This enables a user to use the drive device system 102 to manipulate the position of heavy, awkward and/or cumbersome objects without requiring the user seek additional assistance.

Figure 2:
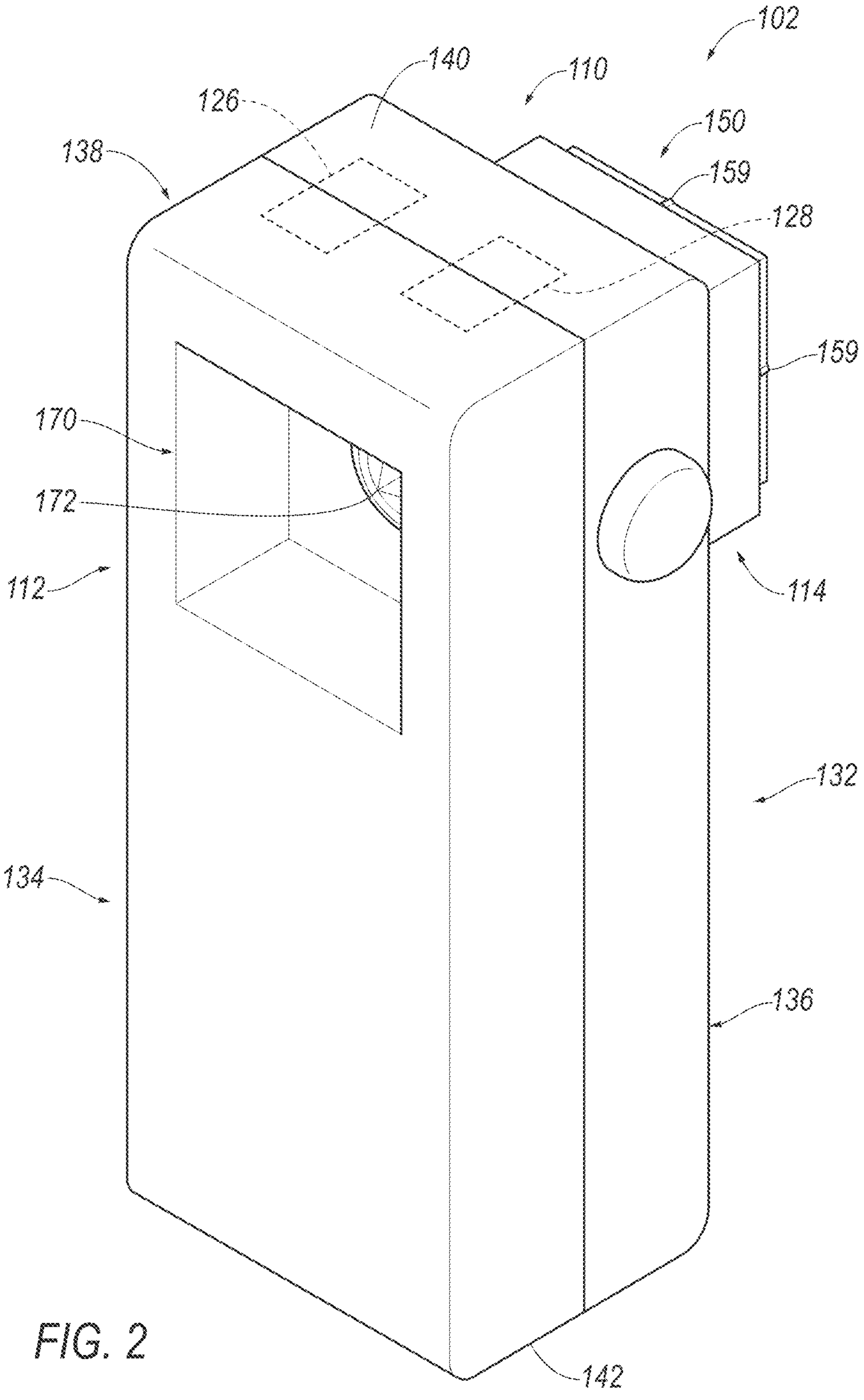
FIG. 2 is a perspective view of a drive device system for use with the system of FIG. 1.

In one example, with additional reference to FIG. 2, each of the drive device systems 102 includes a first, drive coupler 110 (FIG. 2), a second, driven coupler 112 (FIG. 2), a release system 114 (FIG. 2), a motor 116, a power source 118, a human-machine interface 120, a communication system 122 and a controller 124. Optionally, each of the drive device systems 102 may also include an imaging system 126, an illumination system 128 and a sensor system 129. In certain instances, the drive device system 102 may also include a temperature management system 131. At least a portion of the motor 116, the power source 118, the human-machine interface 120, the communication system 122, the controller 124, the imaging system 126, the illumination system 128, the sensor system 129 and the temperature management system 131 may be disposed within a housing 130 (FIG. 2) associated with the drive device system 102.

In one example, with reference to FIG. 2, one of the drive device systems 102 is shown. In this example, the housing 130 is substantially rectangular, however, the housing 130 may have any desired shape. Generally, the housing 130 may be composed of a polymer-based material, however, the housing 130 may also be composed of a metal or metal alloy. The housing 130 includes a first side 132 opposite a second side 134, a third side 136 opposite a fourth side 138, and a first end 140 opposite a second end 142. Each of the first side 132, the second side 134, the third side 136, the fourth side 138, the first end 140 and the second end 142 are substantially smooth, flat or planar, and may include beveled or rounded corners and edges. It should be noted that one or more of the first side 132, the second side 134, the third side 136, the fourth side 138, the first end 140 and the second end 142 may include a texture, such as knurling or the like, to facilitate grasping of the drive device system 102 by a user.

Figure 7A:
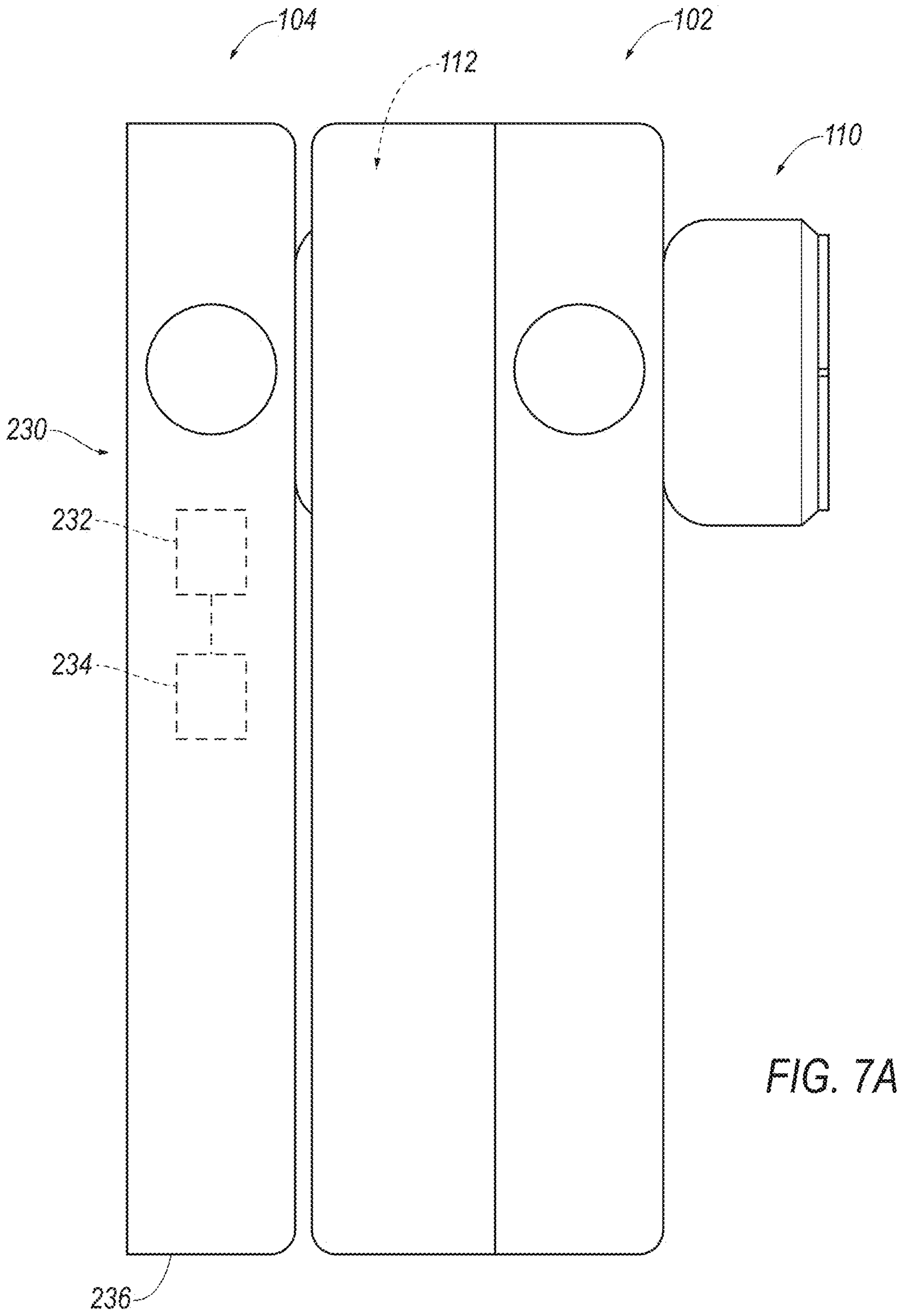
FIG. 7A is a side view of one of the drive device systems of FIG. 2 coupled to an exemplary sensing device.

In one example, the drive coupler 110 is coupled to the first side 132, and the driven coupler 112 is coupled to the second side 134. Thus, generally, the drive coupler 110 is positioned on the drive device system 102 so as to be opposite the driven coupler 112. As will be described, this may facilitate a transfer of torque and/or power from one of the drive device systems 102 to another one of the drive device systems 102 and/or the sensing device 104 when coupled together (FIG. 7A).

The release system 114 is coupled to the drive device system 102 such that at least a portion of the release system 114 is movable relative to each of the third side 136 and the fourth side 138. Generally, the release system 114 is on opposite sides of the drive device system 102, and the release system 114 is generally coupled to the housing 130 so as to be opposite the drive coupler 110 and the driven coupler 112 to permit access to the release system 114 while the drive device system 102 is coupled to another one of the drive device systems 102, the sensing device 104, the receiver 109 and/or an object.

In one example, the imaging system 126 may be coupled to the first end 140 to provide the imaging system 126 with a field of view in front of the drive device system 102 when the drive device system 102 is coupled to another one of the drive device systems 102, the sensing device 104, the receiver 109 and/or an object. The illumination system 128 may be coupled to the first end 140 so as to be visible when the drive device system 102 is coupled to another one of the drive device systems 102, the sensing device 104, the receiver 109 and/or an object. It should be noted, however, that the imaging system 126 and/or the illumination system 128 may be coupled to any one of the first side 132, the second side 134, the third side 136, the fourth side 138, the first end 140 and the second end 142. Further, in certain instances, the illumination system 128 may be coupled to more than one of the first side 132, the second side 134, the third side 136, the fourth side 138, the first end 140 and the second end 142.

Figure 3:
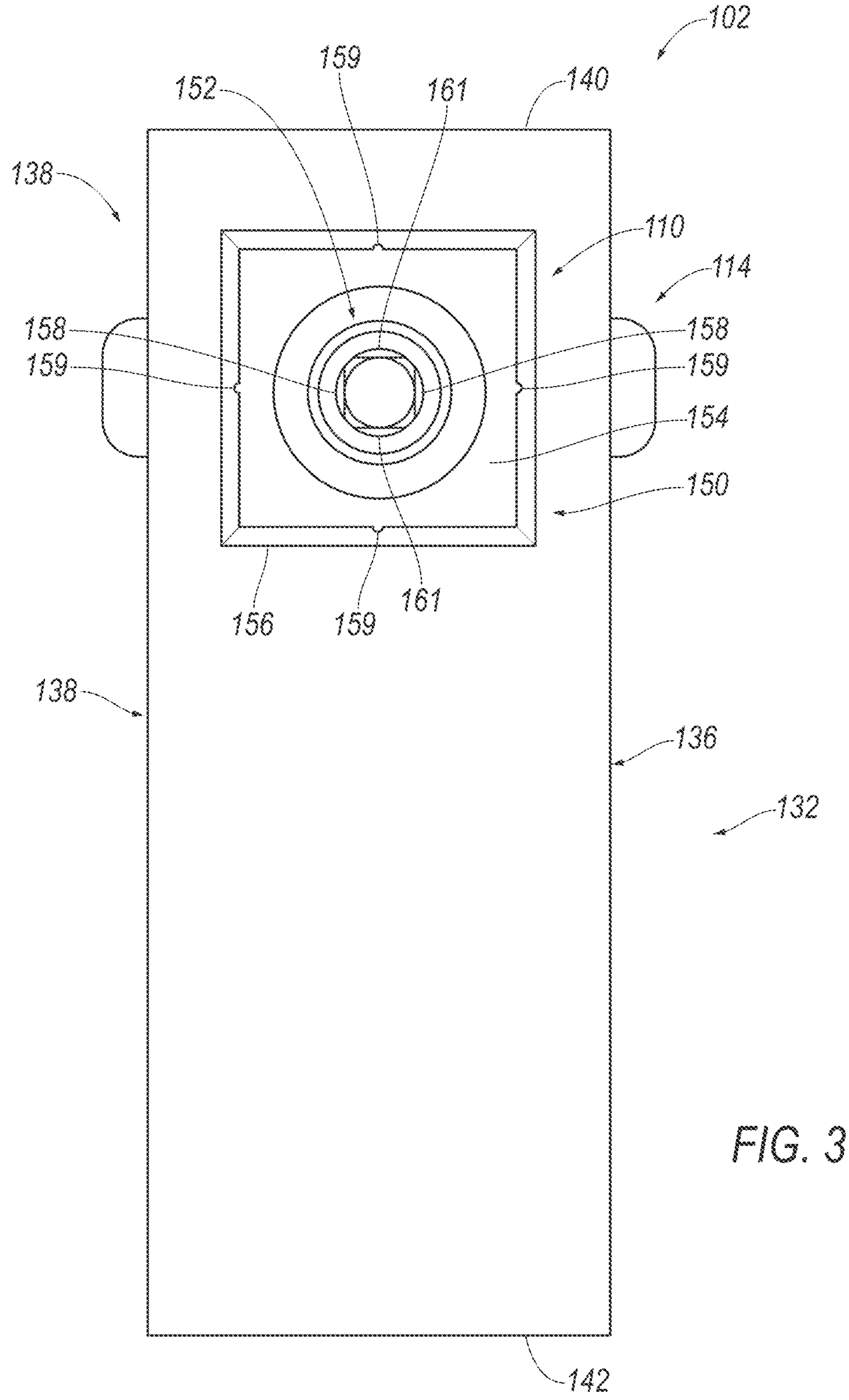
FIG. 3 is a front view of the drive device system of FIG. 2.
Figure 4:
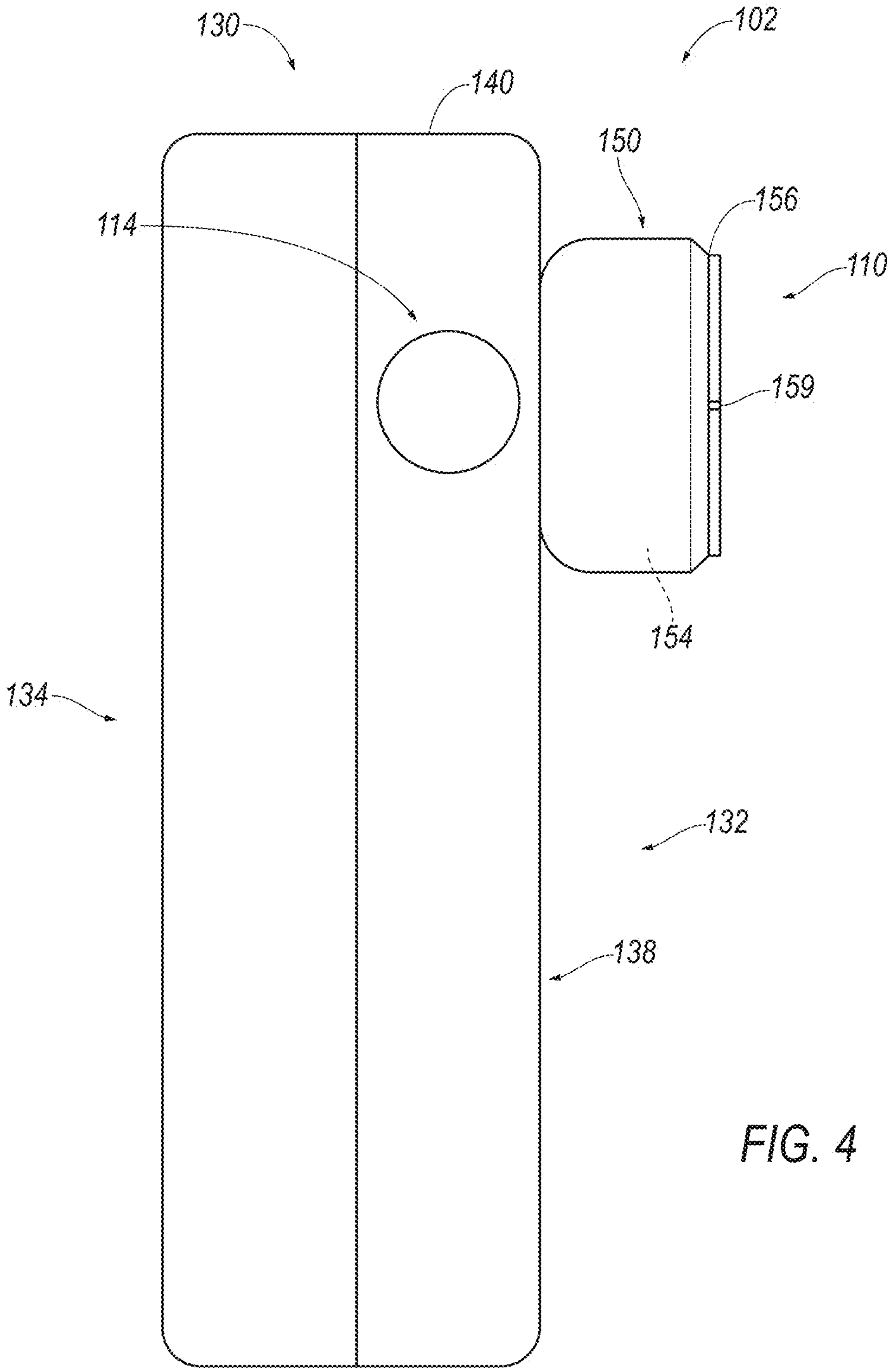
FIG. 4 is a side view of the drive device system of FIG. 2.

With reference to FIG. 3, the drive coupler 110 includes a head 150 and a drive mechanism or drive terminal connector 152. The head 150 extends outwardly from the first side 132 so as to be exposed on an exterior surface or portion of the housing 130. In one example, the head 150 is coupled to the housing 130 so as to project outwardly from the first side 132 as shown in FIG. 4. The head 150 is non-circular or has a non-circular geometry so as to inhibit rotation of the drive device system 102 when coupled to another one of the drive device systems 102, the receiver 109 or an object. In one example, with reference back to FIG. 3, the head 150 is substantially rectangular or square, but the head 150 may have any desired non-circular polygonal shape. The head 150 extends outwardly from the first side 132 to define a drive receptacle 154. The drive receptacle 154 surrounds the drive terminal connector 152 and permits another one of the drive device systems 102, the receiver 109 or an object to be coupled to the drive terminal connector 152. The head 150 may include a lip 156, which is tapered. The lip 156 surrounds a perimeter of the head 150 to assist in coupling the head 150 to another one of the drive device systems 102 or the object, for example.

Figure 4A:
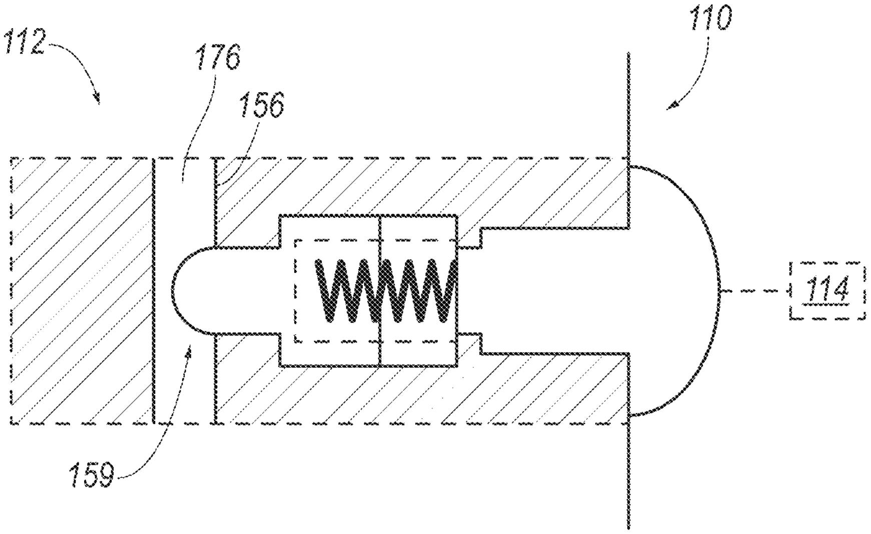
FIG. 4A is a cross-sectional view taken through a portion of a drive coupler of the drive device system of FIG. 2, which illustrates a portion of a release system in a first position.
Figure 4B:
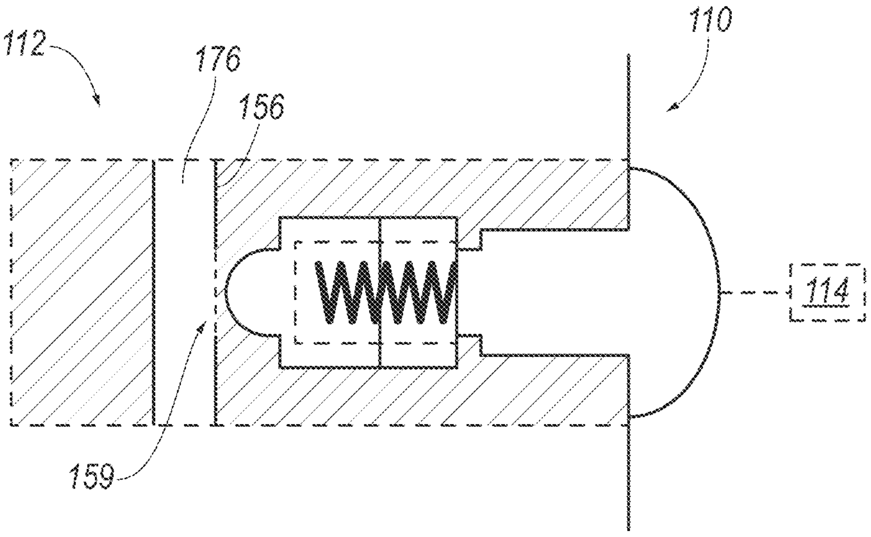
FIG. 4B is a cross-sectional view taken through a portion of a drive coupler of the drive device system of FIG. 2, which illustrates the portion of the release system in a second position.

In one example, the lip 156 includes at least one or a plurality of first detent latches 159. The first detent latches 159 are spaced apart about a perimeter of the lip 156. In this example, the drive coupler 110 includes about four of the first detent latches 159, but the drive coupler 110 may include any number of the first detent latches 159 depending upon the shape of the head 150. The first detent latches 159 are received within a corresponding one of the detent channels 176 (FIGS. 4A-4B) to couple the drive coupler 110 to the driven coupler 112, for example. The first detent latches 159 are defined in the lip 156 of the drive coupler 110 and are movable between at least a first position (FIG. 4A), in which the first detent latches 159 are received within the detent channel 176, and a second position, in which the first detent latches 159 are recessed within the perimeter of the lip 156 (FIG. 4B). It should be noted that the first detent latches 159 may be movable in various positions, and the use of the first position and the second position herein is not intended to be limiting. For example, the first detent latches 159 may have a third position that is a neutral position in which the first detent latches 159 are flush with the perimeter of the lip 156. In the first position, the first detent latches 159 assist in coupling the drive coupler 110 to another one of the drive device systems 102 or an object. In the second position, the first detent latches 159 permit the uncoupling of the one of the drive device systems 102, the receiver 109 or the object. In one example, each of the first detent latches 159 may include a respective biasing member or spring, which biases or applies a spring force to maintain the first detent latches 159 in the first position. Generally, as will be described below, the release system 114 is coupled to the first detent latches 159 and is operable to overcome the spring force to move the first detent latches 159 from the first engaged position to the second disengaged position. It should be noted that while the first detent latches 159 are described and illustrated herein as being coupled to the lip 156, in other examples, the first detent latches 159 may be disposed within the head 150 to mate with the detent channels 176.

The drive terminal connector 152 also extends outwardly from the first side 132 or an exterior surface of the housing 130. Generally, the drive terminal connector 152 may comprise a male or a female terminal connector. In one example, the drive terminal connector 152 is interchangeable from a number of suitable drive terminal connectors, including, but not limited to a socket bit, a bolt head, a socket, a Phillips head, a Robertson head, etc. The socket bit, the bolt head and the socket may be hexagonal or square in shape or may have other desired polygonal shapes. The drive device system 102 may be packaged with a predetermined selection of the drive terminal connectors 152, which may be selected by a user and coupled to the head 150 of the drive coupler 110 to be driven by the motor 116. In one example, the head 150 may include a stub shaft 151 (FIG. 6B) or the like, which is coupled to the motor 116 to be driven by the motor 116 and the drive terminal connector 152 may be coupled to the stub shaft 151. In other examples, the drive terminal connector 152 may be a preselected terminal connector, which is not interchangeable and is coupled to the motor 116 to be driven by the motor 116. For example purposes, the drawings depict the drive terminal connector 152 as a hexagonal or square socket bit, however, it should be understood that the drive terminal connector 152 may comprise any suitable male or female connector.

In this example, the drive terminal connector 152 may include at least one pair of opposed second detent balls 158. The second detent balls 158 are received within a corresponding one of a pair of recesses 160 (FIG. 6) defined in the drive terminal connector 152, and are movable between a first position, in which the second detent balls 158 extend beyond a perimeter or exterior surface of the drive terminal connector 152, and a second position, in which the second detent balls 158 are recessed within the perimeter or exterior surface of the drive terminal connector 152. In the first position, the second detent balls 158 assist in coupling the drive terminal connector 152 to another one of the drive device systems 102 or an object. In the second position, the detent balls permit the uncoupling of the one of the drive device systems 102 or the object. In one example, each of the second detent balls 158 may include a respective biasing member or spring, which biases or applies a spring force to maintain the second detent balls 158 in the first position. Generally, as will be described below, the release system 114 is coupled to the second detent balls 158 and is operable to overcome the spring force to move the second detent balls 158 from the first position to the second position. It should be noted that while the second detent balls 158 are described and illustrated herein as being coupled to the drive terminal connector 152, in other examples, the second detent balls 158 may be coupled to a driven end of a coupler, such as the driven coupler 112 of another one of the drive device systems 102 or an object.

In addition, it should be noted that the drive coupler 110 may include one of the first detent latches 159 or the second detent balls 158 and need not include both the first detent latches 159 and the second detent balls 158. For example, the drive coupler 110 may include the first detent latches 159 and the drive terminal connector 152 may be devoid of the second detent balls 158. Thus, generally, the drive coupler 110 may include any suitable feature for releasably coupling or engaging the drive coupler 110 with another one of the drive device system 102, the sensing device 104, the receiver 109 or the object.

In one example, the drive terminal connector 152 also includes communication terminals 161. The communication terminals 161 may comprise electrical or magnetic contacts, which enable the transfer of power, data, commands, etc. from the controller 124 of the drive device system 102 to the controller 124 of another one of the drive device systems 102. The communication terminals 161 may also enable communication between the receiver 109 and/or the object. For example, the communication terminals 161 may be in communication with the receiver 109 to enable data from the receiver 109 to be transmitted to the controller 124 of the drive device system 102.

Figure 5:
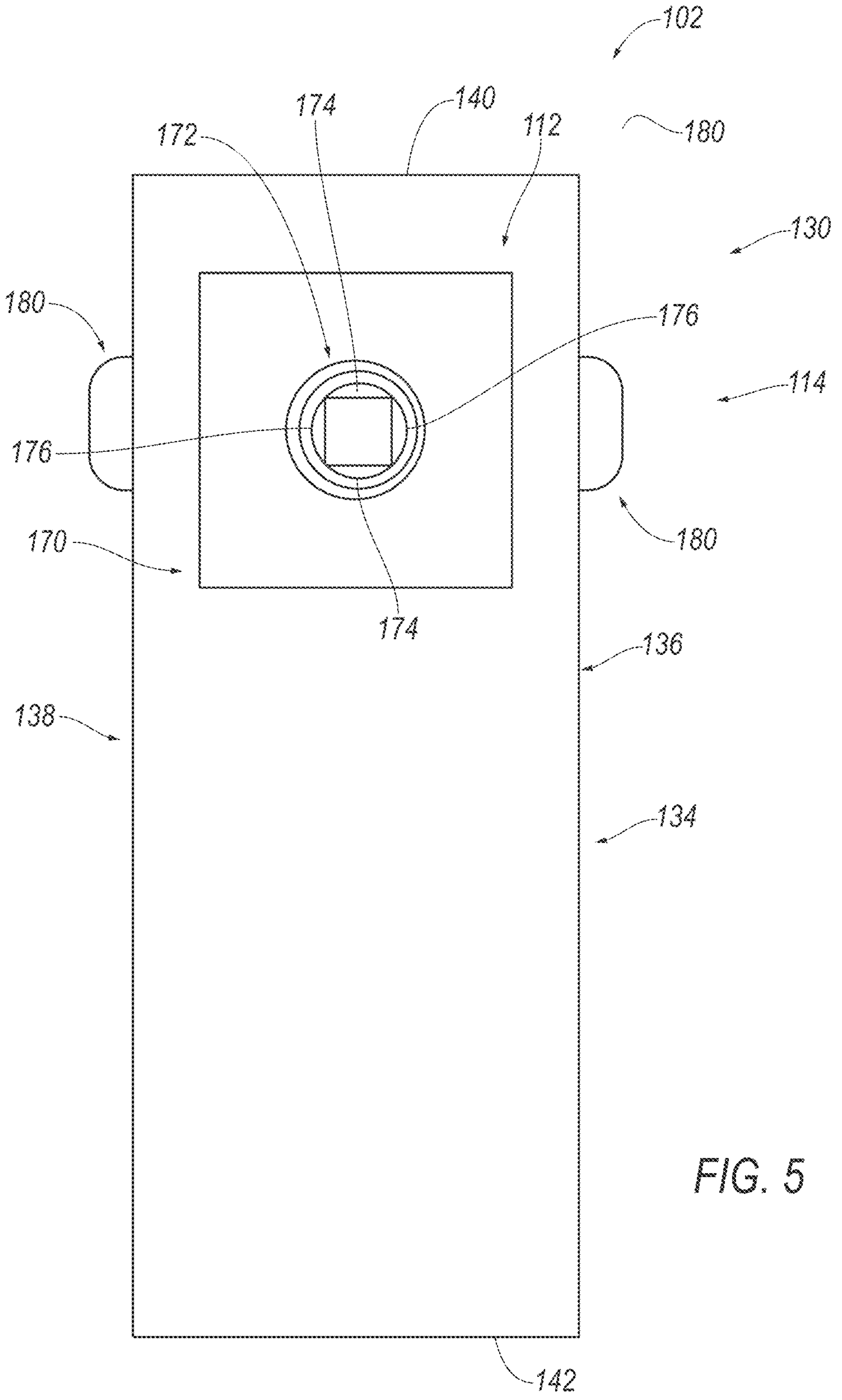
FIG. 5 is a rear view of the drive device system of FIG. 2.

With reference to FIG. 5, the driven coupler 112 includes a driven receptacle 170 and a driven terminal connector 172. The driven receptacle 170 is recessed within the second side 134 so as to be defined beneath the exterior surface or portion of the housing 130. The driven receptacle 170 is non-circular or has a non-circular geometry so as to inhibit rotation of the drive device system 102 when coupled to another one of the drive device systems 102 or the sensing device 104. In one example, the driven receptacle 170 is substantially rectangular or square, but the driven receptacle 170 may have any desired non-circular polygonal shape. The driven receptacle 170 surrounds the driven terminal connector 172 and permits another one of the drive device systems 102 or the sensing device 104 to be coupled to the driven terminal connector 172.

In one example, the driven terminal connector 172 is surrounded by the driven receptacle 170 and extends outwardly within the driven receptacle 170. Generally, the driven terminal connector 172 may comprise a female or a male terminal connector. In one example, the driven terminal connector 172 is interchangeable from a number of suitable driven terminal connectors, including, but not limited to a socket bit, a bolt head, a socket, a Phillips head, a Robertson head, etc. The socket bit, the bolt head and the socket may be hexagonal or square in shape or may have other desired polygonal shapes. The drive device system 102 may be packaged with a predetermined selection of the driven terminal connectors 172, which may be selected by a user and coupled to the driven receptacle 170 of the driven coupler 112 to be driven. In one example, the driven receptacle 170 may include the stub shaft 151 or the like, which is drivable and the driven terminal connector 172 may be coupled to the stub shaft 151. In other examples, the driven terminal connector 172 may be a preselected terminal connector, which is not interchangeable. For example purposes, the drawings depict the driven terminal connector 172 as a hexagonal or square socket, however, it should be understood that the driven terminal connector 172 may comprise any suitable male or female connector. It should be noted that while the drive terminal connector 152 is illustrated herein as comprising a male terminal connector and the driven terminal connector 172 is illustrated herein as comprising a female terminal connector, both the drive terminal connector 152 and the driven terminal connector 172 may comprise the same type of terminal connector (female or male), and thus, the drive terminal connector 152 and the driven terminal connector 172 shown herein is merely an example.

The driven terminal connector 172 may also enable a manual operation, via a wrench or the like, of the drive terminal connector 152. The driven terminal connector 172 may also include communication terminals 174. The communication terminals 174 may comprise electrical or magnetic contacts, which enable the transfer of power, data, commands, etc. from another one of the drive device systems 102 or the sensing device 104 to the controller 124 of the drive device system 102. In addition, the driven terminal connector 172 may also include detent channels 176. The detent channels 176 may comprise channels, grooves or recesses defined in the driven terminal connector 172 that receive a respective one of the second detent balls 158 when coupled to another one of the drive device systems 102 or the sensing device 104.

In one example, the release system 114 is coupled to the third side 136 and the fourth side 138. The release system 114 is manipulatable by the user to release the drive device system 102 from another one of the drive device systems 102, the receiver 109 or an object. In one example, the release system 114 includes a pair of release buttons 180 and a plurality of links 182. The release buttons 180 extend outwardly from a respective one of the third side 136 and the fourth side 138 and are substantially circular. It should be noted, however, that the release buttons 180 may have any desired shape. Moreover, the release system 114 need not include a pair of the release buttons 180, but may include a single release button or other release feature, such as a tab, lever, etc. Moreover, in certain instances, the release of the drive device system 102 from another one of the drive device systems 102 or an object may be accomplished by an input received to one of the remote control 106 and/or personal electronic device 108.

In this example, the release buttons 180 are movable relative to the housing 130 to move the detent balls 158 via a pair of the links 182 from the first position to the second position and to move the first detent latches 159 via a second pair of the links 182 from the first position to the second position. In one example, a respective one of the links 182 is coupled to a respective one of the detent balls 158 and a respective one of the release buttons 180; and a respective one of the first detent latches 159 and a respective one of the release buttons 180. A depression or movement of the respective release button 180 toward the housing 130 causes the respective link 182 to move inward, which in turn, pulls the respective one of the detent balls 158 and the first detent latches 159 inward, against the force of the spring, such that the respective detent ball 158 and first detent latch 159 is recessed or in the second position. It should be noted that the use of the links 182 is merely an example, as the second detent balls 158 and/or the first detent latches 159 may be electrically controlled and movable via a solenoid or the like, for example.

Figure 6:
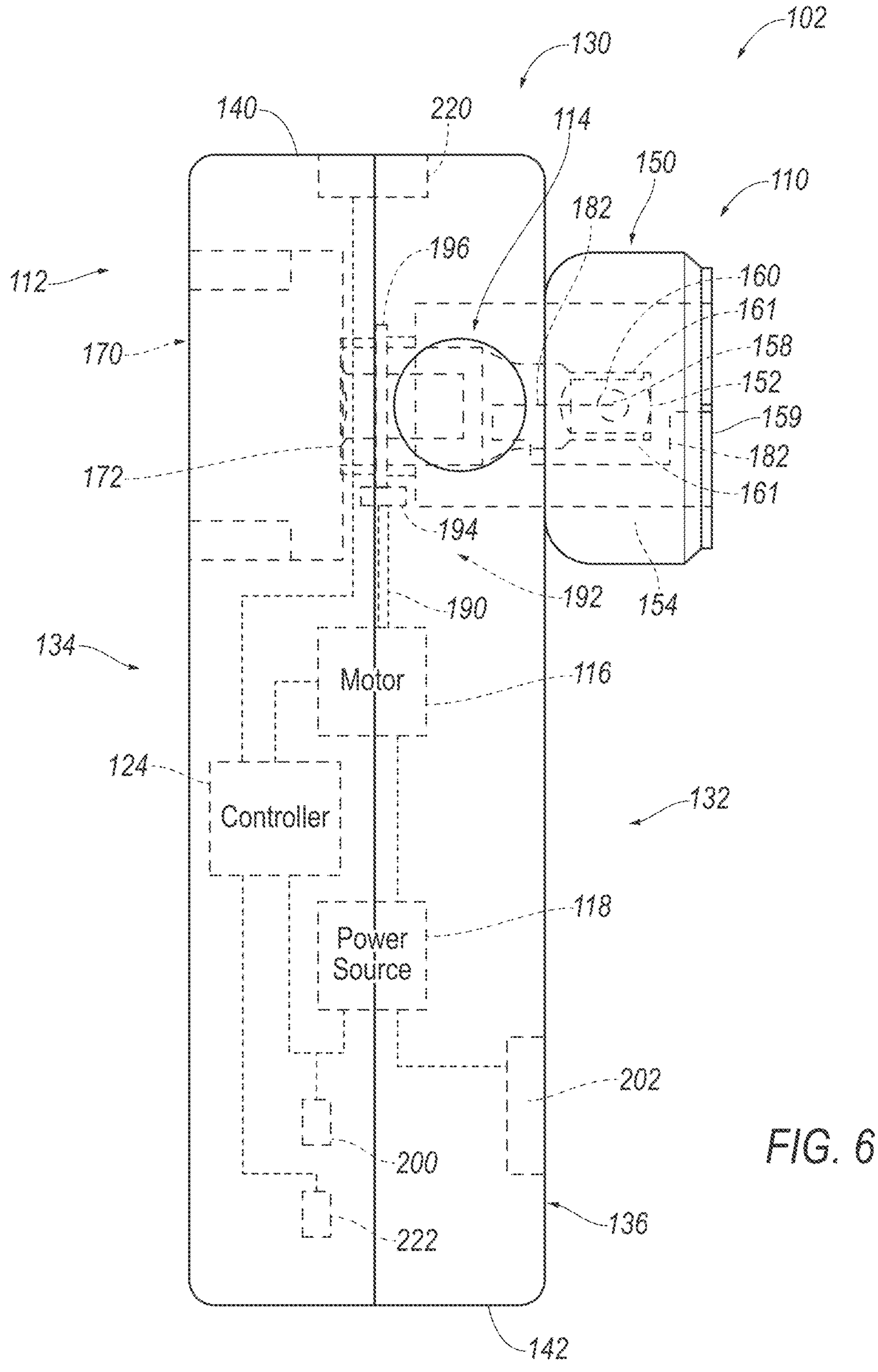
FIG. 6 is a side view of the drive device system of FIG. 2, in which internal components are illustrated in hidden lines.
Figure 6B:
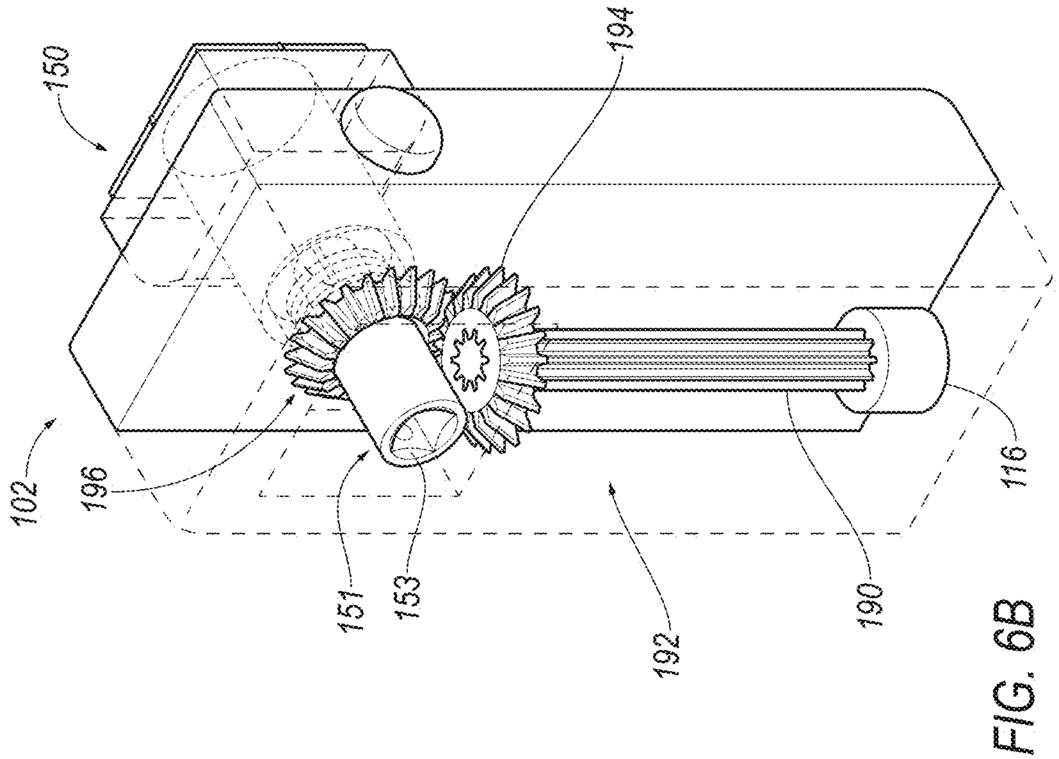
FIG. 6B is a perspective view of the drive device system of FIG. 2, which illustrates the stub shaft coupled to the drive device system and in which a portion of a housing is illustrated in hidden lines.
Figure 6A:
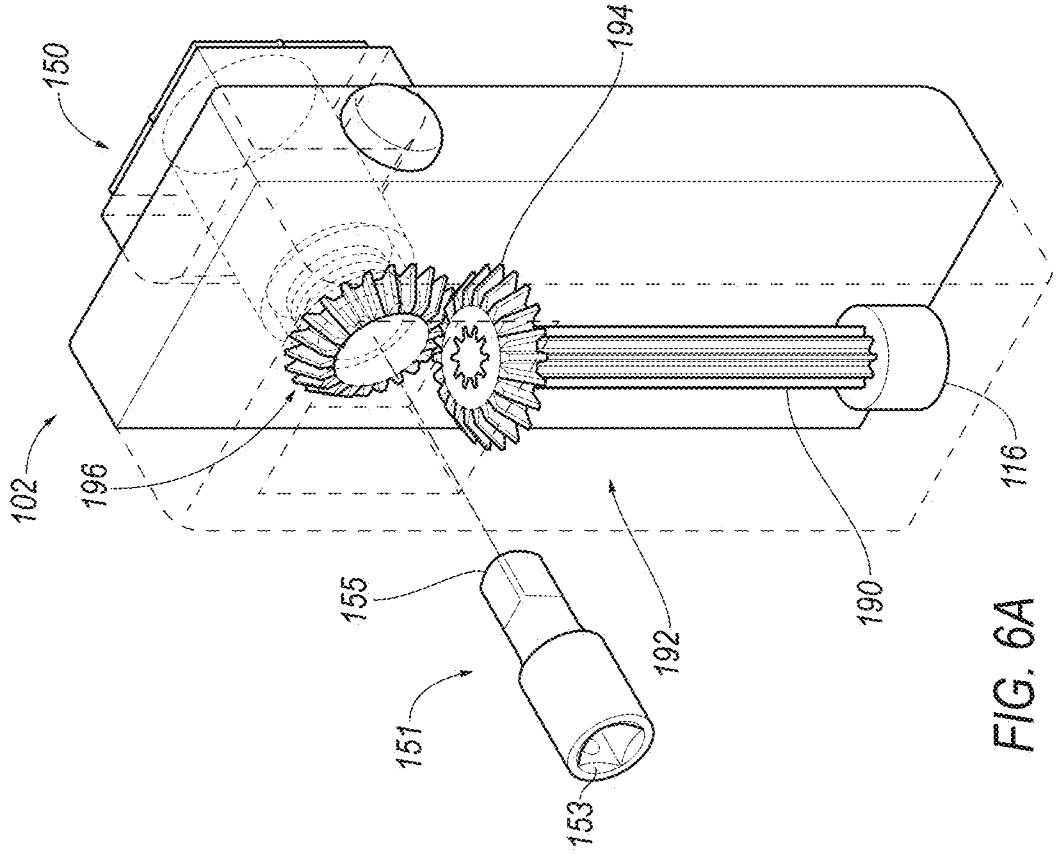
FIG. 6A is a perspective view of the drive device system of FIG. 2, which illustrates an example stub shaft for use with a motor of the drive device system exploded from the drive device system and in which a portion of a housing is illustrated in hidden lines.

With reference to FIG. 6, the motor 116 is enclosed within the housing 130. In one example, the motor 116 is an electric motor, which may receive current from the power source 118 based on one or more control signals from the controller 124. The motor 116 may be operable in one or a plurality of output modes or modes of operation, including, but not limited to a regular output mode, a hammer output mode, a synchronized output mode, etc. Thus, generally, the motor 116 is in communication with the power source 118 and the controller 124. The motor 116 includes an output shaft 190, which is coupled to the drive terminal connector 152. In one example, with reference to FIG. 6A, the output shaft 190 is coupled to the drive terminal connector 152 via a gear set 192. For example, the output shaft 190 may include a drive gear 194 at a terminal end, which meshingly engages with a driven gear 196. The driven gear 196 is coupled to the stub shaft 151, and the stub shaft 151 is coupled to the drive terminal connector 152 and the driven terminal connector 172. The drive gear 194 and the driven gear 196 may comprise bevel gears.

In one example, the stub shaft 151 includes a first, female end 153 and a second, male end 155. The female end 153 may comprise a socket and the male end 155 may comprise a socket bit. The stub shaft 151 is coupled to the driven gear 196 such that the female end 153 is coupled to the driven terminal connector 172 and the male end 155 is coupled to the drive terminal connector 152. In this example, with reference to FIG. 6B, the stub shaft 151 is coupled to the driven gear 196 so as to be received within the driven gear 196 to rotate with the driven gear 196.

Figure 6D:
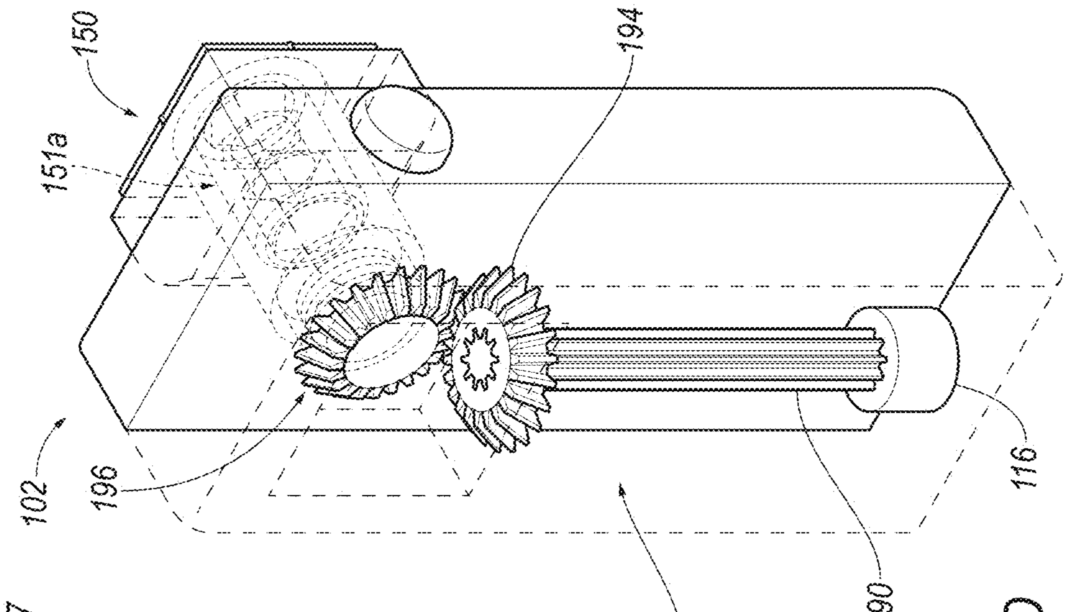
FIG. 6D is a perspective view of the drive device system of FIG. 2, which illustrates the stub shaft coupled to the drive device system and in which a portion of a housing is illustrated in hidden lines.
Figure 6C:
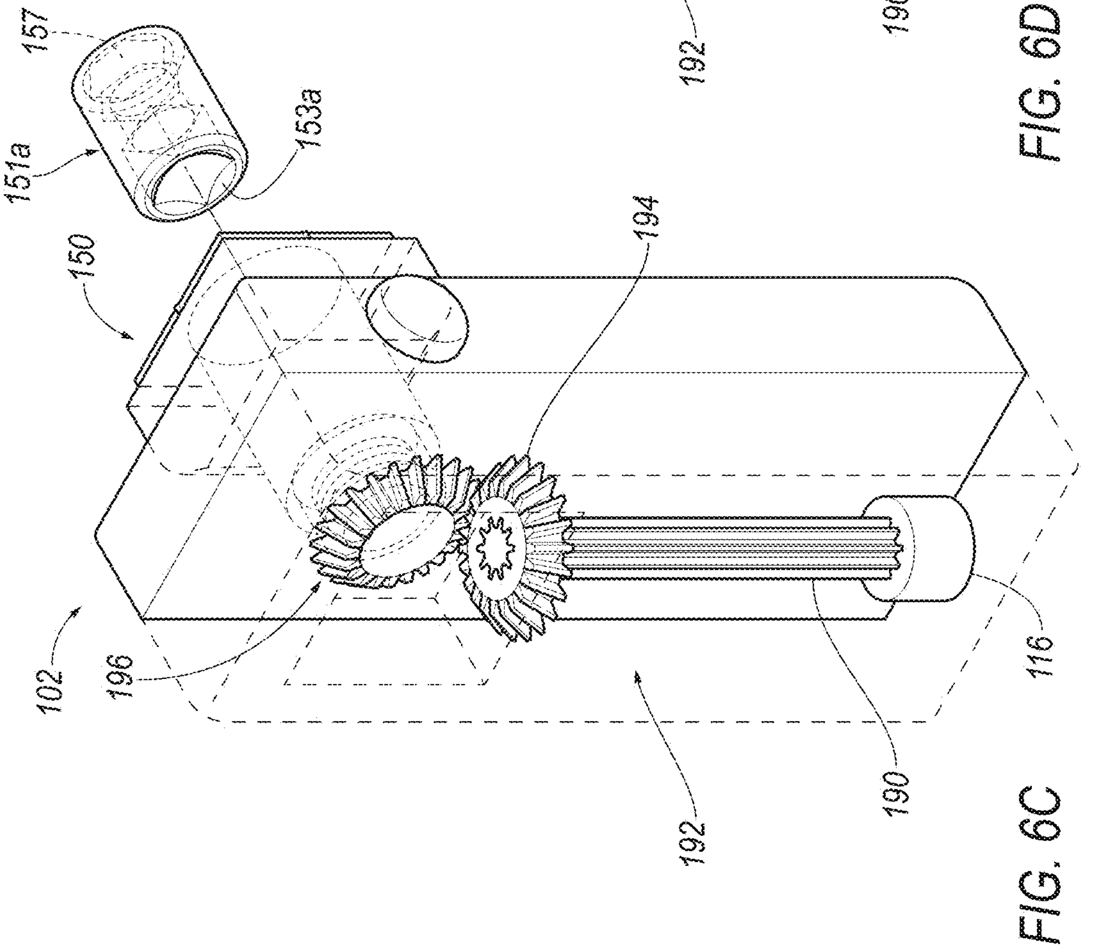
FIG. 6C is a perspective view of the drive device system of FIG. 2, which illustrates another example stub shaft for use with a motor of the drive device system exploded from the drive device system and in which a portion of a housing is illustrated in hidden lines.

It should be noted that in other examples, the stub shaft may be configured differently. For example, with reference to FIG. 6C, a stub shaft 151*a* is shown. The stub shaft 151*a* includes a first, female end 153*a* and a second, female end 157. The stub shaft 151*a* is coupled to the driven gear 196 such that the female end 153*a* is coupled to the driven terminal connector 172 and the female end 157 is coupled to the drive terminal connector 152. In this example, with reference to FIG. 6D, the stub shaft 151*a* is coupled to the driven gear 196 so as to be received within the driven gear 196 to rotate with the driven gear 196.

Figure 6E:
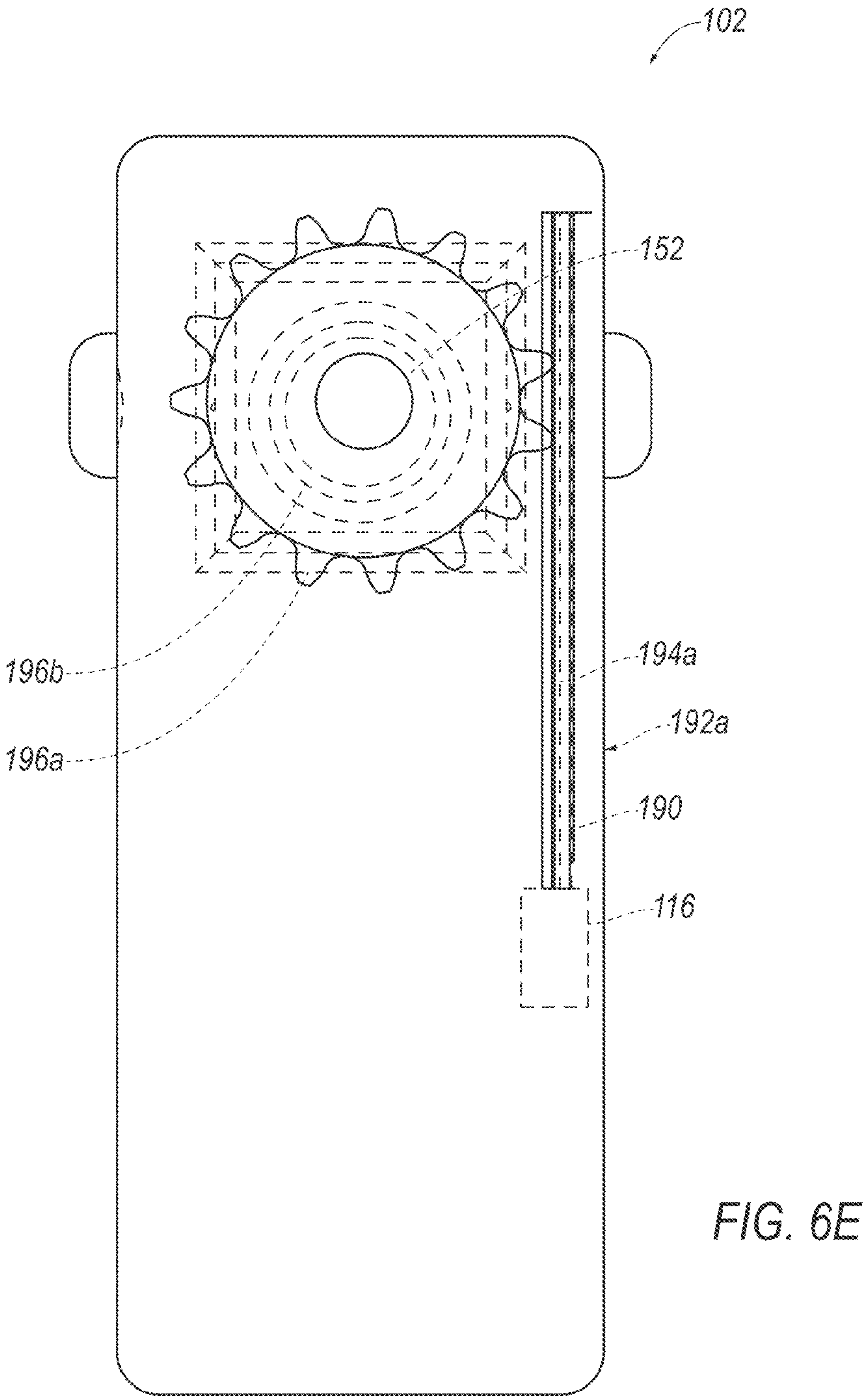
FIG. 6E is a front view of the drive device system of FIG. 2, in which internal components are illustrated in hidden lines.

It should be noted that other gear arrangements or drive arrangements may be employed to transfer torque from the output shaft 190 of the motor 116 to the drive terminal connector 152, including, but not limited to a planetary gear set, a flexible drive shaft, etc. For example, with reference to FIG. 6E, the output shaft 190 of the motor 116 may be coupled to the drive terminal connector 152 via a gear set 192*a*. In one example, the gear set 192*a* may include a drive gear 194*a*, which in one example, comprises a worm gear defined on the output shaft 190. The drive gear 194*a* meshingly engages with a pair of driven gears 196*a*, 196*b* coupled to the drive terminal connector 152. In one example, the driven gear 196*a* comprises a pinion gear, which meshingly engages with the drive gear 194*a*. The driven gear 196*a* meshingly engages with the driven gear 196*b*, which comprises a ring gear. The stub shaft 151 is coupled to the driven gear 196*b* and is driven by the driven gear 196*b*.

In addition, it should be noted that the output shaft 190 of one of the motors 116 can mate with or be coupled to a multi-axle receiver or transmission such that the use of one of the motor 116 results in multiple wheel drive. Generally, the motor 116 may rotate the output shaft 190 in either a clockwise or a counterclockwise direction based on one or more control signals received from the controller 124.

In one example, the power source 118 is disposed within the housing 130. The power source 118 comprises any suitable source of current for the motor 116, including, but not limited to a battery, a vibrational generator, a thermal power generator, a storage component, a solar powered battery, or the like. An example vibrational generator includes, but is not limited to a piezoelectric vibration energy harvester. The thermal power generator includes any device that converts heat into electrical energy. The power source 118 may be in wired communication with the motor 116 to transfer power to the motor 116 based on one or more control signals from the controller 124. The power source 118 may also comprise a wireless power source, which is disposed within the housing 130 and configured to transfer power to the motor 116. Alternatively, or in addition, the power source 118 for the motor 116 may comprise an external power source, or a power source external to the housing 130. For example, the drive device system 102 may also include a power receiver 200. The power receiver 200 may be a plug, terminal or the like disposed within the housing 130 and communicatively coupled to the motor 116 and the controller 124 to receive power from an external power source, such as an external battery, etc. The power receiver 200 may also receive power or current to charge the power source 118 disposed within the housing 130.

In addition, the housing 130 may include an induction charging pad 202 disposed proximate one of the first side 132, the second side 134, the third side 136, the fourth side 138, the first end 140 and the second end 142. In one example, the induction charging pad 202 comprises a receiver coil, which generates a current to charge the power source 118 based on exposure to a changing magnetic field. In certain instances, the changing magnetic field may be generated by the object.

With reference back to FIG. 1, the human-machine interface 120 permits a user to interact with the drive device system 102. In certain instances, the human-machine interface 120 may be optional. The human-machine interface 120 is in communication with the controller 124 via a suitable communication medium. The human-machine interface 120 may be configured in a variety of ways. In some examples, the human-machine interface 120 may include a touchscreen interface that may be overlaid on at least a portion of a display, various switches, a trigger, one or more buttons, a keyboard, an audible device, a microphone associated with a speech recognition system, or various other human-machine interface devices. The display comprises any suitable technology for displaying information, including, but not limited to, a liquid crystal display (LCD), organic light emitting diode (OLED), plasma, or the like. In this example, the display is an electronic display capable of graphically displaying one or more user interfaces under the control of the controller 124. Those skilled in the art may realize other techniques to implement the display on the drive device system 102. The touchscreen interface may include, but is not limited to, a resistive touchscreen panel, a capacitive touchscreen panel, a projected capacitance touchscreen panel, a surface capacitive touchscreen panel, a surface acoustic wave touchscreen panel, etc. Generally, upon the receipt input from the user, the human-machine interface 120 transmits a signal to the controller 124. The human-machine interface 120 is disposed on an exterior surface of the housing 130, and may be coupled to one of the third side 136 or the fourth side 138.

The communication system 122 is configured to wirelessly communicate data between the drive device system 102 and another one of the drive device systems 102, the sensing device 104, the receiver 109, the remote control 106 and/or the personal electronic device 108. In certain examples, the communication system 122 may comprise a two-way communication system, which may be configured to transfer and receive data from another one of the drive device systems 102, the sensing device 104, the remote control 106 and/or the personal electronic device 108. In an example, the communication system 122 may comprise one or more of a Bluetooth low energy (BLE) transceiver, a near field communication (NFC) transceiver, RF radio transceiver, a far field communication transceiver, a wireless communication system configured to communicate via a wireless local area network (WLAN) using IEEE 802.11 standards or by using cellular data communication, a Bluetooth transceiver, etc. The communication system 122 is in communication with the controller 124 via a suitable communication medium.

The controller 124 includes at least one processor 210 and a computer-readable storage device or media 212. The processor 210 is any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 124, a semiconductor-based microprocessor (in the form of a microchip or chip set), any combination thereof, or generally any device for executing instructions. The computer readable storage device or media 212 includes volatile and nonvolatile storage in read-only memory (ROM), random-access memory (RAM), and keep-alive memory (KAM), for example. KAM is a persistent or non-volatile memory that may be used to store various operating variables while the processor 210 is powered down. The computer-readable storage device or media 212 is implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 124 in controlling the drive device system 102. Generally, the controller 124 is configured to output one or more control signals to the motor 116 to drive the drive terminal connector 152. In various examples, controller 124 may be configured to implement instructions of a device control system 300 as described in detail below.

The imaging system 126 is optional, and comprises any suitable imaging system, including, but not limited to radars (e.g., long-range, medium-range-short range), lidars, optical cameras (e.g., forward facing, 360-degree, rear-facing, side-facing, stereo, etc.), thermal (e.g., infrared) cameras, ultrasonic sensors and the like. The imaging system 126 is in communication with the controller 124 via a suitable communication medium that permits the transfer of data, power, etc. The imaging system 126 generally communicates a data stream acquired by the imaging system 126 to the controller 124, which may be transmitted to the remote control 106 and/or the personal electronic device 108. In the example of the imaging system 126 as an optical camera, the imaging system 126 communicates an image data stream to the controller 124, which may be communicated to the remote control 106 and/or the personal electronic device 108.

The illumination system 128 comprises any suitable illumination system for use with the drive device system 102. The illumination system 128 is in communication with the controller 124 via a suitable communication medium. In one example, the illumination system 128 includes a first light 220 and at least one status light 222. In other examples, the illumination system 128 may also comprise a plurality of identification lights disposed within and exposed to an exterior surface of the housing 130. The identification lights are in communication with the controller 124. The first light 220 may be coupled to the first end 140, and the status light 222 may be coupled to one of the third side 136 or the fourth side 138. Generally, the first light 220 is coupled to the housing 130 so as to illuminate an area surrounding the drive device systems 102, and the status light 222 is coupled to the housing 130 to be observable by the user.

The first light 220 comprises any suitable light emitting device, including, but not limited to a light emitting diode (LED), organic light emitting diode (OLED), etc. Generally, the first light 220 is responsive to one or more control signals from the controller 124 to illuminate an area about the drive device systems 102, which may aid in coupling the drive device system 102 to another one of the drive device systems 102 or an object.

The status light 222 comprises one or more light emitting device, including, but not limited to a light emitting diode (LED), organic light emitting diode (OLED), etc. In one example, the status light 222 is responsive to one or more control signals from the controller 124 to illuminate in one of various colors, such as green, yellow or red to indicate a status associated with the drive device systems 102. For example, yellow may indicate the drive device system 102 is not fully coupled to the other one of the drive device system 102, the receiver 109 or the object; red may indicate that there is an error with the drive device system 102; and green may indicate that the drive device system 102 is coupled to the other one of the drive device systems 102, the sensing device 104, the receiver 109 or the object. Each of the first light 220 and the status light 222 may be coupled to the housing 130 and in communication with the controller 124 over a suitable communication medium that facilitates the transfer of data, power, etc. It should be noted that the illumination system 128 is optional, and the drive device system 102 may include one or more of the first light 220, the status light 222 or the identification lights.

The sensor system 129 may include any number of sensors, which observe conditions associated with the drive device system 102 and generate sensor signals based thereon. The sensor system 129 includes, but is not limited to one or more of the following: temperature sensors, torque sensors, moisture sensors, magnetic chip detector sensors, radars (e.g., long-range, medium-range-short range), lidars, global positioning systems, optical cameras (e.g., forward facing, 360-degree, rear-facing, side-facing, stereo, etc.), thermal (e.g., infrared) cameras, ultrasonic sensors, odometry sensors (e.g., encoders) and/or other sensors that might be utilized in connection with systems and methods in accordance with the present subject matter. The sensor system 129 is in communication with the controller 124 over a suitable medium that facilitates the transfer of power, data, commands, etc.

For example, the sensor system 129 may observe a temperature associated with the drive device system 102, and based on the sensor signals, the controller 124 may determine whether to start the motor 116 based on the temperature being above or below a predefined temperature threshold. The controller 124 may process the sensor signals from the sensor system 129 that indicate the drive device system 102 has a temperature that is above a predefined temperature threshold, such as about 65 degrees Celsius, and the controller 124 may output an error message on the human-machine interface 120, the remote control 106 and/or the personal electronic device 108 that indicates that the drive device system 102 is too hot to start. In another example, the controller 124 may also process the sensor signals from the sensor system 129 that indicate the drive device system 102 has the temperature that is above the predefined temperature threshold, and the controller 124 may output one or more control signals to the temperature management system 131 to cool the drive device system 102 to lower the temperature of the drive device system 102 to a predetermined operating temperature range (for example, between about negative 10 degrees Celsius and about 65 degrees Celsius). As another example, the controller 124 may also process the sensor signals from the sensor system 129 that indicate the drive device system 102 has the temperature that is above the predefined temperature threshold, and the controller 124 may receive an override request to proceed with the operation of the drive device system 102 at the elevated temperature.

The controller 124 may also process the sensor signals from the sensor system 129 that indicate the drive device system 102 has a temperature that is below a predefined temperature threshold, such as about 10 degrees Celsius, and the controller 124 may output an error message on the human-machine interface 120, the remote control 106 and/or the personal electronic device 108 that indicates that the drive device system 102 is too cold to start. In another example, the controller 124 may also process the sensor signals from the sensor system 129 that indicate the drive device system 102 has the temperature that is below the predefined temperature threshold, and the controller 124 may output one or more control signals to the temperature management system 131 to heat the drive device system 102 to raise the temperature of the drive device system 102 to the predetermined operating temperature range. As another example, the controller 124 may also process the sensor signals from the sensor system 129 that indicate the drive device system 102 has the temperature that is below the predefined temperature threshold, and the controller 124 may receive an override request to proceed with the operation of the drive device system 102 at the low temperature.

The sensor system 129 may also observe a rotation of the drive terminal connector 152 or the output shaft 190. The controller 124 processes the sensor signals and determines whether the drive terminal connector 152 or the output shaft 190 is operating correctly, for example, whether the speed commanded corresponds with the rotational speed observed by the sensor system 129. If the speed is not within a predefined tolerance, the controller 124 may set error data to indicate that there is an error with the drive device system 102.

As a further example, the sensor system 129 may observe a moisture level within the housing 130 associated with the drive device system 102, and based on the sensor signals, the controller 124 may output an error message on the human-machine interface 120, the remote control 106 and/or the personal electronic device 108 that indicates that the drive device system 102 contains moisture.

In another example, the sensor system 129 may observe chips generated within the housing 130, such as metal fragments, shavings or chips associated with the motor 116, the output shaft 190 and/or the gear set 192, and based on the sensor signals, the controller 124 may output an error message on the human-machine interface 120, the remote control 106 and/or the personal electronic device 108 that indicates that the drive device system 102 contains metal fragments, shavings or chips.

The temperature management system 131 is in communication with the controller 124 over a suitable communication architecture that enables the transfer of power, data, commands, etc. In one example, the temperature management system 131 comprises a heating system and/or a cooling system. For example, the heating system of the temperature management system 131 may include a heating element, such as a heating resistor, etc. The cooling system of the temperature management system 131 may include a cooling fluid or a fan. In other examples, the temperature management system 131 may include a fluid, which is capable of being heated or cooled depending upon the needs of the drive device system 102. Generally, the temperature management system 131 is responsive to one or more control signals from the controller 124 to heat or cool the drive device system 102. Thus, the temperature management system 131 may include any suitable system that is responsive to one or more control signals to heat and/or cool the drive device system 102.

With reference to FIG. 7A, the sensing device 104 may be coupled to one of the drive device systems 102 via the driven coupler 112. In one example, the sensing device 104 includes a sensor 230, a sensing communication system 232 and a sensing controller 234. Generally, each of the sensor 230, the sensing communication system 232 and the sensing controller 234 may be disposed within a sensing housing 236. The sensing housing 236 may be composed of a suitable polymer-based material, metal or metal alloy. Generally, with reference to FIG. 7B, the sensing housing 236 includes a sensing coupler 238, which is sized and shaped to be received within the driven coupler 112. The sensing coupler 238 may include one or more communication contacts 240, such as electrical or magnetic contact pads, which enable the transfer of data, power, controls, etc. from the sensing device 104 to the controller 124 of the drive device system 102. In other examples, the sensing device 104 may include a sensing power source, which is in communication with the sensor 230, the sensing communication system 232 and the sensing controller 234 to provide power to each of the sensor 230 and the sensing communication system 232 and the sensing controller 234 based on one or more control signals from the sensing controller 234. The sensing device 104 may also include the release system 114. Generally, the sensing device 104 may be coupled to the drive device system 102 to sense an environment surrounding the drive device system 102 and transmit the sensor signals to the drive device system 102, the remote control 106 and/or the personal electronic device 108.

Figure 7C:
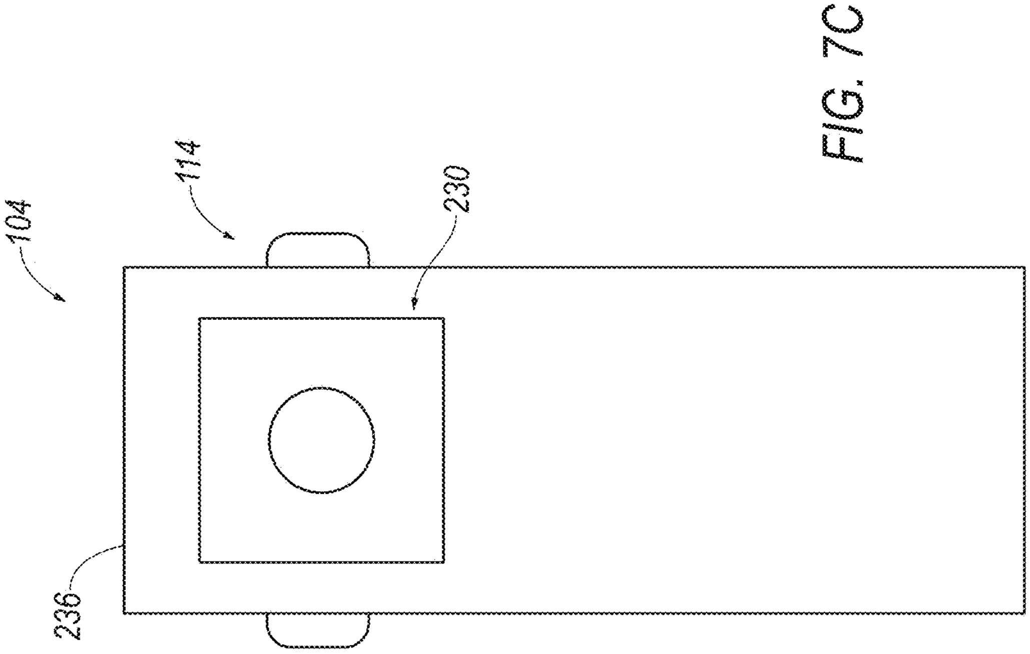
FIG. 7C is a rear view of the sensing device of FIG. 7A, which illustrates an exemplary location for a sensor.
Figure 7B:
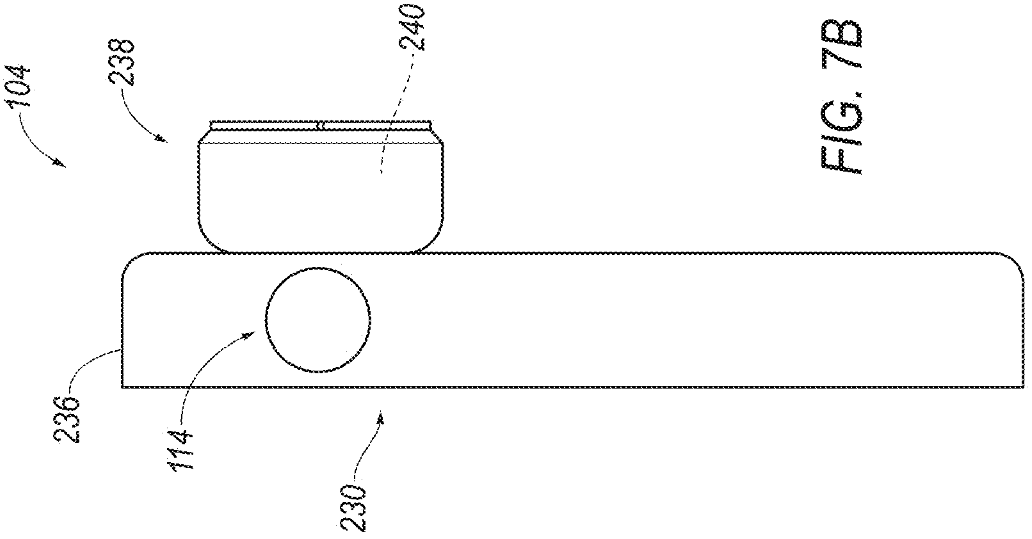
FIG. 7B is a side view of the sensing device of FIG. 7A.

In one example, with reference to FIG. 7C, the sensor 230 senses observable conditions of the exterior environment of the drive device system 102. The sensor 230 includes, but is not limited to, radars (e.g., long-range, medium-range-short range), lidars, global positioning systems, optical cameras (e.g., forward facing, 360-degree, rear-facing, side-facing, stereo, etc.), thermal (e.g., infrared) cameras, ultrasonic sensors, odometry sensors (e.g., encoders) and/or other sensors that might be utilized in connection with systems and methods in accordance with the present subject matter. In one example, the sensor 230 provides information for determining a position of the drive device system 102 relative to objects in the environment surrounding the drive device system 102. It should be noted that the location of the sensor 230 in FIG. 7C is merely an example, and the sensor 230 may be positioned at any desired location on the sensing housing 236 to observe an environment surrounding the sensing device 104 and/or the drive device system 102.

The sensing communication system 232 is configured to wirelessly communicate data between the sensing device 104 and the remote control 106 and/or the personal electronic device 108. The sensing communication system 232 may also communicate wirelessly with the drive device system 102. In certain examples, the sensing communication system 232 may comprise a two-way communication system, which may be configured to transfer and receive data from the drive device system 102, the remote control 106 and/or the personal electronic device 108. In an example, the sensing communication system 232 may comprise one or more of a Bluetooth low energy (BLE) transceiver, a near field communication (NFC) transceiver, RF radio transceiver, a far field communication transceiver, a wireless communication system configured to communicate via a wireless local area network (WLAN) using IEEE 802.11 standards or by using cellular data communication, a Bluetooth transceiver, etc. The sensing communication system 232 is in communication with the sensing controller 234 via a suitable communication medium.

The sensing controller 234 includes at least one processor 242 and a computer-readable storage device or media 244. The processor 242 is any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the sensing controller 234, a semiconductor-based microprocessor (in the form of a microchip or chip set), any combination thereof, or generally any device for executing instructions. The computer readable storage device or media 244 includes volatile and nonvolatile storage in read-only memory (ROM), random-access memory (RAM), and keep-alive memory (KAM), for example. KAM is a persistent or non-volatile memory that may be used to store various operating variables while the processor 242 is powered down. The computer-readable storage device or media 244 is implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the sensing controller 234 in controlling the sensing device 104. Generally, the sensing controller 234 is configured to control the sensing communication system 232 to transmit sensor signals from the sensor 230 to the drive device system 102, the remote control 106 and/or the personal electronic device 108.

The portable system 100 may include one or both of the remote control 106 and the personal electronic device 108. In one example, the remote control 106 may include a remote human-machine interface 250, a remote communication system 252 and a remote controller 254. The remote human-machine interface 250 may be coupled to a remote control housing 256, and the remote communication system 252 and the remote controller 254 may be disposed in the remote control housing 256. The remote control housing 256 may be composed of a suitable polymer-based material, metal or metal alloy, and may have any desired shape, such as rectangular, square, etc. The remote control 106 may also include a remote power source 260. The remote power source 260 may be in communication with the remote controller 254, the remote human-machine interface 250 and the remote communication system 252 to provide power to the remote controller 254, the remote human-machine interface 250 and the remote communication system 252. The remote power source 260 may comprise a battery or the like, which may be disposed within the remote control housing 256. The remote control 106 may also include an inductive charging pad and/or a power receiver to power the remote control 106 and/or recharge the remote power source 260.

The remote human-machine interface 250 is in communication with the remote controller 254 via a suitable communication medium. The remote human-machine interface 250 may be configured in a variety of ways. In some examples, the remote human-machine interface 250 may include a touchscreen interface 262 that may be overlaid on at least a portion of a display 264, various switches, one or more buttons, a keyboard, an audible device, a microphone associated with a speech recognition system, or various other human-machine interface devices. The display 264 comprises any suitable technology for displaying information, including, but not limited to, a liquid crystal display (LCD), organic light emitting diode (OLED), plasma, or the like. In this example, the display 264 is an electronic display capable of graphically displaying one or more user interfaces under the control of the remote controller 254. Those skilled in the art may realize other techniques to implement the display 264 on the remote control 106. The touchscreen interface 262 may include, but is not limited to, a resistive touchscreen panel, a capacitive touchscreen panel, a projected capacitance touchscreen panel, a surface capacitive touchscreen panel, a surface acoustic wave touchscreen panel, etc. Generally, upon the receipt input from the user, the remote human-machine interface 250 transmits a signal to the remote controller 254.

The remote communication system 252 is configured to wirelessly communicate data between the remote control 106 and the sensing device 104 and/or the drive device system 102. In certain examples, the remote communication system 252 may comprise a two-way communication system, which may be configured to transfer and receive data from the remote control 106, the drive device system 102 and/or the sensing device 104. In an example, the remote communication system 252 may comprise one or more of a Bluetooth low energy (BLE) transceiver, a near field communication (NFC) transceiver, RF radio transceiver, a far field communication transceiver, a wireless communication system configured to communicate via a wireless local area network (WLAN) using IEEE 802.11 standards or by using cellular data communication, a Bluetooth transceiver, etc. The remote communication system 252 is in communication with the remote controller 254 via a suitable communication medium.

The remote controller 254 includes at least one processor 266 and a computer-readable storage device or media 268. The processor 266 is any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the remote controller 254, a semiconductor-based microprocessor (in the form of a microchip or chip set), any combination thereof, or generally any device for executing instructions. The computer readable storage device or media 268 includes volatile and nonvolatile storage in read-only memory (ROM), random-access memory (RAM), and keep-alive memory (KAM), for example. KAM is a persistent or non-volatile memory that may be used to store various operating variables while the processor 266 is powered down. The computer-readable storage device or media 268 is implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the remote controller 254 in controlling the remote control 106. Generally, the remote controller 254 is configured to control the remote communication system 252 to transmit one or more control signals based on input received via the remote human-machine interface 250 to the drive device system 102.

Generally, the personal electronic device 108 may comprise any suitable electronic device, including, but not limited to, a computer, a tablet, a cellular phone, a smartwatch, smart glasses, an augmented reality device, a virtual reality device, etc. The personal electronic device 108 may include a personal human-machine interface 270, a personal communication system 272 and a personal controller 274. The personal human-machine interface 270 may be coupled to a personal housing 276, and the personal communication system 272 and the personal controller 274 may be disposed in the personal housing 276. The personal housing 276 may be composed of a suitable polymer-based material, metal or metal alloy, and may have any desired shape, such as rectangular, square, etc. The personal electronic device 108 may also include a personal power source 280. The personal power source 280 may be in communication with the personal controller 274, the personal human-machine interface 270 and the personal communication system 272 to provide power to the personal controller 274, the personal human-machine interface 270 and the personal communication system 272. The personal power source 280 may comprise a battery or the like, which may be disposed within the personal housing 276. The personal electronic device 108 may also include an inductive charging pad and/or a power receiver to power the personal electronic device 108 and/or recharge the personal power source 280.

The personal human-machine interface 270 is in communication with the personal controller 274 via a suitable communication medium. The personal human-machine interface 270 may be configured in a variety of ways. In some examples, the personal human-machine interface 270 may include a touchscreen interface 282 that may be overlaid on at least a portion of a display 284, various switches, one or more buttons, a keyboard, an audible device, a microphone associated with a speech recognition system, or various other human-machine interface devices. The display 284 comprises any suitable technology for displaying information, including, but not limited to, a liquid crystal display (LCD), organic light emitting diode (OLED), plasma, or the like. In this example, the display 284 is an electronic display capable of graphically displaying one or more user interfaces under the control of the personal controller 274. Those skilled in the art may realize other techniques to implement the display 284 on the personal electronic device 108. The touchscreen interface 282 may include, but is not limited to, a resistive touchscreen panel, a capacitive touchscreen panel, a projected capacitance touchscreen panel, a surface capacitive touchscreen panel, a surface acoustic wave touchscreen panel, etc. Generally, upon the receipt input from the user, the personal human-machine interface 270 transmits a signal to the personal controller 274.

The personal communication system 272 is configured to wirelessly communicate data between the personal electronic device 108 and the sensing device 104 and/or the drive device system 102. In certain examples, the personal communication system 272 may comprise a two-way communication system, which may be configured to transfer and receive data from the drive device system 102 and/or the sensing device 104. In an example, the personal communication system 272 may comprise one or more of a Bluetooth low energy (BLE) transceiver, a near field communication (NFC) transceiver, RF radio transceiver, a far field communication transceiver, a wireless communication system configured to communicate via a wireless local area network (WLAN) using IEEE 802.11 standards or by using cellular data communication, a Bluetooth transceiver, etc. The personal communication system 272 is in communication with the personal controller 274 via a suitable communication medium.

The personal controller 274 includes at least one processor 286 and a computer-readable storage device or media 288. The processor 286 is any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the personal controller 274, a semiconductor-based microprocessor (in the form of a microchip or chip set), any combination thereof, or generally any device for executing instructions. The computer readable storage device or media 288 includes volatile and nonvolatile storage in read-only memory (ROM), random-access memory (RAM), and keep-alive memory (KAM), for example. KAM is a persistent or non-volatile memory that may be used to store various operating variables while the processor 286 is powered down. The computer-readable storage device or media 288 is implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the personal controller 274 in controlling the personal electronic device 108. Generally, the personal controller 274 is configured to control the personal communication system 272 to transmit one or more control signals based on input received via the personal human-machine interface 270 to the drive device system 102, and/or the sensing device 104. The remote controller 254 and the personal controller 274 may be considered a master controller configured to communicate with the drive device system 102 to manipulate a state or a position of an object coupled to the drive device system 102 and/or the receiver 109.

The portable system 100 may include one or more of the receivers 109. The receiver 109 is coupled or mounted to the object. In one example, the receiver 109 may be configured for use with a specific type of object and may include predefined or factory set data regarding the particular type of object. Each receiver 109 may include a receiver coupler 290, an optional receiver sensor 291, a receiver communication system 292 and a receiver controller 294. In certain instances, the receiver 109 may not include the receiver communication system 292 and the receiver controller 294, but may include a scannable code, such as a QR code or the like, which includes a link to the information associated with the receiver 109. The receiver coupler 290 may extend outwardly from a receiver housing 295, and the receiver communication system 292 and the receiver controller 294 may be disposed within the receiver housing 295. The receiver housing 295 may be composed of a suitable polymer-based material, metal or metal alloy, and may have any desired shape, such as rectangular, square, etc. The receiver 109 may also include a power source disposed within the receiver housing 295 and in communication with the receiver communication system 292 and the receiver controller 294, including, but not limited to a battery. The receiver 109 may also include an inductive charging pad and/or a power receiver to power the receiver 109 and/or recharge the power source associated with the receiver 109.

The receiver coupler 290 includes at least a receiver terminal end 296. In one example, the receiver terminal end 296 extends outwardly from the receiver housing 295. In one example, the receiver terminal end 296 comprises a socket, including, but not limited to a hexagonal or square socket. It should be noted that the receiver terminal end 296 may comprise other types of receivers that cooperate with the drive terminal connector 152 to couple the receiver 109 to the drive device system 102, and the use of a socket is merely an example. The receiver terminal end 296 may also include communication terminals 297. The communication terminals 297 may comprise electrical or magnetic contacts, which enable the transfer of power, data, commands, etc. from the receiver 109 to the controller 124 of the drive device system 102.

The optional receiver sensor 291 senses observable conditions of the exterior environment of the receiver 109. In one example, the optional receiver sensor 291 includes, but is not limited to, position sensors, pressure sensors, radars (e.g., long-range, medium-range-short range), lidars, global positioning systems, optical cameras (e.g., forward facing, 360-degree, rear-facing, side-facing, stereo, etc.), thermal (e.g., infrared) cameras, ultrasonic sensors, odometry sensors (e.g., encoders) and/or other sensors that might be utilized in connection with systems and methods in accordance with the present subject matter. The optional receiver sensor 291 is in communication with the receiver controller 294 over a suitable medium that facilitates the transfer of power, data, commands, etc.

The receiver communication system 292 is configured to wirelessly communicate data between the receiver 109 and the remote control 106, the personal electronic device 108 and/or the drive device system 102. In certain examples, the receiver communication system 292 may comprise a two-way communication system, which may be configured to transfer and receive data from the remote control 106, the personal electronic device 108 and/or the drive device system 102. In an example, the receiver communication system 292 may comprise one or more of a Bluetooth low energy (BLE) transceiver, a near field communication (NFC) transceiver, RF radio transceiver, a far field communication transceiver, a wireless communication system configured to communicate via a wireless local area network (WLAN) using IEEE 802.11 standards or by using cellular data communication, a Bluetooth transceiver, etc. The receiver communication system 292 is in communication with the receiver controller 294 via a suitable communication medium.

The receiver controller 294 includes at least one processor 298 and a computer-readable storage device or media 299. The processor 298 is any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the receiver controller 294, a semiconductor-based microprocessor (in the form of a microchip or chip set), any combination thereof, or generally any device for executing instructions. The computer readable storage device or media 299 includes volatile and nonvolatile storage in read-only memory (ROM), random-access memory (RAM), and keep-alive memory (KAM), for example. KAM is a persistent or non-volatile memory that may be used to store various operating variables while the processor 298 is powered down. The computer-readable storage device or media 299 is implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the receiver controller 294 in controlling the receiver 109. Generally, the receiver controller 294 is configured to control the receiver communication system 292 to transmit data regarding the object and/or sensor signals observed by the optional receiver sensor 291.

Figure 8A:
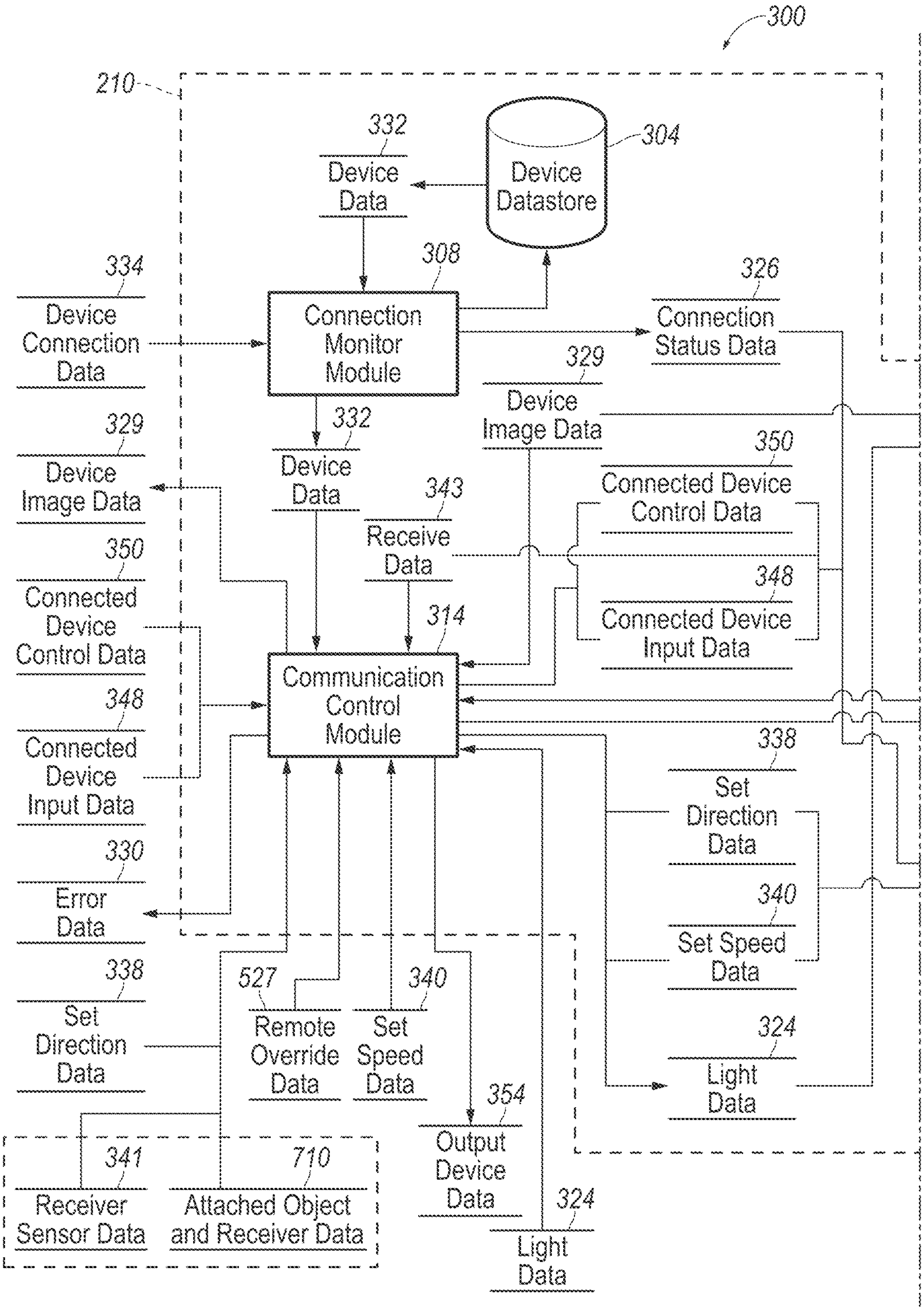
FIGS. 8A and 8B are a dataflow diagram illustrating a device control system of the system of FIG. 1, in accordance with various examples.
Figure 8B:
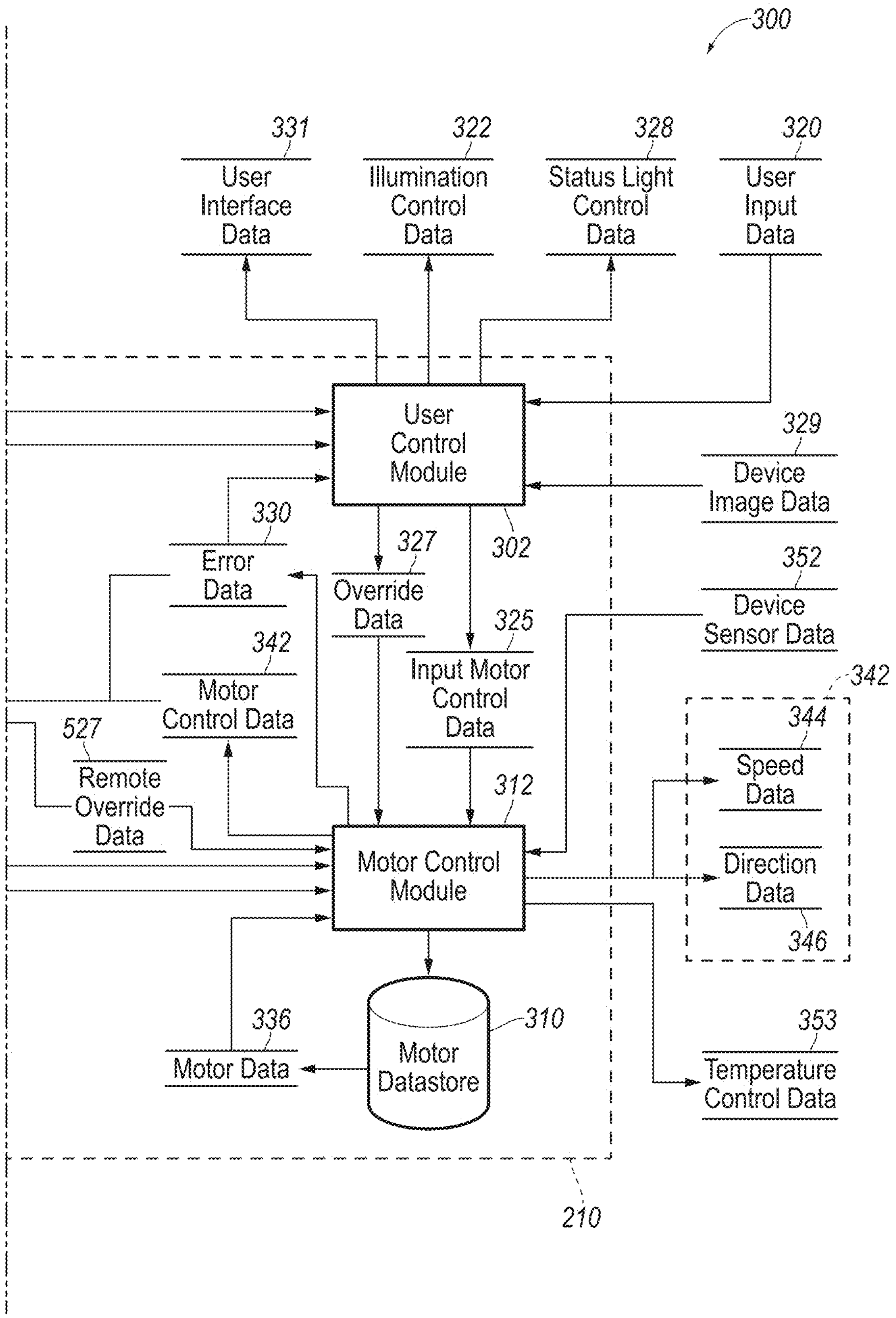

As shown in more detail with regard to FIGS. 8A and 8B and with continued reference to FIGS. 1-7, a dataflow diagram illustrates various examples of the device control system 300, which may be embedded within the controller 124. Various examples of the device control system 300 according to the present disclosure can include any number of sub-modules embedded within the controller 124. As can be appreciated, the sub-modules shown in FIGS. 8A and 8B can be combined and/or further partitioned to similarly control the drive device system 102. Inputs to the device control system 300 may be received from the remote control 106 (FIG. 1), the personal electronic device 108 (FIG. 1), the human-machine interface 120 (FIG. 1), the sensing device 104 (FIG. 1), received from other control modules (not shown) associated with the drive device system 102, and/or determined/modeled by other sub-modules (not shown) within the controller 124. In various examples, the device control system 300 includes a user interface control module 302, a device datastore 304, a connection monitor module 308, a motor datastore 310, a motor control module 312 and a communication control module 314.

The user interface control module 302 receives as input user input data 320. The user input data 320 comprises signals received by a user's interaction with the human-machine interface 120. In one example, the user input data 320 comprises a request to activate or deactivate the first light 220. Based on the receipt of the request to activate or deactivate the first light 220, the user interface control module 302 outputs illumination control data 322. The illumination control data 322 comprises one or more control signals to activate the first light 220 to illuminate the area around the drive device systems 102 or to deactivate the first light 220. The user interface control module 302 also receives as input light data 324. The light data 324 comprises a request to activate or deactivate the first light 220 as received from the remote control 106 and/or the personal electronic device 108. Based on the light data 324, the user interface control module 302 also outputs the illumination control data 322.

In certain examples, the user input data 320 may also comprise a request to rotate the output shaft 190 in a particular direction and at a particular speed. The user input data 320 may also include a request to operate the motor 116 in a particular mode of operation. Based on the receipt of the user input data 320 that indicates a direction of rotation for the output shaft 190, a speed of rotation for the output shaft 190 and/or a mode of operation for the motor 116, the user interface control module 302 sets input motor control data 325 for the motor control module 312. The input motor control data 325 comprises data regarding a direction of rotation for the output shaft 190, a speed of rotation of the motor 116 and/or a mode of operation for the motor 116 received via the human-machine interface 120.

The user input data 320 may also comprise an override request. Based on the override request, the user interface control module 302 sets override data 327 for the motor control module 312. The override data 327 comprises data that instructs the motor control module 312 to operate the motor 116 even if there is an error or error data 330 associated with the operation of the motor 116.

The user interface control module 302 also receives as input connection status data 326. The connection status data 326 comprises data regarding whether the drive device system 102 is fully connected to another one of the drive device systems 102, the sensing device 104 and/or the receiver 109, partially connected to the one of the drive device systems 102, the sensing device 104 and/or the receiver 109 or not connected to the one of the drive device systems 102, the sensing device 104 and/or the receiver 109. Based on the connection status data 326, the user interface control module 302 outputs status light control data 328. The status light control data 328 comprises one or more control signals to illuminate the status light 222 based on the connection status or an error associated with the drive device system 102. In the example of the connection status data 326 output based on the connection status, if the drive device system 102 is fully connected to the one of the drive device systems 102, the sensing device 104 and/or the receiver 109, the status light control data 328 may comprise control signals to illuminate the status light 222 in a green color. If the drive device system 102 is partially connected to the one of the drive device systems 102, the sensing device 104 and/or the receiver 109, the status light control data 328 may comprise control signals to illuminate the status light 222 in a yellow color. If the drive device system 102 is not connected to the one of the drive device systems 102, the sensing device 104 and/or the receiver 109, the status light control data 328 may comprise control signals to illuminate the status light 222 in a red color. It should be noted that the colors described herein are merely examples as the status light control data 328 may also cause the status light 222 to flash in a predefined pattern, for example.

In addition, the user interface control module 302 receives as input error data 330. The error data 330 comprises data that indicates that the drive device system 102 is not functioning properly. For example, the error data 330 may indicate that the motor 116 is not at the desired output speed, or rotational direction. The error data 330 may also indicate that the motor 116 has reached its operational limit. The error data 330 may also indicate that the sensor system 129 has observed conditions associated with the drive device system 102 that impact the operation of the drive device system 102 such as a temperature above the predefined threshold, moisture or metal fragments, shavings or chips. Based on the receipt of the error data 330, the user interface control module 302 outputs the status light control data 328. In the example of the connection status data 326 output based on the error, the status light control data 328 may comprise signals to illuminate the status light 222 in a red color or to flash in a predefined pattern. Based on the error data 330, in certain instances, the user interface control module 302 may output the user interface data 331 with a graphical or textual message of the error associated with the drive device system 102. The user interface control module 302 may also include a graphical and/or textual message that indicates to modify the user input data 320 in order to overcome the error identified in the error data 330 or to select to override the error in the error data 330.

In certain examples, the user interface control module 302 receives as input device image data 329. The device image data 329 comprises an image data stream from the imaging system 126. Based on the receipt of the device image data 329, the user interface control module 302 outputs user interface data 331. The user interface data 331 comprises data for rendering the device image data 329 on the human-machine interface 120 of the drive device system 102.

The device datastore 304 stores data regarding one or more characteristics associated with the drive device system 102. For example, the device datastore 304 stores identification data, motor data and system data associated with the drive device system 102, or simply, the device datastore 304 stores device data 332. The device data 332 includes the identification data, which comprises a unique identifier associated with the particular one of the drive device systems 102 such that the sensing device 104, the remote control 106, the personal electronic device 108 and/or the receiver 109 may identify the drive device system 102. In certain instances, the identification data may also include a key or the like to enable the remote control 106 and/or the personal electronic device 108 to communicate with the drive device system 102 securely. The device data 332 includes the motor data, which comprises a torque output by the motor 116 associated with the drive device system 102, revolutions per minute (rpm) the motor 116 is operating at, etc. The device data 332 also includes system data, which comprises data associated with the drive device systems 102 itself, such as whether the drive device system 102 includes the imaging system 126 and/or the illumination system 128, and the like. The device data 332 are predefined, factory set values.

The connection monitor module 308 receives as input device connection data 334. The device connection data 334 comprises data regarding whether another one of the drive device systems 102, the sensing device 104 and/or the receiver 109 is coupled to the driven coupler 112 or the drive coupler 110 of the drive device system 102. For example, the device connection data 334 may be generated based on contact and communication between the communication terminals 161 and the communication terminals 297 of the receiver 109; contact between the communication terminals 174 and the one or more communication contacts 240 of the sensing device 104; etc. Based on the device connection data 334, the connection monitor module 308 queries the device datastore 304 and retrieves the device data 332. The connection monitor module 308 sets the device data 332 for the communication control module 314.

The motor datastore 310 stores data associated with the motor 116 of the drive device system 102 or stores motor data 336. For example, the motor datastore 310 stores one or more tables (e.g., lookup tables) that indicate a speed to drive the motor 116 to result in a particular output speed for the drive terminal connector 152. In this regard, in the example of coupling the output shaft 190 to the drive terminal connector 152 with the gear assembly, the gear ratio associated with the gear assembly may cause the drive terminal connector 152 to rotate at a different speed than the output shaft 190. The one or more tables of the motor datastore 310 provides a speed for the motor 116 to result in a speed of the drive terminal connector 152 or provides the motor data 336 based on an input speed for the drive terminal connector 152. As an example, one or more tables can be indexed by various parameters such as, but not limited to, the speed of the drive terminal connector 152, to provide the motor data 336. The motor data 336 are predefined, factory set values.

The motor control module 312 receives as input set direction data 338, set speed data 340 and receiver data 343 from the communication control module 314. The set direction data 338 comprises data that indicates a direction of rotation for the output shaft 190, such as clockwise or counterclockwise. The set speed data 340 comprises data that indicates a speed for the rotation of the drive terminal connector 152. The set direction data 338 and the set speed data 340 are received from the remote control 106 and/or the personal electronic device 108. The receiver data 343 comprises sensor signals from the receiver sensor 291 and attached object and receiver data 710. The receiver data 343 includes but is not limited to, a position of the receiver 109, a pressure associated with the receiver 109, a unique identifier associated with the receiver 109, object identification data that comprises an identifier associated with the object attached to the receiver 109, limit data that comprises one or more limits associated with the receiver 109 and/or the attached object itself, performance parameters associated with the object, which may be specific to one or more functions of the object, and the like. In certain instances, the receiver data 343 may also be received by the communication control module 512 of the remote controller 254 and/or the personal controller 274, and output with the user interface data 514 for rendering on a user interface associated with the remote human-machine interface 250 and/or personal human-machine interface 270.

Based on the receipt of the set direction data 338 and the set speed data 340, the motor control module 312 queries the motor datastore 310 and retrieves the motor data 336 associated with the set speed data 340. If the motor datastore 310 does not contain the motor data 336 associated with the set speed data 340, the motor control module 312 sets the error data 330 for the user interface control module 302 and the communication control module 314, which indicates the requested speed is outside of the operational limit for the motor 116.

If the motor control module 312 retrieves the motor data 336 associated with the set speed data 340, the motor control module 312 processes the receiver data 343, if present, and determines whether the motor data 336 is acceptable based on the receiver data 343. For example, based on the receiver sensor data 341 that indicates a position or range of travel of the receiver 109, the motor control module 312 determines whether the receiver 109 is movable as requested in the motor data 336. For example, the motor control module 312 determines whether the receiver 109 had reached a position such that further movement of the receiver 109 is not possible. In another example, based the receiver data 343 that indicates an amount of travel remaining for the receiver 109, the motor control module 312 may determine that the operation of the motor 116 as provided in the motor data 336 would result in a travel of the receiver 109 that is beyond an acceptable range of travel for the receiver 109. As a further example, the receiver data 343 may comprise data regarding a pressure associated with the receiver 109 and a pressure range for the object coupled to the receiver 109. For example, if the receiver 109 is coupled to an inflatable object, such as a tire, inner tube, raft or the like, the receiver data 343 may indicate a pressure range for the object coupled to the receiver 109 and the pressure associated with the receiver 109. If based on the receiver data 343 the motor control module 312 determines that the pressure is within the pressure range, the motor control module 312 may determine that the operation of the motor 116 as provided in the motor data 336 would result in a pressure that is outside of the pressure range.

Thus, generally, the motor control module 312 determines whether it is acceptable to operate the motor 116 as set forth in the motor data 336 based on the receiver data 343. If the motor control module 312 determines that the operation of the motor 116 as requested would be unacceptable based on the receiver data 343, the motor control module 312 sets the error data 330 for the user interface control module 302 and the communication control module 314, which indicates the requested operation of the motor 116 is not acceptable.

If the motor control module 312 retrieves the motor data 336 associated with the set speed data 340, and the motor data 336 is acceptable based on the receiver data 343, if applicable, the motor control module 312 outputs motor control data 342. The motor control data 342 comprises speed data 344 and direction data 346. The speed data 344 comprises the speed to rotate the motor 116 to provide the input speed of rotation for the drive terminal connector 152, and the direction data 346 comprises the direction of rotation received from the communication control module 314.

The motor control module 312 also receives as input the input motor control data 325 from the user interface control module 302. Based on the receipt of the input motor control data 325, the motor control module 312 queries the motor datastore 310 and retrieves the motor data 336 associated with the speed for the drive terminal connector 152 from the input motor control data 325. If the motor datastore 310 does not contain the motor data 336 associated with the speed for the drive terminal connector 152, the motor control module 312 sets the error data 330. Otherwise, the motor control module 312 retrieves the motor data 336 associated with the speed for the drive terminal connector 152 and determines whether the motor data 336 is acceptable based on the receiver data 343, if applicable. If the motor data 336 is acceptable, the motor control module 312 outputs the motor control data 342. The speed data 344 comprises the speed to rotate the motor 116 to provide the input speed of rotation for the drive terminal connector 152, and the direction data 346 comprises the direction of rotation received via the human-machine interface 120.

The motor control module 312 also receives as input the connection status data 326. Based on the connection status data 326 indicating that another one of the drive device systems 102 or the receiver 109 is coupled to the drive coupler 110, the motor control module 312 determines whether connected device input data 348 has been received. The connected device input data 348 comprises data associated with the connected device, such as a connected one of the drive device systems 102 or the sensing device 104. In one example, the connected device input data 348 comprises identification data, motor data and system data associated with the connected device. The identification data may include a unique identifier associated with the particular one of the connected devices such that the drive device system 102 may identify the connected device. The identification data may also include a key or the like to enable the remote control 106 and/or the personal electronic device 108 to communicate with the connected device securely. The motor data includes a torque output by the motor 116 associated with the drive device system 102, etc. The system data includes data associated with the connected device itself, such as whether the drive device system 102 includes the imaging system 126 and/or the illumination system 128 and the like. The connected device input data 348 also includes data that indicates a speed of rotation for the drive terminal connector 152 and a direction of rotation of the drive terminal connector 152 as received from the connected device, such as the other one of the drive device systems 102 and/or the receiver 109 that is coupled to the drive coupler 110 of the drive device system 102. In certain instances, the connected device input data 348 may comprise a speed of rotation for the drive terminal connector 152 that is less than a maximum value due to limits associated with a movement of the other one of the drive device systems 102 or the object coupled to the receiver 109.

Based on the receipt of the connected device input data 348, the motor control module 312 queries the motor datastore 310 and retrieves the motor data 336 associated with the speed for the drive terminal connector 152 from the connected device input data 348. If the motor datastore 310 does not contain the motor data 336 associated with the speed for the drive terminal connector 152, the motor control module 312 sets the error data 330. Otherwise, the motor control module 312 retrieves the motor data 336 associated with the speed for the drive terminal connector 152 and outputs the motor control data 342. The speed data 344 comprises the speed to rotate the motor 116 to provide the input speed of rotation for the drive terminal connector 152, and the direction data 346 comprises the direction of rotation received via the connected one of the drive device systems 102 or the receiver 109.

Based on the connection status data 326 indicating that another one of the drive device systems 102 or the sensing device 104 is coupled to the driven coupler 112, the motor control module 312 determines whether connected device control data 350 has been received. The connected device control data 350 comprises data associated with the connected device. In one example, the connected device control data 350 comprises identification data, motor data and system data associated with the connected device. The identification data may include a unique identifier associated with the particular one of the connected devices such that the drive device system 102 may identify the connected device. The identification data may also include a key or the like to enable the remote control 106 and/or the personal electronic device 108 to communicate with the connected device securely. The motor data includes a torque output by the motor 116 associated with the drive device system 102, etc. The system data includes data associated with the connected device itself, such as whether the drive device system 102 includes the imaging system 126 and/or the illumination system 128, and the like. The connected device control data 350 also includes data that indicates a speed of rotation for the drive terminal connector 152 and a direction of rotation of the drive terminal connector 152 as received from the other one of the drive device systems 102 that is coupled to the driven coupler 112 of the drive device system 102. In certain instances, the connected device control data 350 may comprise a speed of rotation for the drive terminal connector 152 that is less than a maximum value due to limits associated with a movement of the other one of the drive device systems 102.

Based on the receipt of the connected device control data 350, the motor control module 312 queries the motor datastore 310 and retrieves the motor data 336 associated with the speed for the drive terminal connector 152 from the connected device control data 350. If the motor datastore 310 does not contain the motor data 336 associated with the speed for the drive terminal connector 152, the motor control module 312 sets the error data 330. Otherwise, the motor control module 312 retrieves the motor data 336 associated with the speed for the drive terminal connector 152 and determines whether the motor data 336 is acceptable based on the receiver data 343, if applicable. If acceptable, the motor control module 312 outputs the motor control data 342. The speed data 344 comprises the speed to rotate the motor 116 to provide the input speed of rotation for the drive terminal connector 152, and the direction data 346 comprises the direction of rotation received via the connected one of the drive device systems 102.

Based on the connection status data 326 indicating that another one of the drive device systems 102, the sensing device 104 or the receiver 109 is coupled to the drive device system 102, the motor control module 312 also sets the motor control data 342 for the communication control module 314.

The motor control module 312 also receives as input device sensor data 352. The input device sensor data 352 may comprise sensor signals from the sensor system 129. The motor control module 312 processes the sensor signals and determines whether the drive device system 102 is operating within predefined thresholds or tolerances. If the drive device system 102 is not operating within the predefined thresholds or tolerances, the motor control module 312 may set the error data 330 to indicate that there is an error with the drive device system 102. For example, the motor control module 312 may process the input device sensor data 352 and determine that a temperature associated with the drive device system 102 is above a predefined threshold for temperature, such as about 65 degrees Celsius, or is below a predefined threshold, such as about negative 10 degrees Celsius. The motor control module 312 may set the error data 330 to indicate the error associated with the temperature. In addition, the motor control module 312 may output temperature control data 353 for the temperature management system 131. The temperature control data 353 may comprise one or more control signals to the temperature management system 131 to operate a heater to cool the drive device system 102 (based on the temperature being above the threshold) to the predefined temperature threshold range for operating or to warm the drive device system 102 (based on the temperature being below the threshold) to the predefined temperature threshold range for operating.

The motor control module 312 receives as input the override data 327 from the user interface control module 302. Based on the override data 327, the motor control module 312 ignores the error(s) that resulted in the error data 330 and outputs the motor control data 342 to control the motor 116.

The motor control module 312 receives as input the remote override data 527 from the communication control module 314. The remote override data 527 comprises data received from the remote communication system 252 or the personal communication system 272 that instructs the motor control module 312 to operate the motor 116 even if there is an error or error data 330 associated with the operation of the motor 116. Based on the remote override data 527, the motor control module 312 ignores the error(s) that resulted in the error data 330 and outputs the motor control data 342 to control the motor 116.

The communication control module 314 receives as input the device data 332 and the motor control data 342. The communication control module 314 outputs the device data 332 and the motor control data 342 as output device data 354. The output device data 354 may be broadcast to another one of the drive device systems 102, the sensing device 104, the receiver 109, the remote control 106 and/or the personal electronic device 108 by the communication system 122. When the drive device system 102 is coupled to the drive coupler 110 of another one of the drive device systems 102, the output device data 354 may comprise the connected device input data 348. When the drive device system 102 is coupled to the driven coupler 112 of another one of the drive device systems 102, the output device data 354 may comprise the connected device control data 350.

The communication control module 314 receives as input the set direction data 338 and the set speed data 340 from the remote control 106 or the personal electronic device 108. The communication control module 314 sets the set direction data 338 and the set speed data 340 for the motor control module 312.

The communication control module 314 also receives as input the error data 330. The communication control module 314 outputs the error data 330 for the remote control 106 or the personal electronic device 108.

The communication control module 314 also receives as input the connected device input data 348 and the connected device control data 350. The communication control module 314 sets the connected device input data 348 and the connected device control data 350 for the motor control module 312.

The communication control module 314 also receives as input the device image data 329. The communication control module 314 outputs the device image data 329 for the remote control 106 or the personal electronic device 108. The communication control module 314 receives as input the receiver sensor data 341 and the attached object and receiver data 710. The communication control module 314 sets the receiver sensor data 341 and the attached object and receiver data 710 as the receiver data 343 for the motor control module 312.

Figure 9:
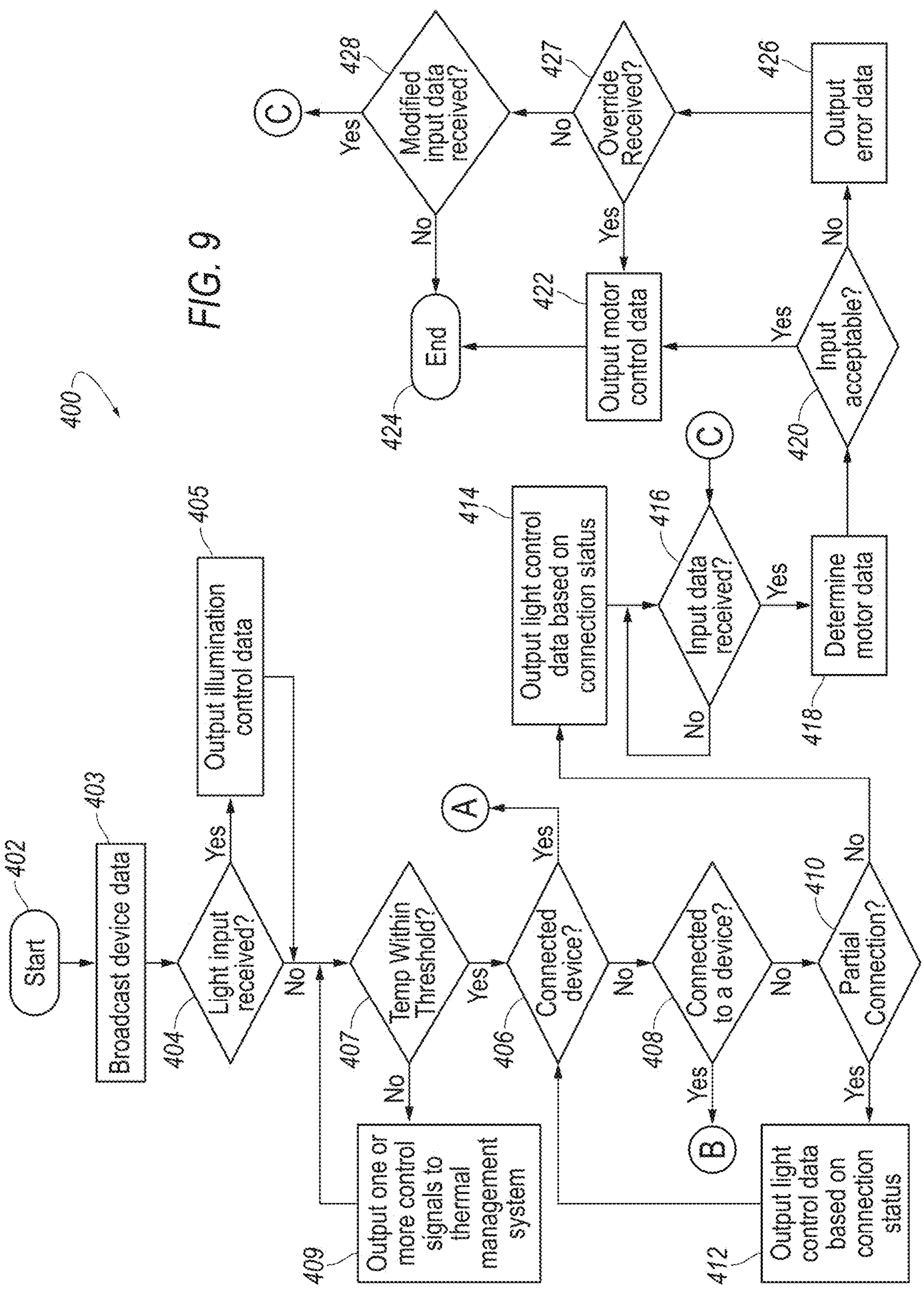
FIGS. 9-11 are flowcharts illustrating a method for the device control system, in accordance with various examples.
Figure 10:
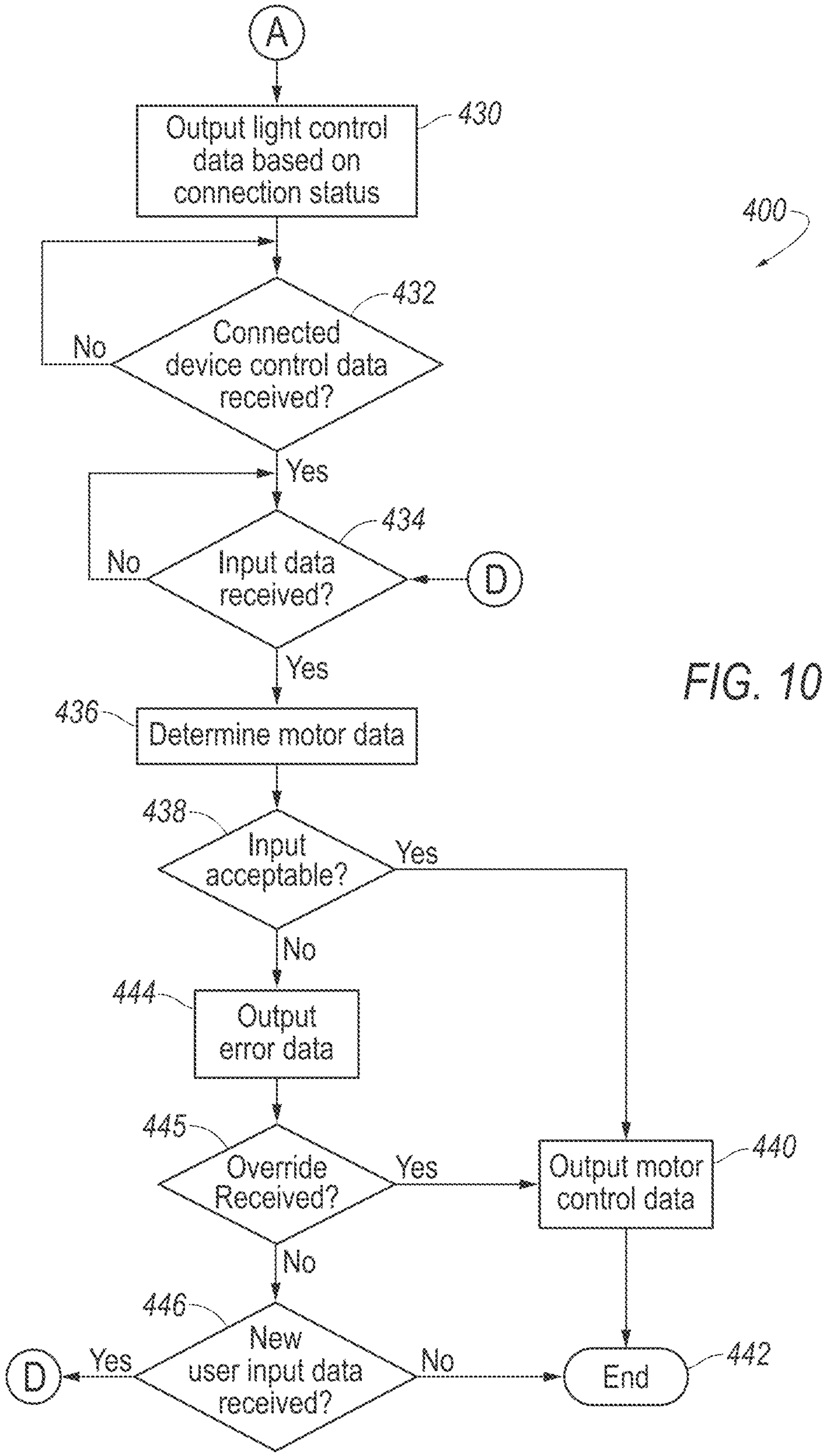
Figure 11:
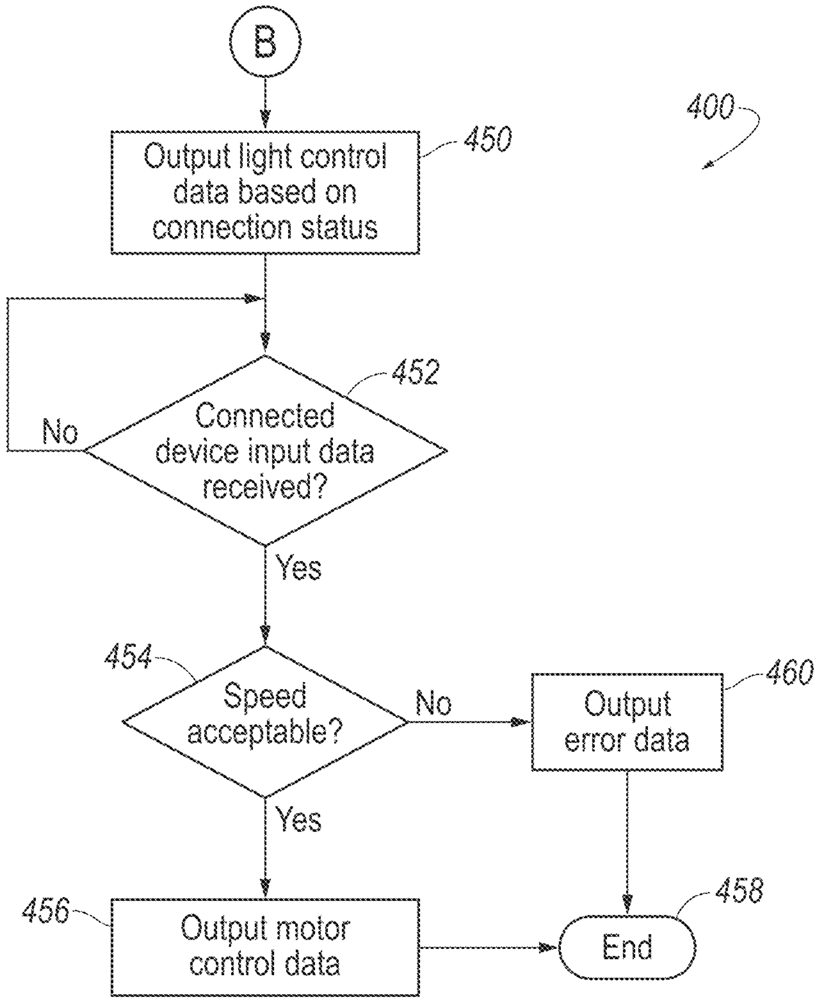

Referring now to FIGS. 9-11, and with continued reference to FIGS. 1-7, a flowchart illustrates a method 400 that can be performed by the device control system 300 of FIGS. 8A and 8B in accordance with the present disclosure. In one example, the method 400 is performed by the processor 210 of the controller 124 of the drive device system 102. As can be appreciated in light of the disclosure, the order of operation within the method 400 is not limited to the sequential execution as illustrated in FIGS. 9-11 but may be performed in one or more varying orders as applicable and in accordance with the present disclosure. In various examples, the method 400 may run based on an activation or powering on of the drive device system 102.

In one example, the method begins at 402. At 403, the method outputs or broadcasts the output device data 354, which may be received by the remote control 106 and/or the personal electronic device 108. At 404, the method determines whether input has been received to activate or deactivate the first light 220. If true, at 405, the method outputs the illumination control data 322. At 407, if applicable, the method determines whether the temperature of the drive device system 102 is within the predefined temperature threshold range for operating (above about negative 10 degrees Celsius and below about 65 degrees Celsius). If true, the method proceeds to 406. Otherwise, at 409, the method outputs the temperature control data 353 to the temperature management system 131 to heat or cool the drive device system 102 to reach the predefined temperature threshold range for operating.

At 406, the method determines whether there is a device connected to the driven coupler 112, such as another one of the drive device systems 102 or the sensing device 104. If true, the method proceeds to A on FIG. 10.

Otherwise, at 408, the method determines whether there is a device connected to the drive coupler 110, such as another one of the drive device systems 102 or the receiver 109. If true, the method proceeds to B on FIG. 11.

At 410, the method determines whether there is a partial connection, such that a device is not completely coupled to and in communication with the communication terminals 161 or the communication terminals 174. If true, at 412, the method outputs the status light control data 328, which indicates that there is a partial connection. The method loops to 406.

Otherwise, at 414, the method outputs the status light control data 328, which indicates that there is no device connected. At 416, the method determines whether input data has been received, such as from the human-machine interface 120, the remote control 106 or the personal electronic device 108. If input data has been received, the method proceeds to 418. Otherwise, the method loops.

At 418, the method queries the motor datastore 310. The method determines the output speed for the motor 116 based on the output speed received for the drive terminal connector 152 in the input data and determines whether the output speed for the motor 116 is acceptable at 420. Stated another way, the method determines whether there is an associated output speed for the motor 116 based on the received input speed for the drive terminal connector 152 and if the output speed for the motor 116 is acceptable based on the receiver data 343, if applicable. If the input speed for the drive terminal connector 152 is acceptable, such that there is a corresponding output speed for the motor 116 and the operation of the motor 116 is acceptable for the receiver 109, the method outputs the motor control data 342 at 422 and ends at 424. Otherwise, the method outputs the error data 330 at 426. At 427, the method determines whether an override request, or the override data 327 or the remote override data 527, has been received as input via the human-machine interface 120. If true, the method proceeds to 422. Otherwise, if false, the method proceeds to 428. At 428, the method determines whether new user input data has been received such as from the human-machine interface 120, the remote control 106 or the personal electronic device

108. For example, the method determines whether the user has modified the output speed for the drive terminal connector 152 based on the error data 330. If true, the method proceeds to C at 416. Otherwise, the method ends at 424.

From A on FIG. 10, the method outputs the status light control data 328, which indicates that there is a device connected at 430. At 432, the method determines whether the connected device control data 350 has been received. If false, the method loops.

At 434, the method determines whether input data has been received, such as from the human-machine interface 120, the remote control 106 or the personal electronic device 108. If input data has been received, the method proceeds to 436. Otherwise, the method loops.

At 436, the method queries the motor datastore 310. The method determines the output speed for the motor 116 based on the output speed received for the drive terminal connector 152 in the input data and determines whether the output speed for the motor 116 is acceptable at 438. Stated another way, the method determines whether there is an associated output speed for the motor based on the received input speed for the drive terminal connector 152 and if the output speed for the motor 116 is acceptable based on the receiver data 343, if applicable. If the input speed for the drive terminal connector 152 is acceptable, such that there is a corresponding output speed for the motor 116 and the operation of the motor 116 is acceptable for the receiver 109, the method outputs the motor control data 342 at 440 and ends at 442. Otherwise, the method outputs the error data 330 at 444. At 445, the method determines whether an override request, or the override data 327 or the remote override data 527, has been received. If true, the method proceeds to 440. Otherwise, if false, the method proceeds to 445. At 445, the method determines whether new user input data has been received such as from the human-machine interface 120, the remote control 106 or the personal electronic device 108. For example, the method determines whether the user has modified the output speed for the drive terminal connector 152 based on the error data 330. If true, the method proceeds to D at 434. Otherwise, the method ends at 442.

From B on FIG. 11, the method outputs the status light control data 328, which indicates that the drive device system 102 is connected to a device at 450. At 452, the method determines whether the connected device input data 348 has been received. If false, the method loops.

At 454, the method queries the motor datastore 310. The method determines the output speed for the motor 116 based on the output speed received for the drive terminal connector 152 in the connected device control data 350 and determines whether the output speed for the motor 116 is acceptable. Stated another way, the method determines whether there is an associated output speed for the motor based on the received speed for the drive terminal connector 152 and if the output speed for the motor 116 is acceptable based on the receiver data 343, if applicable. If the speed for the drive terminal connector 152 is acceptable, such that there is a corresponding output speed for the motor 116 and the operation of the motor 116 is acceptable for the receiver 109, the method outputs the motor control data 342 at 456 and ends at 458. Otherwise, the method outputs the error data 330 at 460 and ends at 458.

Figure 12A:
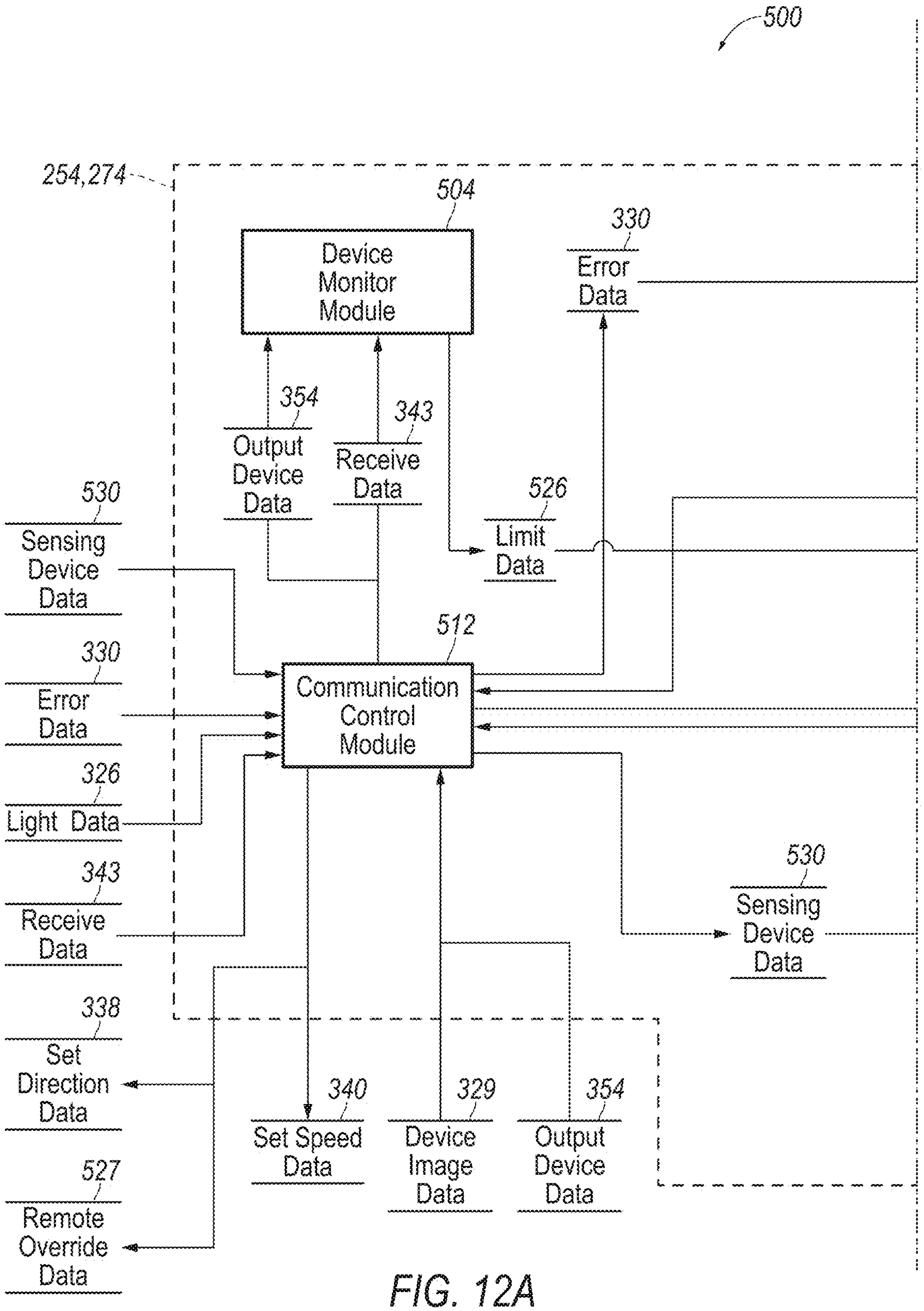
FIGS. 12A and 12B are a dataflow diagram illustrating a remote control system of the system of FIG. 1, in accordance with various examples.
Figure 12B:
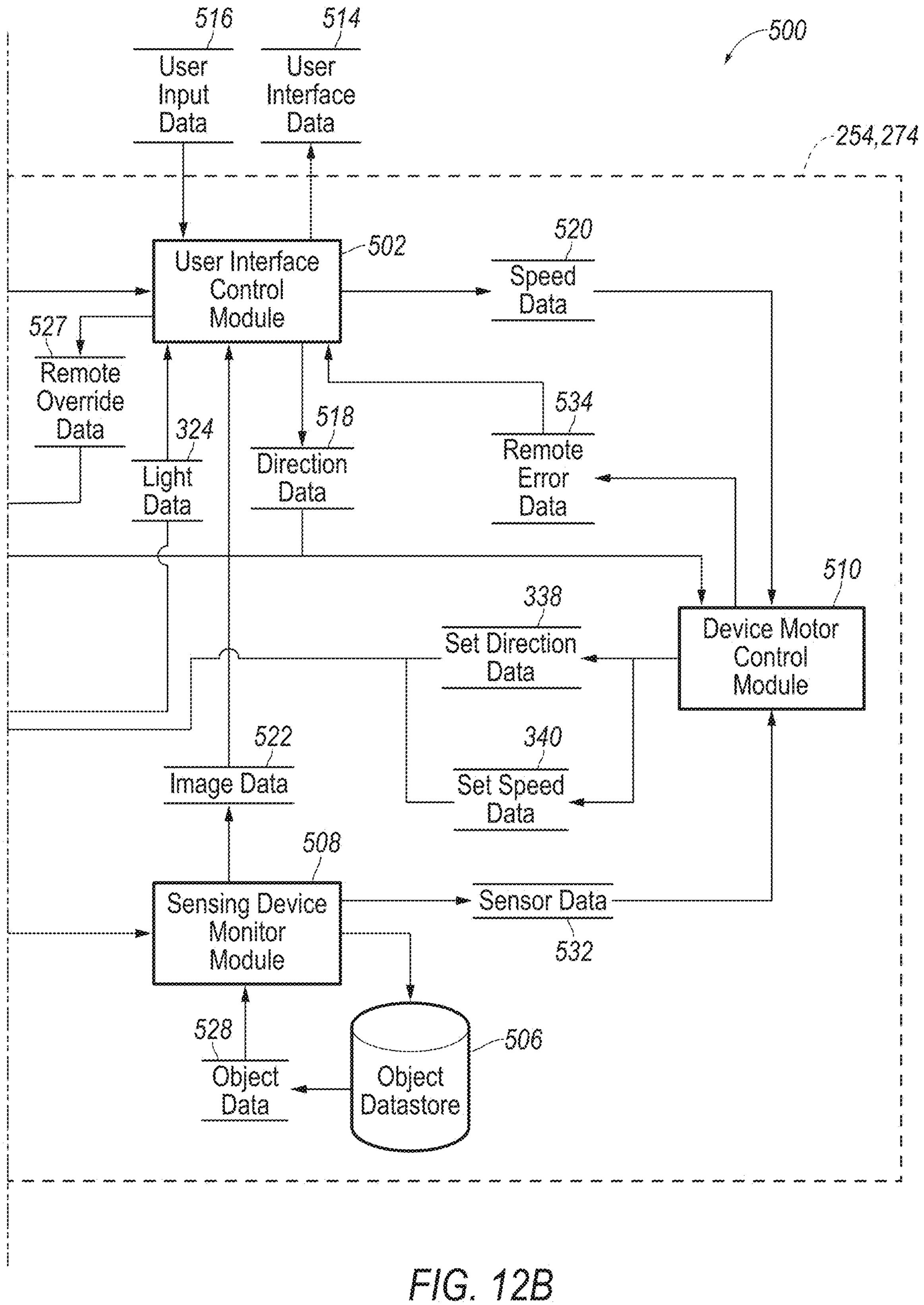

As shown in more detail with regard to FIGS. 12A and 12B and with continued reference to FIGS. 1-10, a dataflow diagram illustrates various examples of a remote control system 500, which may be embedded within the remote controller 254 and the personal controller 274. Various examples of the remote control system 500 according to the present disclosure can include any number of sub-modules embedded within the remote controller 254 and the personal controller 274. As can be appreciated, the sub-modules shown in FIGS. 12A and 12B can be combined and/or further partitioned to similarly control the drive device system 102 by the remote control 106 or the personal electronic device 108. Inputs to the remote control system 500 may be received from the remote human-machine interface 250 (FIG. 1), the personal human-machine interface 270 (FIG. 1), the sensing device 104 (FIG. 1), received from other control modules (not shown) associated with the remote control 106 and the personal electronic device 108, and/or determined/modeled by other sub-modules (not shown) within the remote controller 254 and the personal controller 274. In various examples, the remote control system 500 includes a user interface control module 502, a device monitor module 504, an object datastore 506, a sensing device manager module 508, a device motor control module 510 and a communication control module 512.

The user interface control module 502 outputs user interface data 514. The user interface data 514 comprises data for the rendering on the remote human-machine interface 250 or the personal human-machine interface 270 a user interface, such as a graphical user interface, which enables a user to interact with the drive device system 102.

The user interface control module 502 receives as input user input data 516. The user input data 516 comprises data generated by a user's interaction with the remote human-machine interface 250 or the personal human-machine interface 270. The user interface control module 502 processes the user input data 516 and sets direction data 518 and speed data 520 for the device motor control module 510. The user input data 516 may also include a mode of operation for the motor 116. The direction data 518 comprises data of a direction of rotation for the drive terminal connector 152 input by the user, such as clockwise or counterclockwise. The speed data 520 comprises a speed of rotation for the drive terminal connector 152 input by the user. The user interface control module 502 may also set the mode of operation for the motor 116 for the device motor control module 510. The user interface control module 502 also processes the user input data 516 and sets the light data 324 for the communication control module 512. The user input data 516 may also comprise an override request. Based on the override request, the user interface control module 502 sets the remote override data 527 for the communication control module 512.

The user interface control module 502 also receives as input the error data 330 and remote error data 534. Based on the error data 330 and/or the remote error data 534, the user interface control module 502 may output a graphic and/or textual error message with the user interface data 514 for rendering the error data 330 and/or the remote error data 534 on the remote human-machine interface 250 or the personal human-machine interface 270. The remote error data 534 comprises data indicating an error with the input speed for the drive terminal connector 152 or the direction of rotation provided via the user input data 516.

The user interface control module 502 also receives as input image data 522. The image data 522 may comprise an image data stream from the sensing device 104 coupled to the drive device system 102 for example. Based on the image data 522, the user interface control module 502 may output the user interface data 514 for rendering the image data 522 on the remote human-machine interface 250 or the personal human-machine interface 270.

The user interface control module 502 also receives as input the device image data 329. Based on the device image data 329, the user interface control module 502 may output the user interface data 514 for rendering the device image data 329 on the remote human-machine interface 250 or the personal human-machine interface 270.

The device monitor module 504 receives as input the output device data 354. The device monitor module 504 processes the output device data 354. For example, the device monitor module 504 processes the output device data 354 and determines whether there are any limits associated with the operation of the drive device system 102, such as a maximum speed for the drive terminal connector 152. The device monitor module 504 also receives as input the receiver data 343. The device monitor module 504 processes the receiver data 343 and determines whether there are any limits associated with the operation of the receiver 109 or the object coupled to the receiver 109. The device monitor module 504 sets the determined limits as limit data 526 for the device motor control module 510. The limit data 526 comprises data of any limits associated with the operation of the drive device system 102 and the receiver 109 in communication with the remote control 106 or the personal electronic device 108. In the example of the object as an office chair, the limit data may include limits as to an amount of rotation of the wheels of the office chair per second, for example, about positive or negative 20 degrees of rotation per second. In the example of the object as a ceiling fan, the limit data may include limits as to a maximum speed of rotation for the ceiling fan motor per minute, for example, about positive or negative 1000 revolutions per minute.

The object datastore 506 stores data associated with objects identified by the sensing device 104 or object data 528. For example, the object datastore 506 stores one or more images that correspond to an object detected by the sensor 230 of the sensing device 104. The images in the object datastore 506 permit the sensing device manager module 508 to identify objects in the sensor signals from the sensor 230 by comparing boundaries in the sensor signals to the object data 528. It should be noted that various other techniques may be used by the sensing device manager module 508 to determine whether an object is present in the sensor signals or data stream from the sensor 230. The object data 528 comprises predefined, factory set values.

The sensing device manager module 508 receives as input sensing device data 530. The sensing device data 530 comprises sensor signals or a data stream from the sensor 230 of the sensing device 104. The sensing device manager module 508 processes the sensing device data 530, and if applicable, compares the boundaries in the sensing device data 530 to the object data 528 to determine whether one or more objects are in the field of view of the sensor 230. If the sensing device manager module 508 determines one or more objects are in the field of view of the sensor 230, the sensing device manager module 508 sets sensor data 532 for the device motor control module 510. The sensor data 532 comprises data of the objects in the field of view of the sensor 230, which may include a coordinate location, such as global coordinate location or a coordinate location relative to the sensor 230, for example. In the instance of the sensor 230 as an optical or thermal camera, the sensing device manager module 508 also sets the image data 522 for the user interface control module 502.

The device motor control module 510 receives as input the direction data 518, the speed data 520, the limit data 526 and the sensor data 532. The device motor control module 510 processes the limit data 526 and determines if the direction data 518 is within the limit for the operation of the drive terminal connector 152, the receiver 109 and the object associated with the receiver 109. If the direction data 518 is within the acceptable limit, the device motor control module 510 also processes the sensor data 532 and determines whether the direction data 518 may result in collision with an identified object. If no object avoidance is needed and the direction data 518 is within the acceptable limit, the device motor control module 510 sets the set direction data 338 for the communication control module 512. If the direction data 518 is outside of the acceptable limits or avoidance of a detected object is needed, the device motor control module 510 sets the remote error data 534 for the user interface control module 502.

The device motor control module 510 also processes the limit data 526 and determines if the speed data 520 is within the limit for the operation of the drive terminal connector 152, the receiver 109 and the object associated with the receiver 109. If the speed data 520 is within the acceptable limit, the device motor control module 510 also processes the sensor data 532 and determines whether the speed data 520 may result in collision with an identified object. If no object avoidance is needed and the speed data 520 is within the acceptable limit, the device motor control module 510 sets the set speed data 340 for the communication control module 512. If the speed data 520 is outside of the acceptable limits or avoidance of a detected object is needed, the device motor control module 510 sets the remote error data 534 for the user interface control module 502.

The communication control module 512 receives as input the light data 324, the set direction data 338 and the set speed data 340. The communication control module 512 outputs the light data 324, the set direction data 338 and the set speed data 340 for the controller 124.

The communication control module 512 receives as input the output device data 354 from the communication system 122 of the drive device systems 102. The communication control module 512 sets the output device data 354 for the device monitor module 504. The communication control module 512 receives as input the device image data 329 and the error data 330 from the communication system 122. The communication control module 512 sets the device image data 329 and the error data 330 for the user interface control module 502.

The communication control module 512 also receives as input the sensing device data 530 from the sensor 230 of the sensing device 104. The communication control module 512 sets the sensing device data 530 for the sensing device manager module 508.

The communication control module 512 also receives as input the remote override data 527 from the user interface control module 502. The communication control module 512 outputs the remote override data 527 for the communication system 122 of the drive device system 102.

Figure 13A:
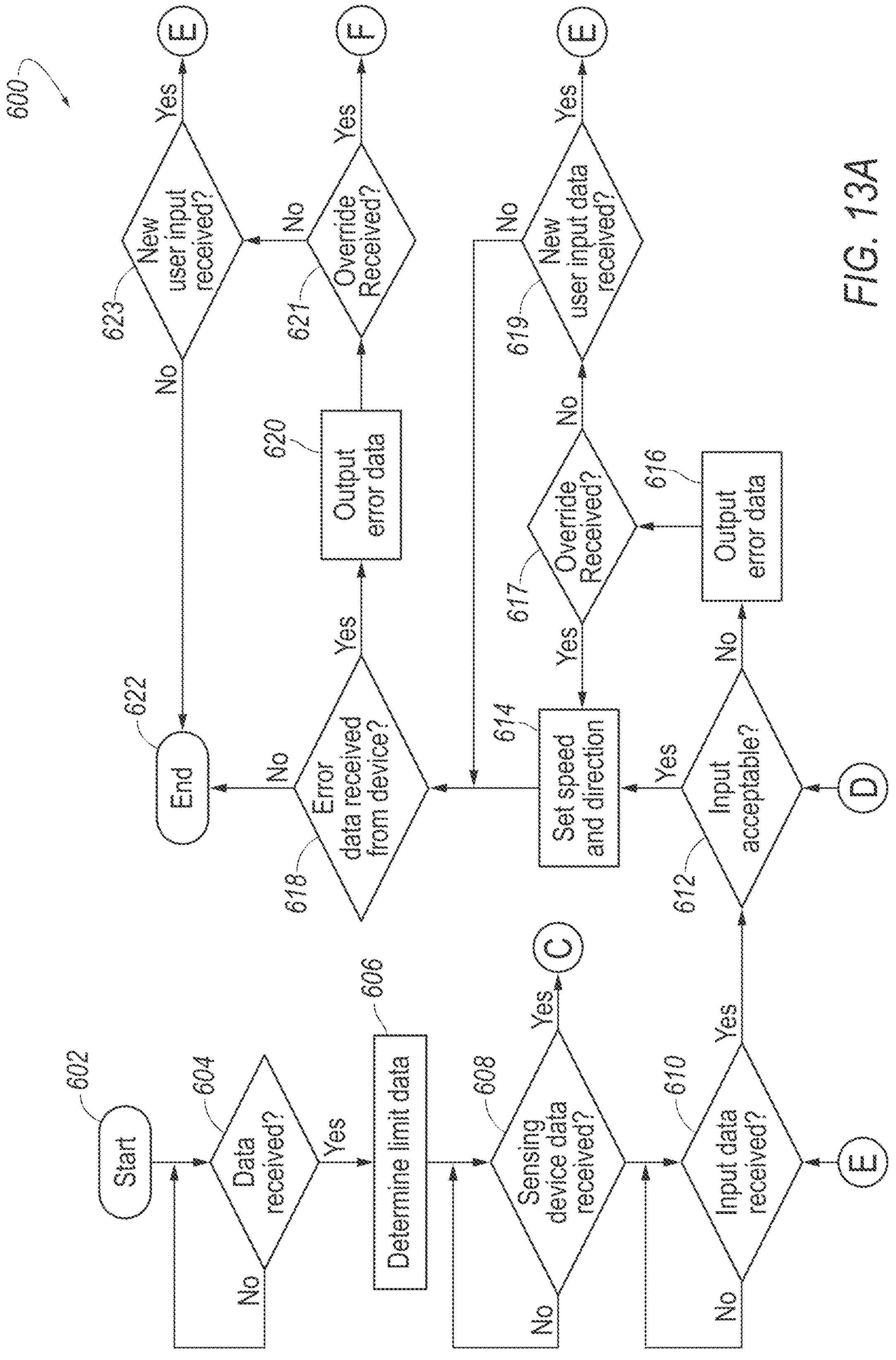
FIGS. 13A and 13B are flowcharts illustrating a method for the remote control system, in accordance with various examples.
Figure 13B:
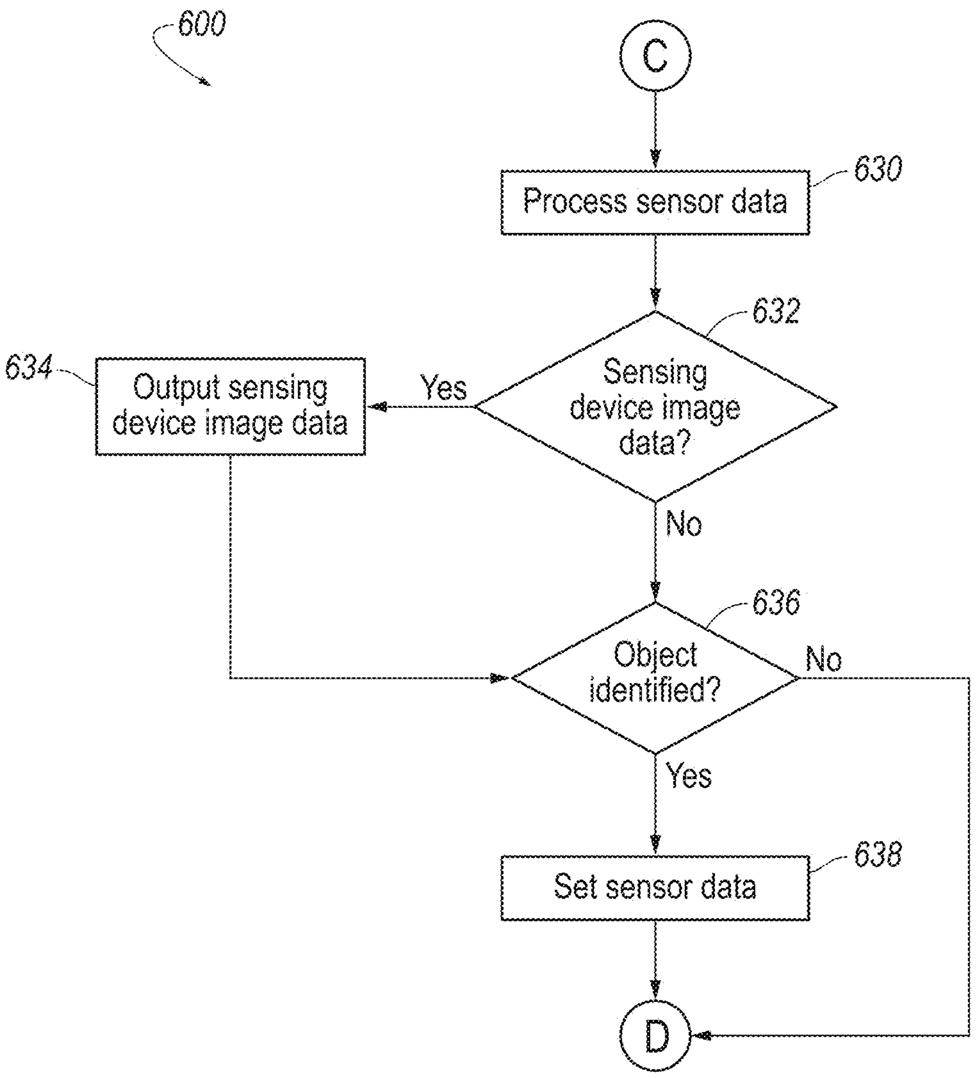

Referring now to FIGS. 13A and 13B, and with continued reference to FIGS. 1-11, a flowchart illustrates a method 600 that can be performed by the remote control system 500 of FIGS. 12A and 12B in accordance with the present disclosure. In one example, the method 600 is performed by the processor 266 of the remote controller 254 or the processor 286 of the personal controller 274. As can be appreciated in light of the disclosure, the order of operation within the method 600 is not limited to the sequential execution as illustrated in FIGS. 13A and 13B but may be performed in one or more varying orders as applicable and in accordance with the present disclosure. In various examples, the method

600 may run based on an activation or powering on of the remote control 106 or the personal electronic device 108.

The method begins at 602 on FIG. 13A. At 604, the method determines whether the output device data 354 has been received and whether receiver data 524 has been received. If the output device data 354 has not been received, the method loops.

Otherwise, at 606, the method determines the limit data 526 based on the output device data 354 and the receiver data 524, if applicable. At 608, the method determines whether the sensing device data 530 has been received. If true, the method proceeds to C on FIG. 13B.

Otherwise, at 610, the method determines whether input data has been received, such as from the remote human-machine interface 250 or the personal human-machine interface 270. If input data has been received, the method proceeds to 612. Otherwise, the method loops.

At 612, the method determines whether the direction data 518 and the speed data 520 are within the limit data 526 such that the direction data 518 and the speed data 520 are acceptable values for the operation of the drive device system 102 and the receiver 109. The method also determines, based on the sensor data 532, whether the direction data 518 and the speed data 520 are acceptable or if one or more of the direction data 518 and the speed data 520 need to be modified to avoid an object. If true, at 614, the method outputs the set direction data 338 and the set speed data 340 for transmitting to the communication system 122 via the remote communication system 252 or the personal communication system 272.

Otherwise, at 616, the method outputs the remote error data 534 for rendering with the user interface data 514 on the remote human-machine interface 250 or the personal human-machine interface 270. At 617, the method determines whether an override request has been received or whether override data 327 or remote override data 527 has been received as input. If true, the method proceeds to 614. Otherwise, if false, the method proceeds to 619. At 619, the method determines whether new user input data has been received such as from the human-machine interface 120, the remote control 106 or the personal electronic device 108. For example, the method determines whether the user has modified the direction data 518 and the speed data 520 based on the error data 330. If true, the method proceeds to E at 610. Otherwise, the method proceeds to 618.

At 618, the method determines whether the error data 330 has been received via the remote communication system 252 or the personal communication system 272. If true, at 620, the method outputs the error data 330 for rendering with the user interface data 514 on the remote human-machine interface 250 or the personal human-machine interface 270. At 621, the method determines whether an override request has been received or whether override data 327 or remote override data 527 has been received as input. If true, the method proceeds to F at 614. Otherwise, if false, the method proceeds to 623. At 623, the method determines whether new user input data has been received such as from the human-machine interface 120, the remote control 106 or the personal electronic device 108. For example, the method determines whether the user has modified the direction data 518 and the speed data 520 based on the error data 330. If true, the method proceeds to E at 610. Otherwise, the method ends at 622.

From C on FIG. 13B, at 630, the method processes the sensing device data 530. In one example, the method determines boundaries in the data stream. At 632, the method determines whether the sensing device data 530 includes an image data stream. If true, at 634, the method outputs the image data 522 for rendering with the user interface data 514 on the remote human-machine interface 250 or the personal human-machine interface 270. At 636, the method queries the object datastore 506 and retrieves the object data 528. The method compares the boundaries in the data stream to the object data 528 and determines whether one or more objects exist in the field of view of the sensor 230. If true, the method sets the sensor data 532 for the device motor control module 510 including the identified objects at 638. The method proceeds to D on FIG. 13A.

Figure 14:
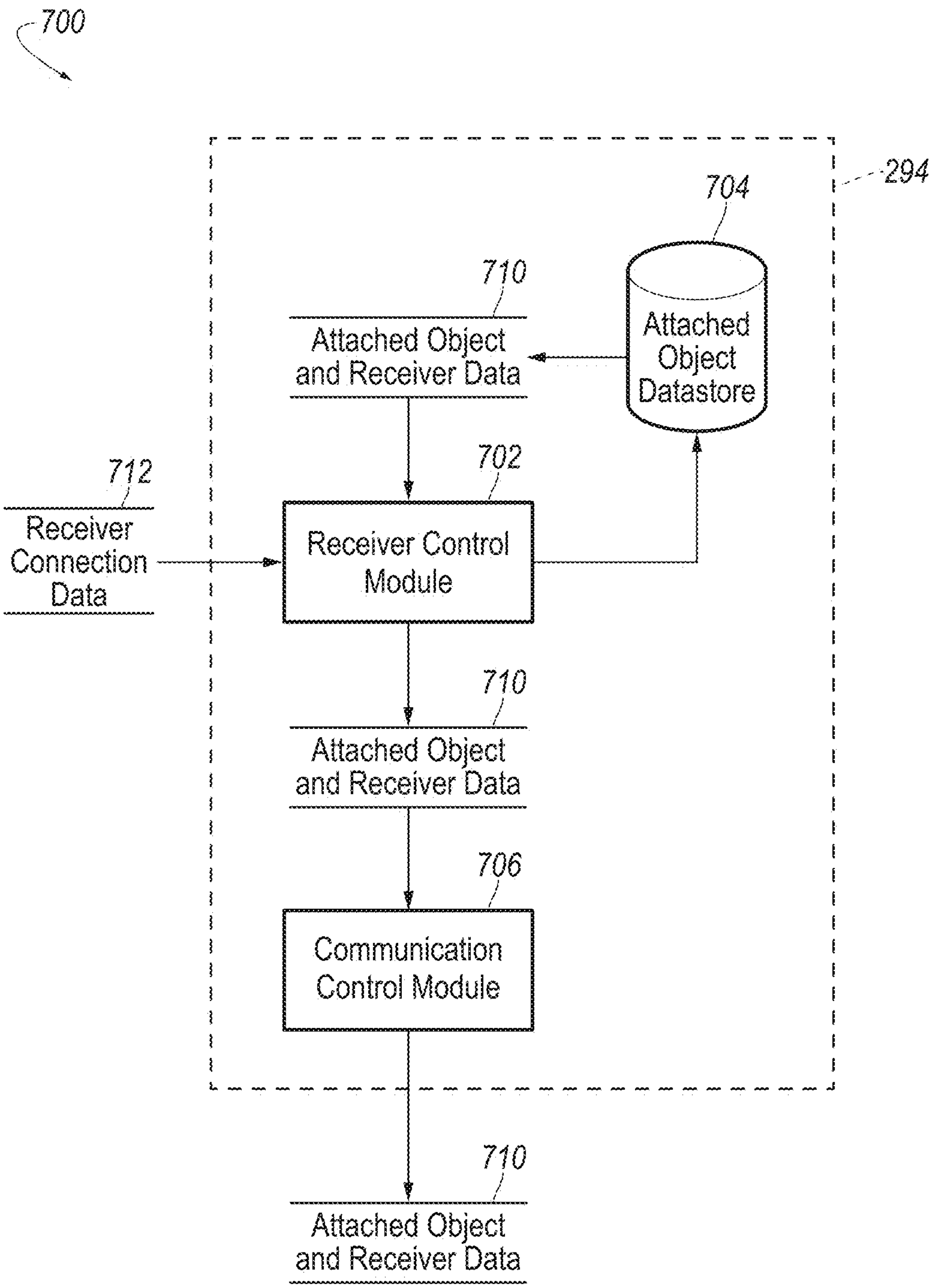
FIG. 14 is a dataflow diagram illustrating a receiver control system of the system of FIG. 1, in accordance with various examples.

As shown in more detail with regard to FIG. 14 and with continued reference to FIGS. 1-13B, a dataflow diagram illustrates various examples of a receiver control system 700, which may be embedded within the receiver controller 294. Various examples of the receiver control system 700 according to the present disclosure can include any number of sub-modules embedded within the receiver controller 294. As can be appreciated, the sub-modules shown in FIG. 14 can be combined and/or further partitioned to similarly control the receiver 109. Inputs to the receiver control system 700 may be received from the drive device system 102 (FIG. 1), received from other control modules (not shown) associated with the receiver 109, and/or determined/modeled by other sub-modules (not shown) within the receiver controller 294. In various examples, the receiver control system 700 includes a receiver monitor module 702, an attached object datastore 704 and a communication control module 706.

The attached object datastore 704 stores data regarding one or more characteristics associated with the object to be attached to the receiver 109 and the receiver 109. For example, the attached object datastore 704 stores identification data and limit data associated with the attached object and the receiver 109, or simply, the attached object datastore 704 stores attached object and receiver data 710. The attached object and receiver data 710 includes the identification data, which comprises a unique identifier associated with the receiver 109 such that the drive device system 102, the remote control 106 and/or the personal electronic device 108 may identify the receiver 109. In certain instances, the identification data may also include a key or the like to enable the drive device system 102, the remote control 106 and/or the personal electronic device 108 to communicate with the receiver 109 securely. The attached object and receiver data 710 also includes object identification data, which comprises an identifier associated with the attached object such that the drive device system 102, the remote control 106 and/or the personal electronic device 108 may identify the attached object. The attached object and receiver data 710 also includes limit data, which comprises one or more limits associated with the receiver 109 and/or the attached object itself, such as an amount of rotation, an amount of rotation speed, an amount of vertical position change, and the like. The attached object and receiver data 710 may also include performance parameters associated with the object, which may be specific to one or more functions of the object, such as an amount of acceptable rotation (the object may be spun forward and backward, but not about 360 degrees), a rotation limit (the object may only rotate up to about 45 degrees), a travel limit (the object may only be lifted about 6 inches), a pressure range (the object may be inflated between about 32 to about 35 pounds per square inch), etc. The attached object and receiver data 710 are predefined, factory set values.

The receiver monitor module 702 receives as input receiver connection data 712. The input receiver connection data 712 comprises data regarding whether another one of the drive device systems 102 and/or the sensing device 104 is coupled to the receiver coupler 290. For example, the input receiver connection data 712 may be generated based on contact and communication between the communication terminals 161 and the communication terminals 297 of the receiver 109; contact between the communication terminals 297 and the one or more communication contacts 240 of the sensing device 104; etc. Based on the input receiver connection data 712, the receiver monitor module 702 queries the attached object datastore 704 and retrieves the attached object and receiver data 710. The receiver monitor module 702 sets the attached object and receiver data 710 for the communication control module 706.

The communication control module 706 receives as input the attached object and receiver data 710. The communication control module 706 outputs the attached object and receiver data 710 for the communication system 122 of the drive device system 102, the sensing communication system 232 of the sensing controller 234, the remote communication system 252 of the remote controller 254 and/or the personal communication system 272 of the personal controller 274.

Figure 15:
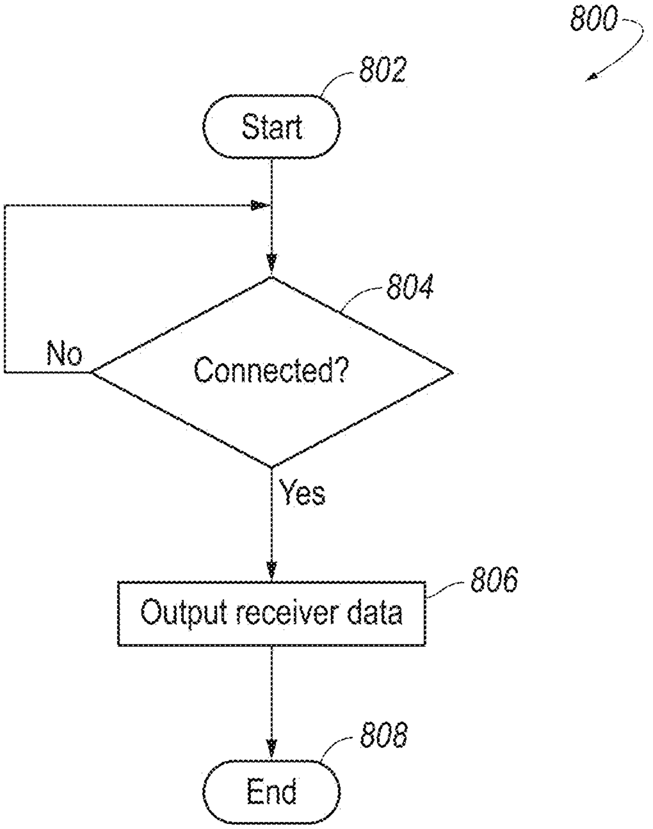
FIG. 15 is a flowchart illustrating a method for the receiver control system, in accordance with various examples.

Referring now to FIG. 15, and with continued reference to FIGS. 1-14, a flowchart illustrates a method 800 that can be performed by the receiver control system 700 of FIG. 14 in accordance with the present disclosure. In one example, the method 800 is performed by the processor 298 of the receiver controller 294. As can be appreciated in light of the disclosure, the order of operation within the method 800 is not limited to the sequential execution as illustrated in FIG. 15 but may be performed in one or more varying orders as applicable and in accordance with the present disclosure. In various examples, the method 800 may run based on the coupling of an object to the receiver 109.

The method begins at 802. At 804, the method determines whether the receiver 109 is connected to the drive device system 102 or the sensing device 104. If false, the method loops. Otherwise, at 806, the method outputs the attached object and receiver data 710 to the communication system 122 of the drive device system 102, the sensing communication system 232 of the sensing controller 234, the remote communication system 252 of the remote controller 254 and/or the personal communication system 272 of the personal controller 274. The method ends at 808.

Figure 16:
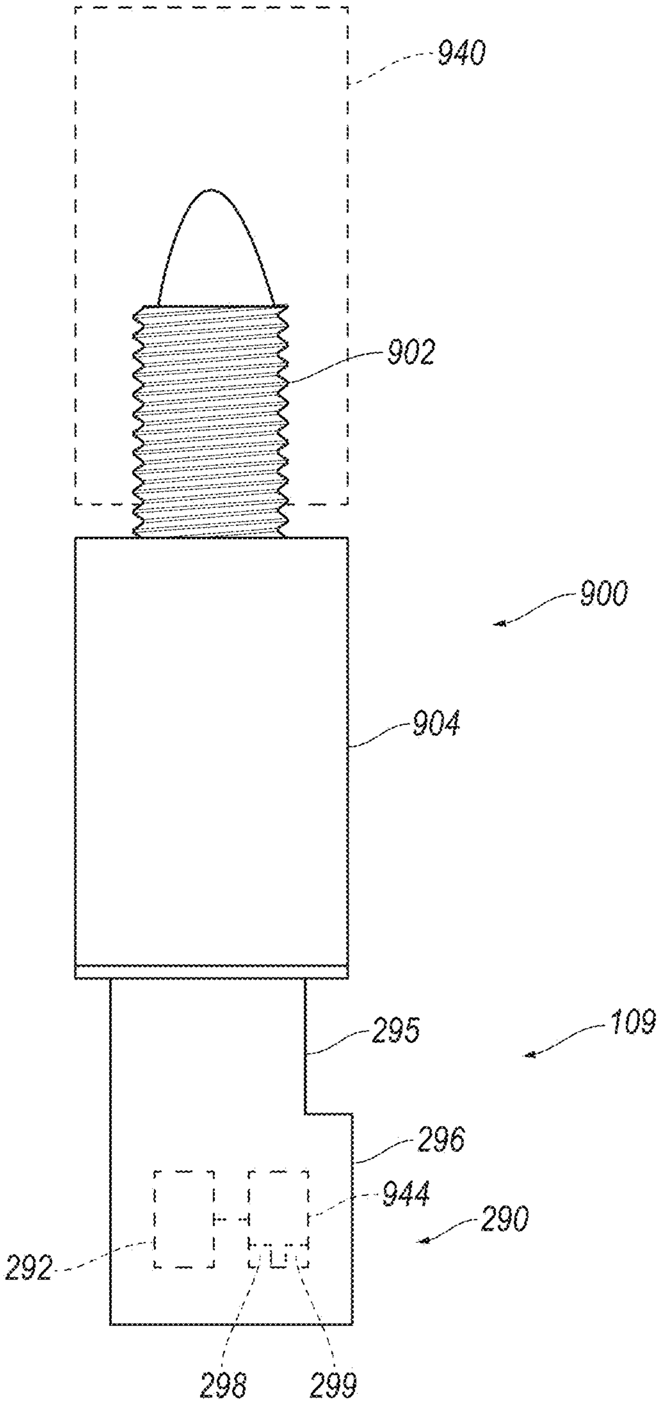
FIG. 16 is a side view of a receiver for coupling to an object in accordance with various examples.

In one example, with reference to FIG. 16, an example object 900 having the receiver 109 is shown. It should be noted that the receiver 109 illustrated and described herein is merely an example, as the receiver 109 may have any desired shape and configuration to receive and drive an object. In this example, the object 900 comprises a lead screw, which can be coupled to various other objects, such as a first object 940. The object 900 includes a threaded screw 902, which may extend beyond a housing 904 for coupling to other objects, such as the first object 940. In one example, the first object 940 includes, but is not limited to, a microphone stand, a pole, a small appliance, a winch, a power tool, a fishing pole, a camping tool, a mobile robot, furniture, a bed, an outboard motor and the like.

Figure 17:
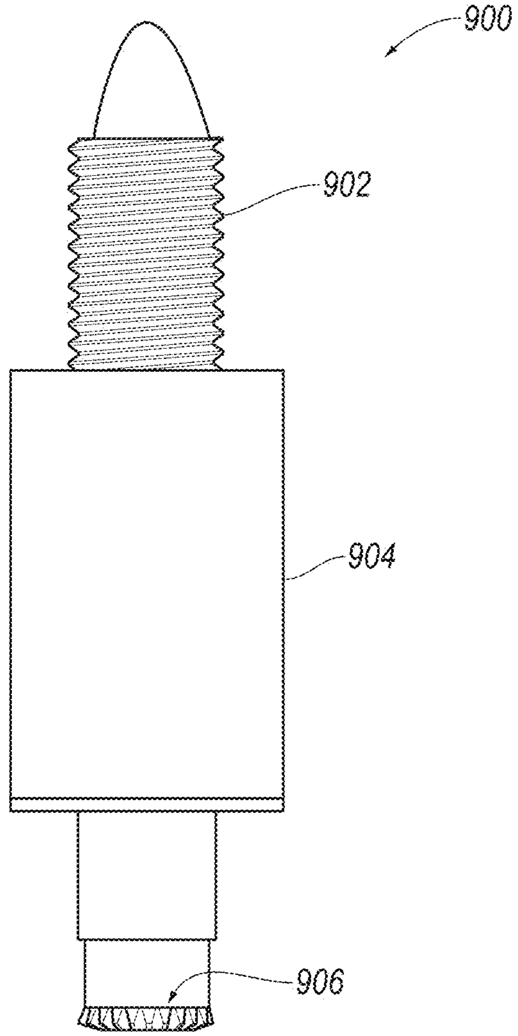
FIG. 17 is a front view of the object of FIG. 16.

The threaded screw 902 and the housing 904 may be composed of any suitable material, such as a polymer-based material, metal or metal alloy. With reference to FIG. 17, the threaded screw 902 may have any desired thread pattern for engagement with other objects. In this example, the threaded screw 902 includes a gear 906, such as a bevel gear, at one end. The gear 906 cooperates with the receiver 109 to enable the receiver 109 to drive the threaded screw 902 to advance and retract the threaded screw 902 relative to the housing 904.

Figure 18:
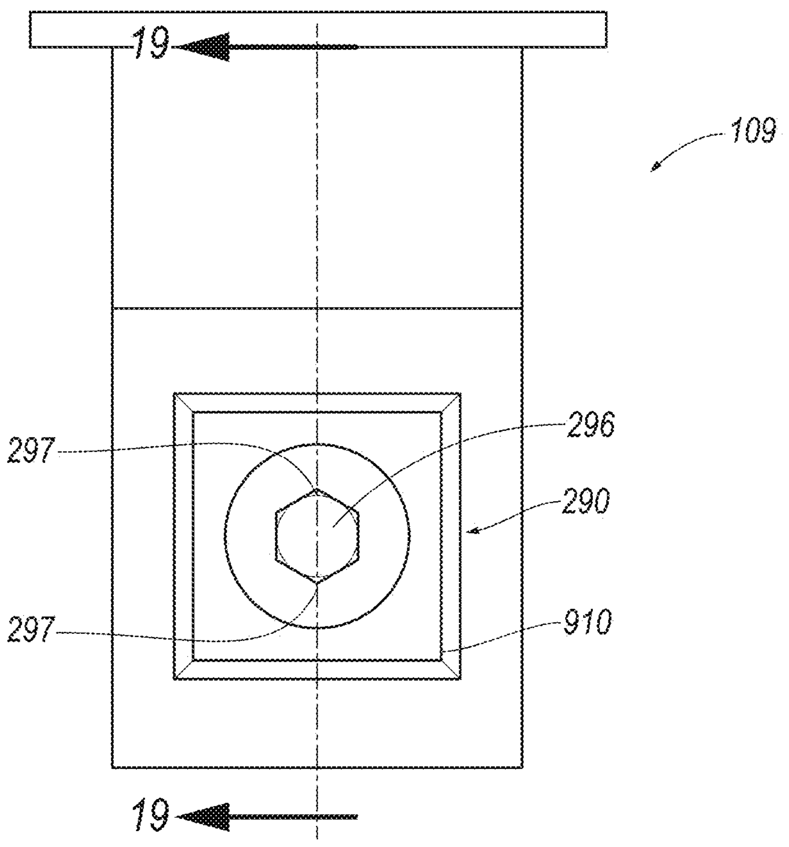
FIG. 18 is a front view of the receiver of FIG. 16.

In this example, with reference to FIG. 18, the receiver coupler 290 of the receiver 109 is substantially rectangular and defines a receiver receptacle 910, which is configured to mate with the drive coupler 110 of the drive device system 102. As described, the receiver terminal end 296 comprises the socket, which receives the drive terminal connector 152 of the drive device system 102. The communication terminals 297 are electrically or magnetically coupled to the communication terminals 161 of the drive coupler 110 when the drive coupler 110 is coupled to the receiver 109. The receiver coupler 290 may include a chamfer or the like to assist in directing the drive coupler 110 into engagement with the receiver 109.

Figure 19:
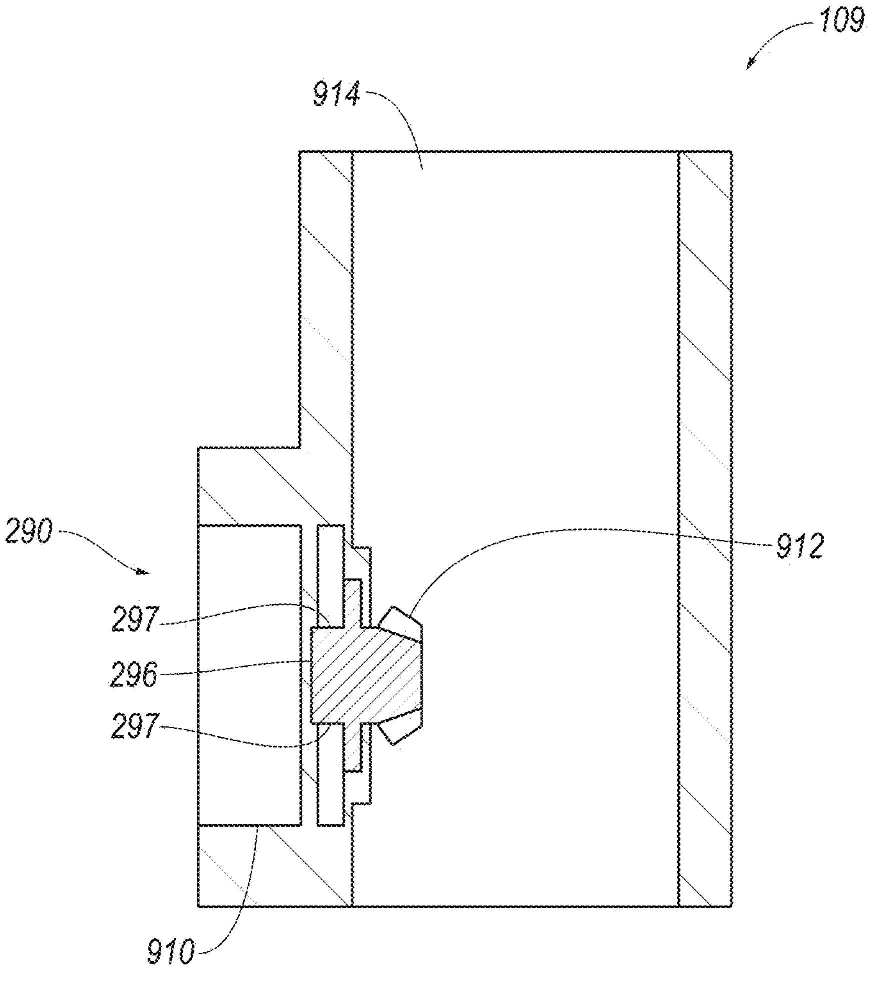
FIG. 19 is a cross-sectional view of the receiver, taken along line A-A of FIG. 18.
Figure 20:
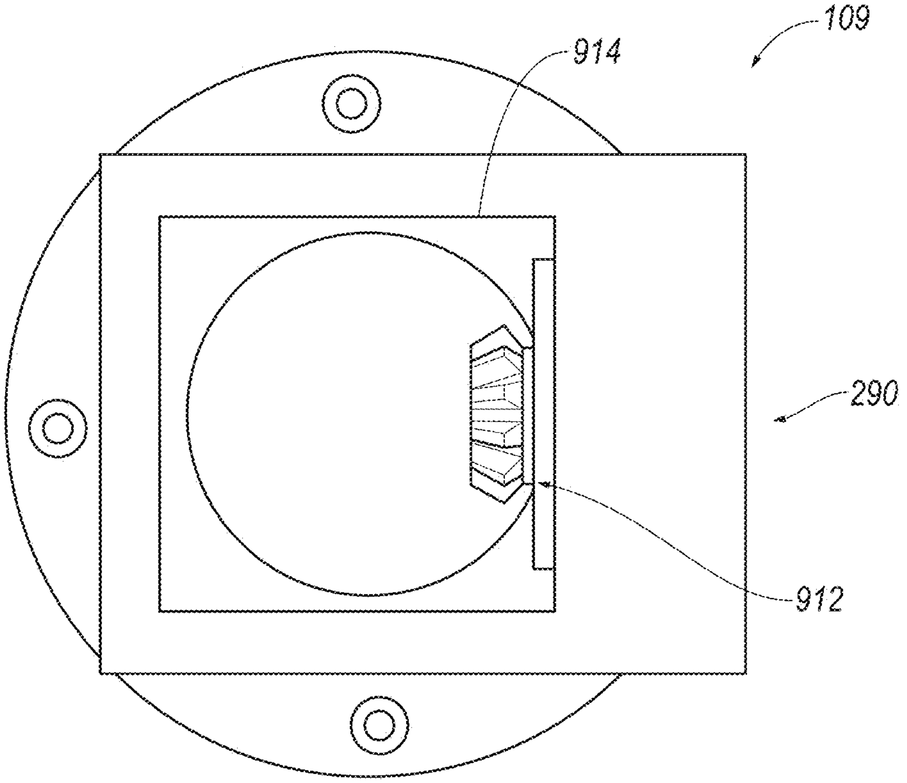
FIG. 20 is a top view of the receiver of FIG. 16.

With reference to FIG. 19, a cross-section of the receiver 109 is shown. In this example, the receiver 109 includes a driving gear 912, which is coupled to or integrally formed with the receiver terminal end 296. The driving gear 912 transfers torque received at the receiver terminal end 296 to the object coupled to the receiver 109. In this example, with reference to FIG. 20, the receiver 109 defines a coupling slot 914, which is configured to receive an object to couple the object to the receiver 109. The driving gear 912 extends into the coupling slot 914 to enable the object to be driven by the driving gear 912. In the example of the object as the lead screw, the end of the threaded screw 902 may be received within the coupling slot 914 such that the gear 906 matingly engages with the driving gear 912 to enable input received to the receiver terminal end 296 to drive the threaded screw 902 relative to the housing 904. Stated another way, the receiver 109 may change the position of the threaded screw 902 when coupled to the drive device system 102.

Figure 21:
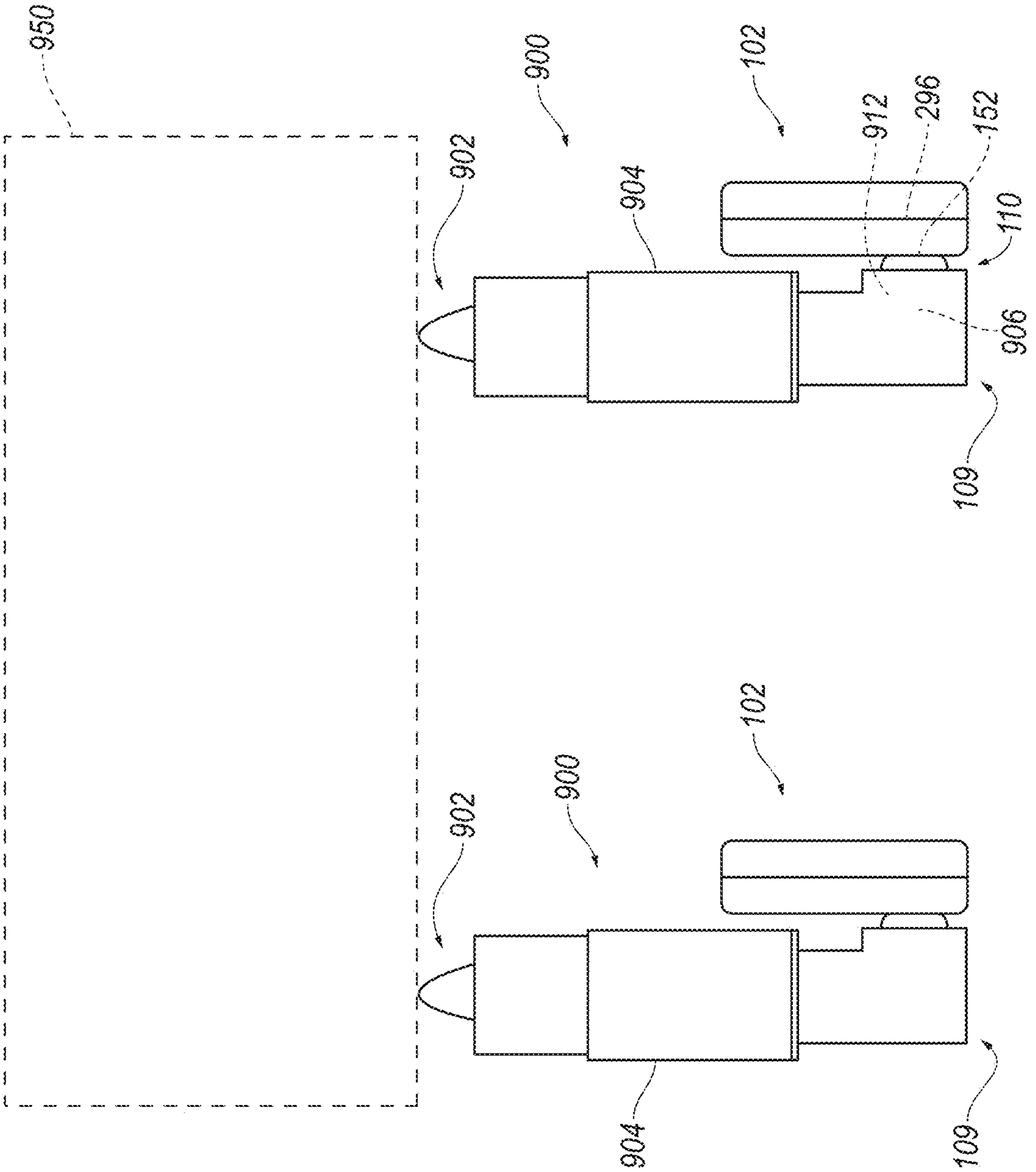
FIG. 21 is a schematic illustration of a second object coupled to the object and receiver of FIG. 16 and driven by the drive device system to change a position of the second object.

With reference to FIG. 21, as discussed, the threaded screw 902 and the receiver 109 may be coupled to a second object 950 to move or change the position of the second object 950. In this example, a pair of the threaded screws 902 are coupled to a respective one of a pair of the receivers 109, and a respective one of a pair of the drive device systems 102 is coupled to each of the receivers 109. The drive terminal connector 152 of each of the drive device systems 102 is coupled to the receiver terminal end 296, and the gear 906 of the threaded screw 902 is coupled to the driving gear 912 such that a torque applied by the drive terminal connector 152 to the receiver terminal end 296 transfers via the driving gear 912 and the gear 906 to move or change the position of the threaded screw 902, and the second object 950 coupled to the threaded screw 902, relative to the housing 904. In one example, the second object 950 includes, but is not limited to a bicycle, a scooter, a do-it-yourself hobby project, a dolly, a ladder or the like. In this example, the receivers 109 may be used to rotate and/or lift the second object 950.

Figure 22:
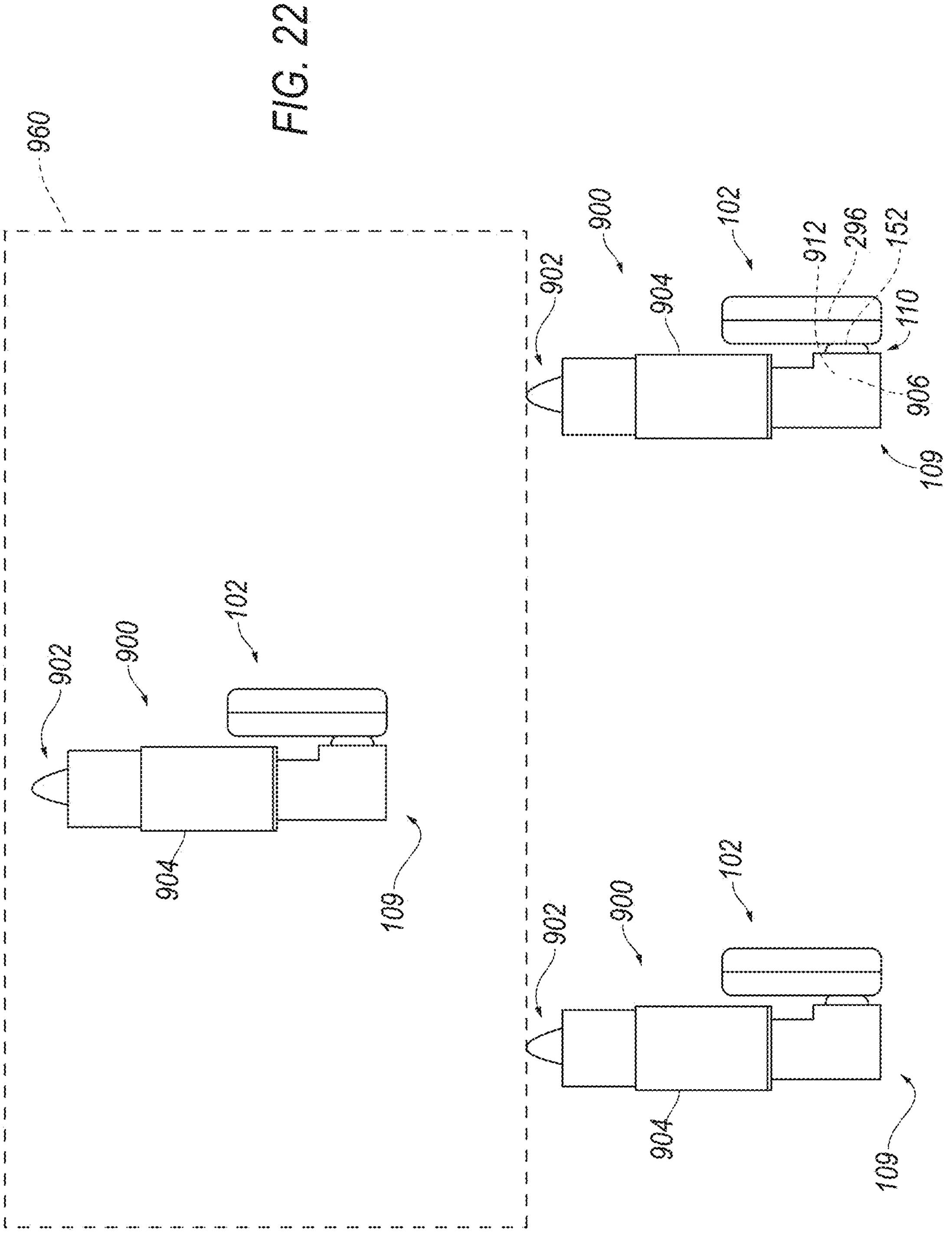
FIG. 22 is a schematic illustration of a third object coupled to the object and receiver of FIG. 16 and driven by the drive device system to change a position of the third object.

With reference to FIG. 22, a plurality of the threaded screws 902 and the receivers 109 may be coupled to a third object 960 to move or change the position of the third object 960. In this example, three of the threaded screws 902 are coupled to a respective one of three of the receivers 109, and a respective one of three of the drive device systems 102 is coupled to each of the receivers 109. The drive terminal connector 152 of each of the drive device systems 102 is coupled to the receiver terminal end 296, and the gear 906 of the threaded screw 902 is coupled to the driving gear 912 such that a torque applied by the drive terminal connector 152 to the receiver terminal end 296 transfers via the driving gear 912 and the gear 906 to move or change the position of the threaded screw 902, and the third object 960 coupled to the threaded screw 902, relative to the housing 904. In one example, the third object 960 includes, but is not limited to a wheelbarrow, a golf bag, a golf cart, a do-it-yourself hobby project, a camera tripod or the like. In this example, the receivers 109 may be used to rotate and/or lift the third object 960.

Figure 23:
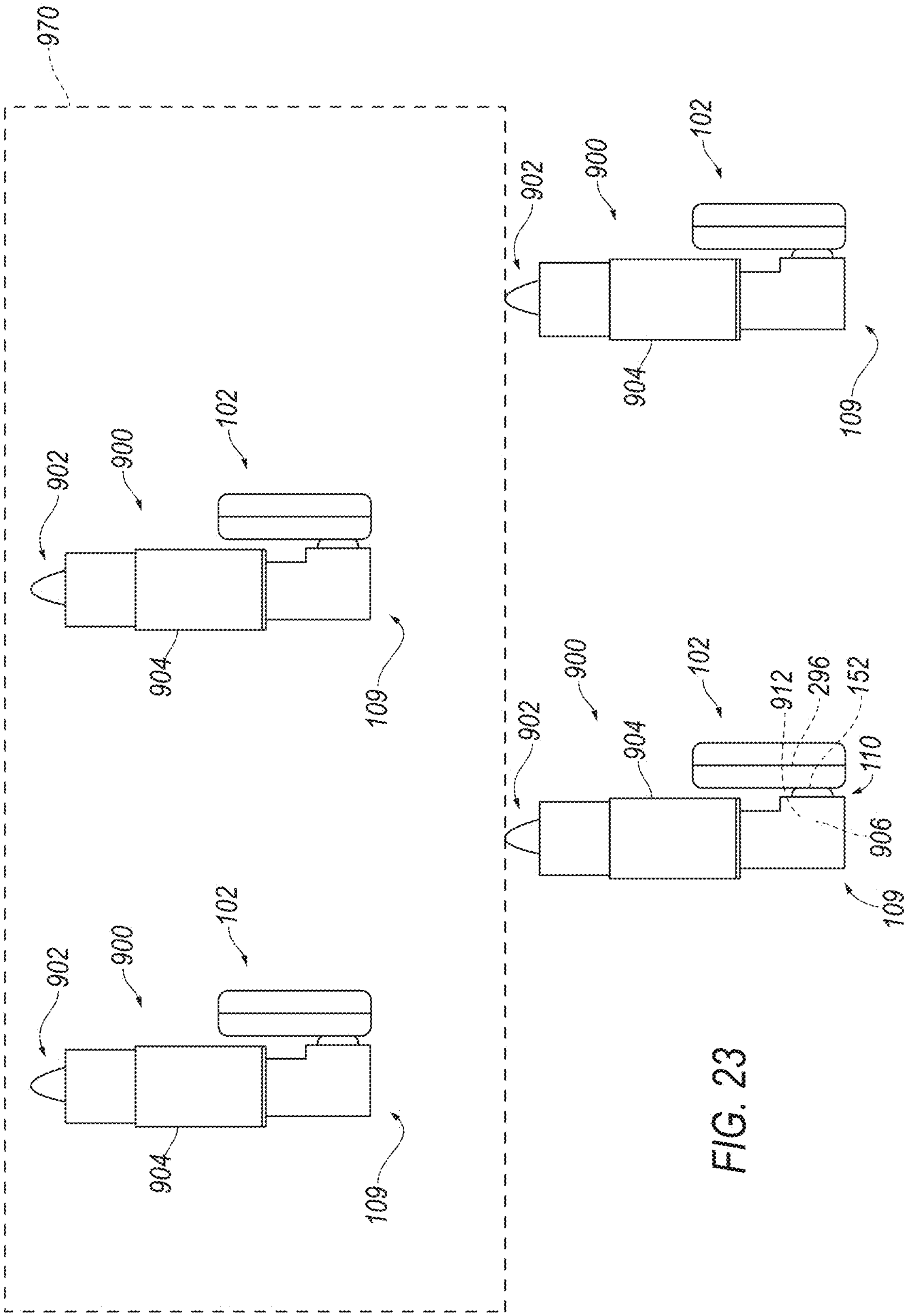
FIG. 23 is a schematic illustration of a fourth object coupled to the object and receiver of FIG. 16 and driven by the drive device system to change a position of the fourth object.

With reference to FIG. 23, a plurality of the threaded screws 902 and the receivers 109 may be coupled to a fourth object 970 to move or change the position of the fourth object 970. In this example, four of the threaded screws 902 are coupled to a respective one of four of the receivers 109, and a respective one of four of the drive device systems 102 is coupled to each of the receivers 109. The drive terminal connector 152 of each of the drive device systems 102 is coupled to the receiver terminal end 296, and the gear 906 of the threaded screw 902 is coupled to the driving gear 912 such that a torque applied by the drive terminal connector 152 to the receiver terminal end 296 transfers via the driving gear 912 and the gear 906 to move or change the position of the threaded screw 902, and the fourth object 970 coupled to the threaded screw 902, relative to the housing 904. In one example, the fourth object 970 includes, but is not limited to a skateboard, a scooter, a walker, a do-it-yourself hobby project, a stroller, a cart, a wheelchair, a lawnmower, a snowblower, a cooler, a golf bag, a golf cart, a chair, a table, a desk, a workbench, a bed, a dolly, a camera crane, a small appliance, a generator, a car jack, a shipping container, a recreational vehicle, a tracked vehicle or the like. In this example, the receivers 109 may be used to rotate and/or lift the fourth object 970.

Figure 24:
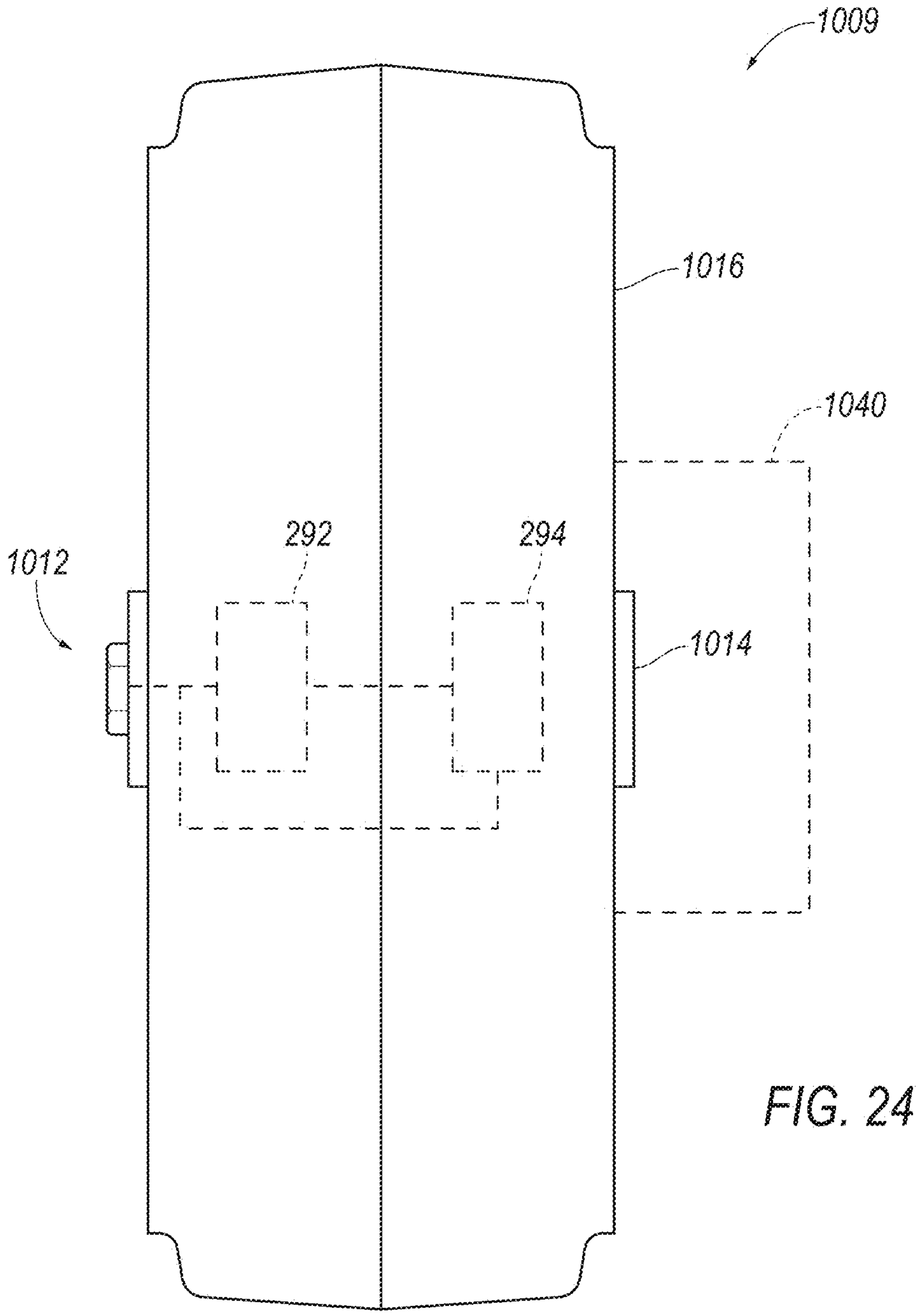
FIG. 24 is a front view of another exemplary receiver for coupling to an object in accordance with various examples.

In one example, with reference to FIG. 24, another example receiver 1009 is shown. In this example, the receiver 1009 comprises a wheel, which can be coupled to various other objects, such as a first object 1040. In one example, the first object 1040 includes, but is not limited to, a microphone stand, a pole, a small appliance, a winch, a power tool, a fishing pole, a camping tool, a mobile robot, an outboard motor and the like. The receiver 1009 includes a receiver coupler 1012, the receiver communication system 292 and the receiver controller 294. In this example, the receiver 1009 is a wheel. The receiver coupler 1012 may extend outwardly from an axle 1014 of a wheel body 1016, and the receiver communication system 292 and the receiver controller 294 may be disposed within the axle 1014. The axle 1014 and the wheel body 1016 may be composed of a suitable polymer-based material, metal or metal alloy. The receiver 1009 may also include a power source disposed within the axle 1014 and in communication with the receiver communication system 292 and the receiver controller 294, including, but not limited to a battery. The receiver 1009 may also include an inductive charging pad and/or a power receiver to power the receiver 1009 and/or recharge the power source.

Figure 25:
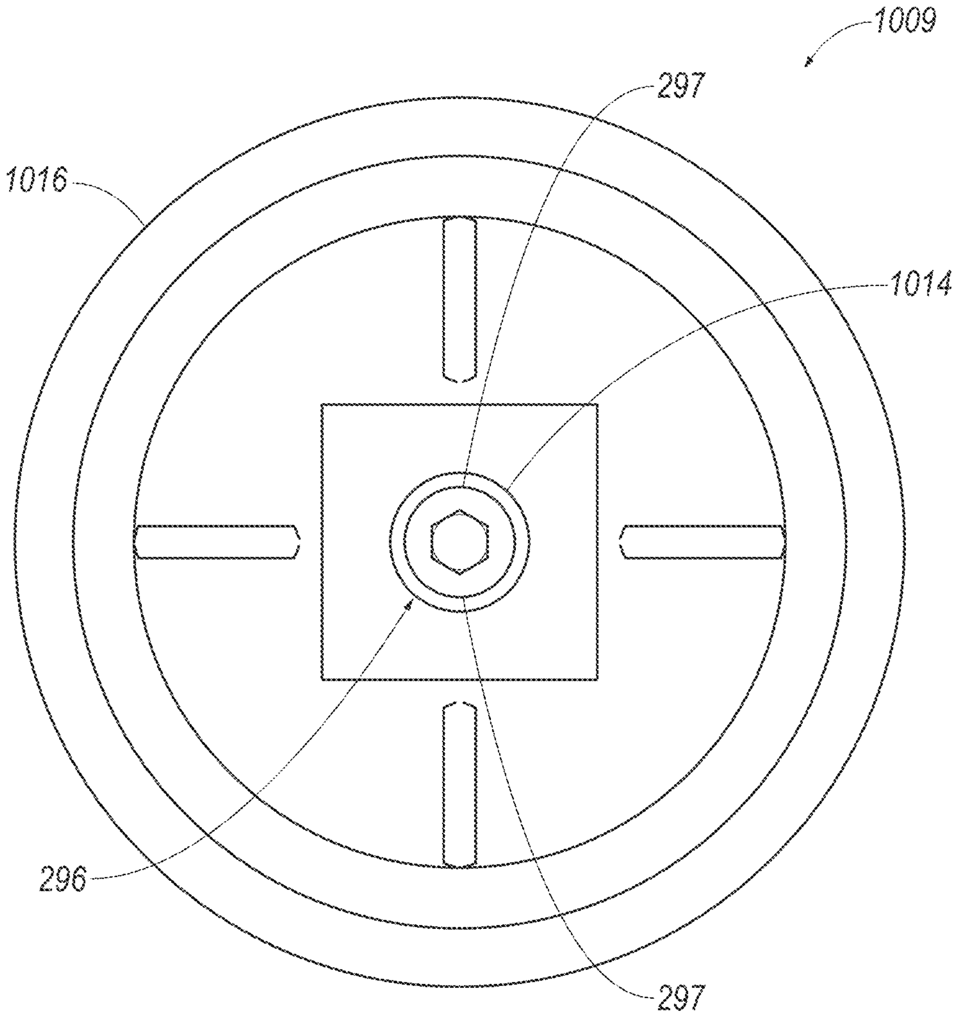
FIG. 25 is a side view of the receiver of FIG. 24.

With reference to FIG. 25, the receiver coupler 1012 includes the receiver terminal end 296. In one example, the receiver terminal end 296 extends outwardly from the axle 1014. In one example, the receiver terminal end 296 comprises a socket, including, but not limited to a hexagonal or square socket. It should be noted that the receiver terminal end 296 may comprise other types of receivers that cooperate with the drive terminal connector 152 to couple the receiver 1009 to the drive device system 102, and the use of a socket is merely an example. The receiver terminal end 296 may also include the communication terminals 297.

Figure 26:
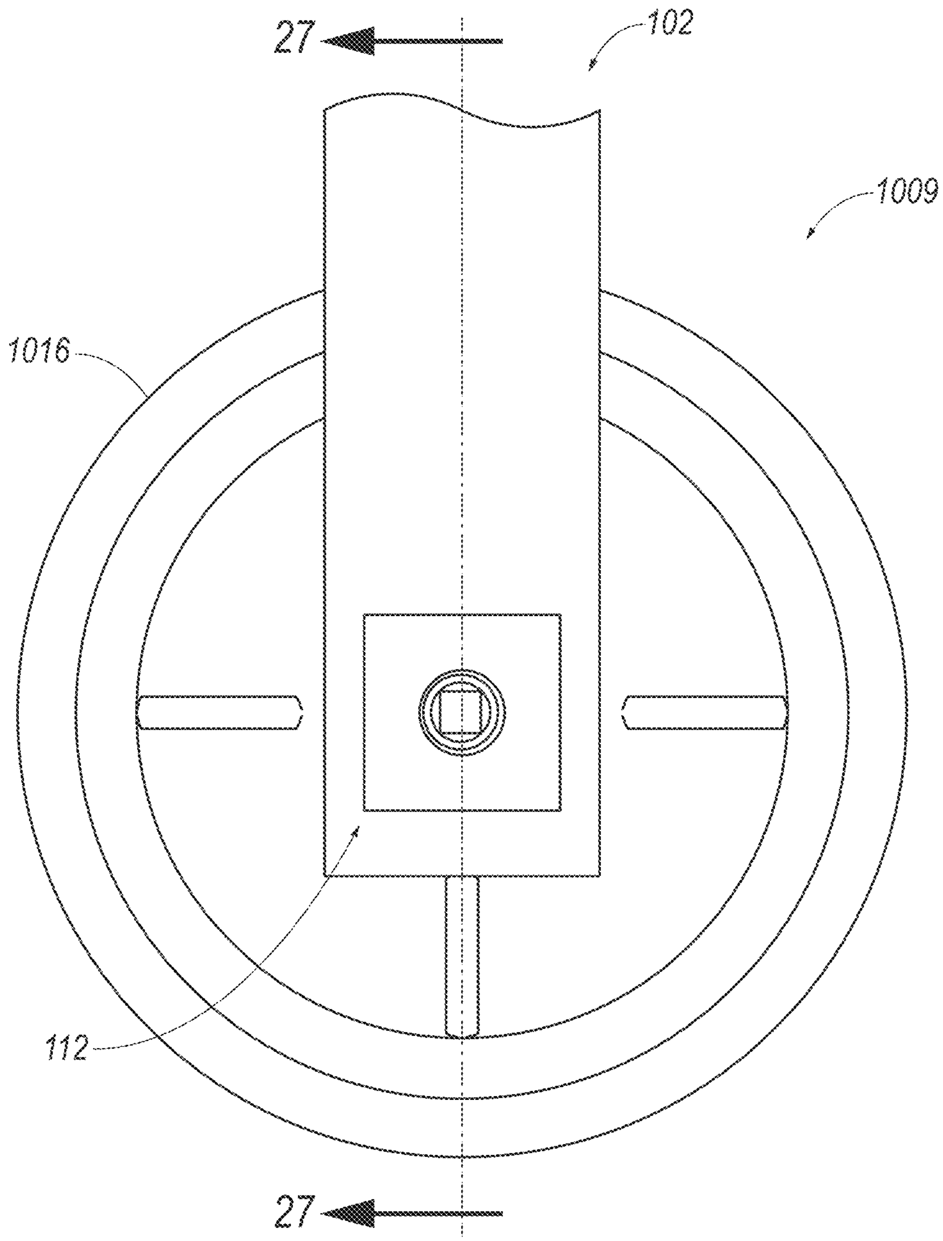
FIG. 26 is a side view of the receiver of FIG. 24 with the drive device system coupled to the receiver to change a position of the receiver.
Figure 27:
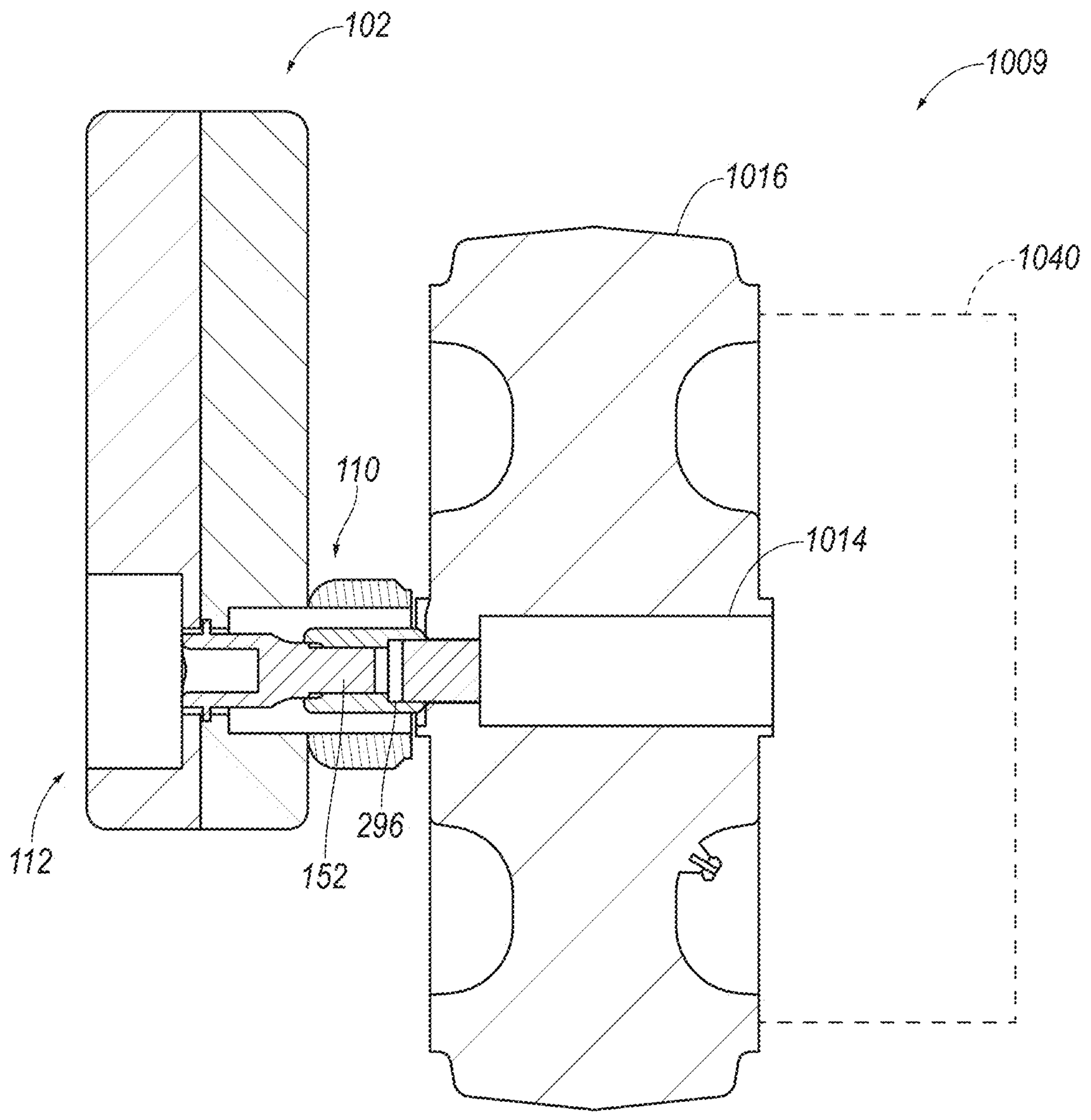
FIG. 27 is a cross-sectional view of the receiver and the drive device system coupled to the receiver taken along line A-A of FIG. 26, in which the cross-section of the drive device system has been simplified for ease of illustration.

With reference to FIGS. 26 and 27, the drive coupler 110 of the drive device system 102 is shown coupled to the receiver coupler 1012. It should be noted that the drive device system 102 illustrated in FIG. 27 is simplified in cross-section for ease of illustration. The drive terminal connector 152 is received within the receiver terminal end 296 such that torque supplied by the motor 116 to the drive terminal connector 152 is directly transferred to the receiver terminal end 296 to drive the receiver 1009 and the first object 1040 coupled to the receiver 1009. Thus, the drive device system 102 is coupled to the receiver 1009 to move or change a position of the receiver 1009, and thus, the first object 1040 coupled to the receiver 1009.

Figure 28:
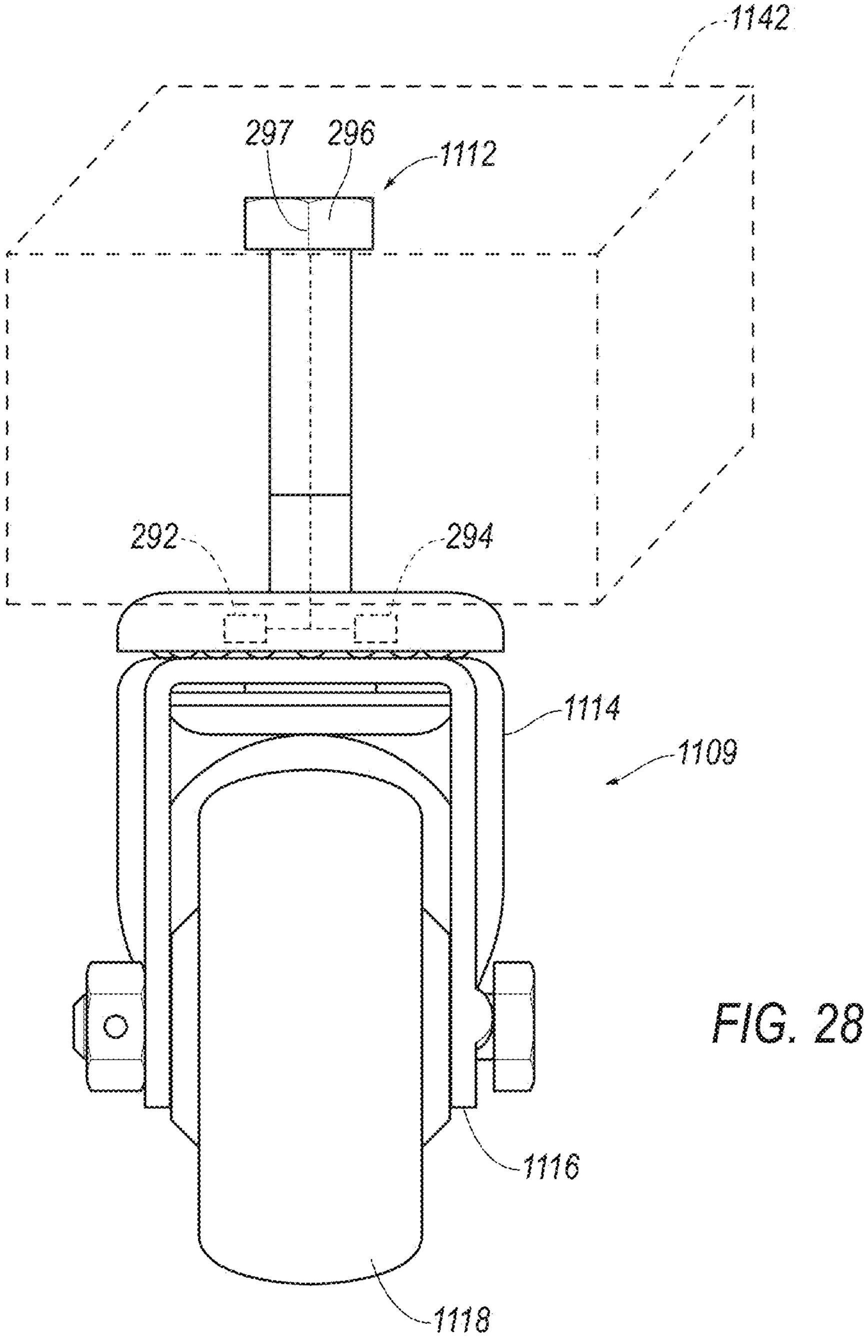
FIG. 28 is a front view of another exemplary receiver for coupling to an object in accordance with various examples.

In one example, with reference to FIG. 28, another example receiver 1109 is shown. In this example, the receiver 1109 comprises a wheel, which can be coupled to various other objects, such as a first object 1140. In one example, the first object 1140 includes, but is not limited to, a microphone stand, a pole, a small appliance, a winch, a power tool, a fishing pole, a camping tool, a mobile robot, an outboard motor and the like. The first object 1140 is coupled to the driven coupler 112 of the drive device system 102 (FIG. 29), and a spacer 1142 may be coupled between the receiver 1109 and the drive device system 102. The receiver 1109 includes a receiver coupler 1112, the receiver communication system 292 and the receiver controller 294. In this example, the receiver 1109 is a wheel. The receiver coupler 1112 may extend outwardly from a frame 1114 coupled to an axle 1116 of a wheel body 1118, and the receiver communication system 292 and the receiver controller 294 may be disposed within the frame 1114. The frame 1114, the axle 1116 and the wheel body 1118 may be composed of a suitable polymer-based material, metal or metal alloy. The receiver 1109 may also include a power source disposed within the frame 1114 or the axle 1116 and in communication with the receiver communication system 292 and the receiver controller 294, including, but not limited to a battery. The receiver 1109 may also include an inductive charging pad and/or a power receiver to power the receiver 1109 and/or recharge the power source. The wheel body 1118 is rotationally mounted to the frame 1114 and the axle 1116 such that the wheel body 1118 is configured to swivel.

The receiver coupler 1112 includes the receiver terminal end 296. In one example, the receiver terminal end 296 extends outwardly from the frame 1114. In one example, the receiver terminal end 296 comprises a socket, including, but not limited to a hexagonal or square socket. It should be noted that the receiver terminal end 296 may comprise other types of receivers that cooperate with the drive terminal connector 152 to couple the receiver 1109 to the drive device system 102, and the use of a socket is merely an example. The receiver terminal end 296 may also include the communication terminals 297.

The spacer 1142 may comprise any suitable polygonal structure, and in one example, is substantially rectangular. The spacer 1142 is composed of a suitable polymer-based material, metal or metal alloy, and provides clearance between the wheel body 1118 and the drive device systems 102 when the drive device systems 102 is coupled to the receiver 1109. In certain instances, the spacer 1142 may be optional.

Figure 29:
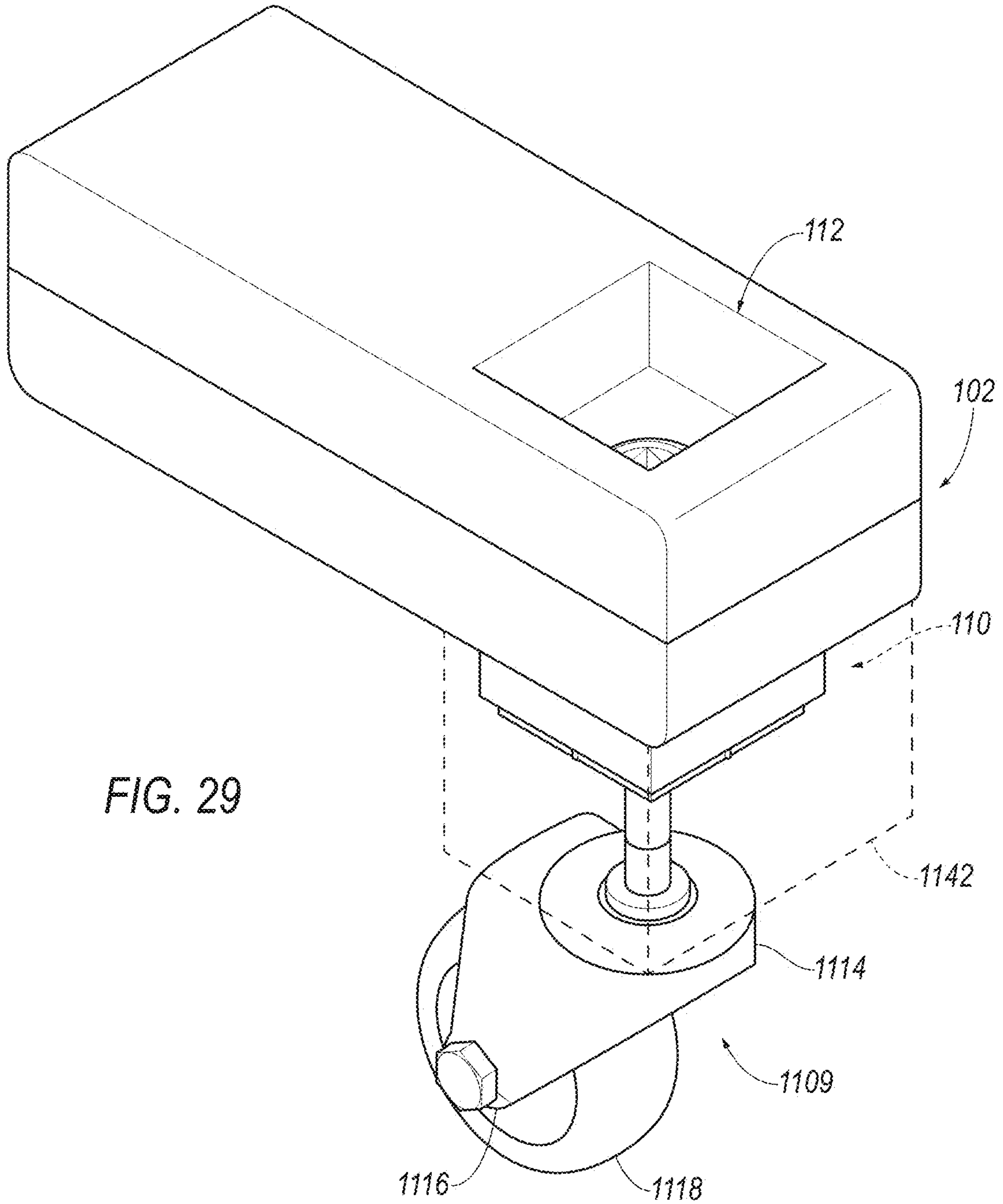
FIG. 29 is a perspective view of the receiver of FIG. 28 with the drive device system coupled to the receiver to change a position of the receiver.
Figure 30:
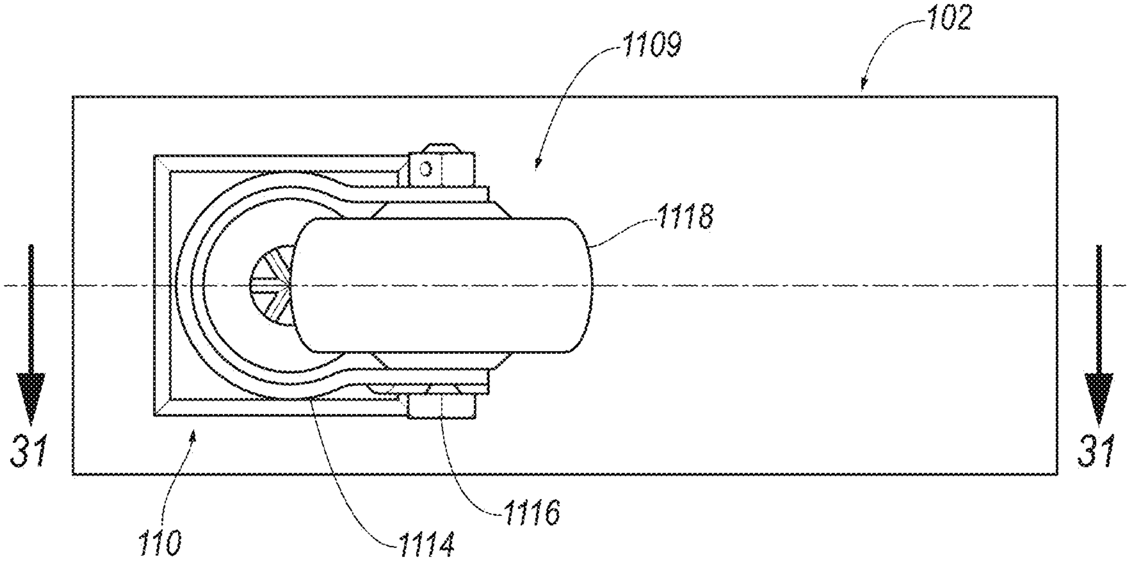
FIG. 30 is a bottom view of the receiver of FIG. 28 with the drive device system coupled to the receiver to change a position of the receiver.
Figure 31:
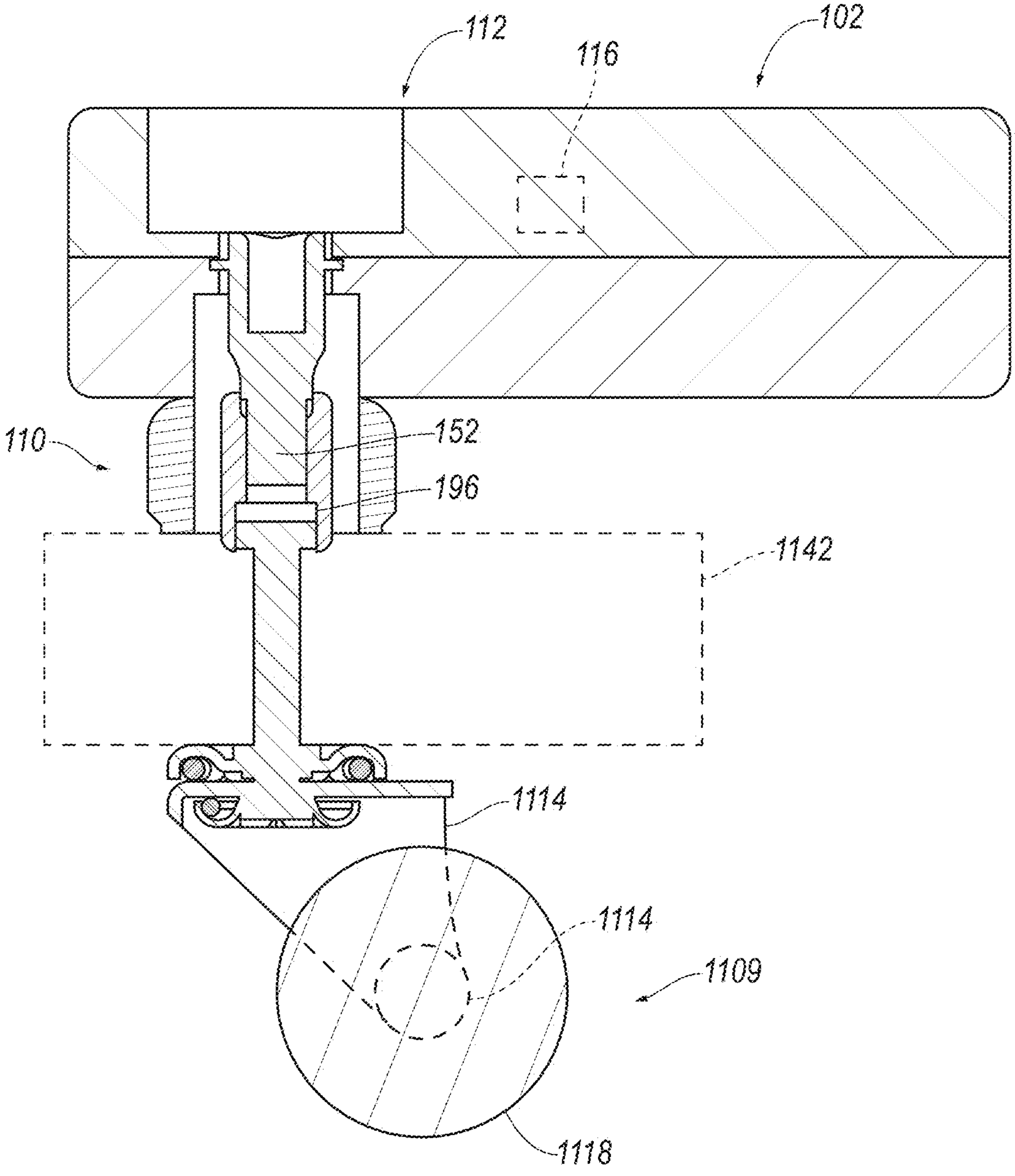
FIG. 31 is a cross-sectional view of the receiver and the drive device system coupled to the receiver taken along line A-A of FIG. 30, in which the cross-section of the drive device system has been simplified for ease of illustration.

With reference to FIGS. 29-31, the drive coupler 110 of the drive device system 102 is shown coupled to the receiver coupler 1112. It should be noted that the drive device system 102 illustrated in FIG. 31 is simplified in cross-section for ease of illustration. With reference to FIG. 31, the drive terminal connector 152 is received within the receiver terminal end 296 such that torque supplied by the motor 116 to the drive terminal connector 152 is directly transferred to the receiver terminal end 296 to drive the receiver 1109 and the first object 1140 coupled to the drive device system 102. Thus, the drive device system 102 is coupled to the receiver 1109 to move or change a position of the receiver 1109, and thus, the first object 1140 coupled to the drive device system 102.

Figure 32:
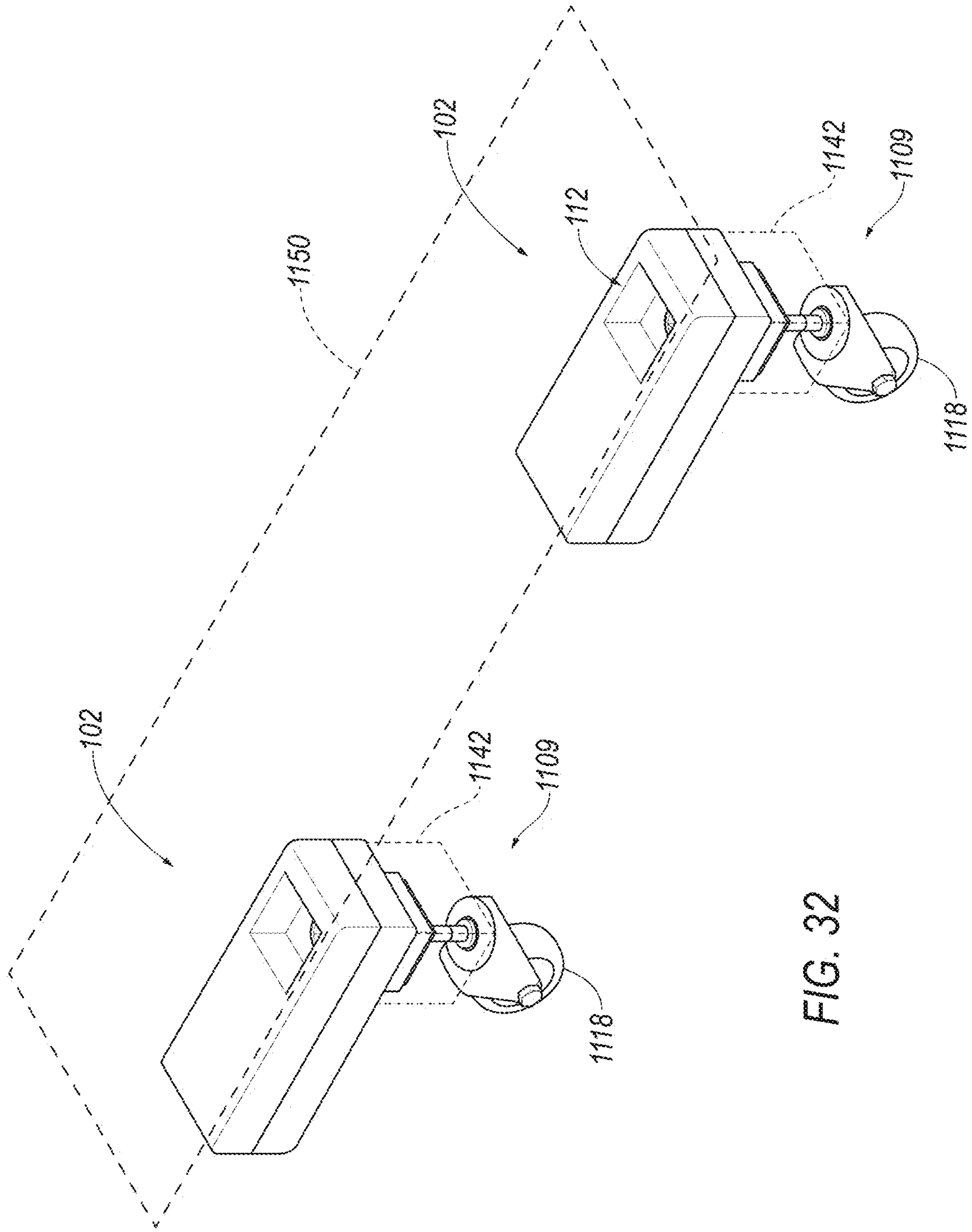
FIG. 32 is a schematic illustration of a second object coupled to the receiver and drive device system of FIG. 29 and driven by the drive device system to change a position of the second object.

With reference to FIG. 32, the receiver 1109 may be coupled to a second object 1150 to move or change the position of the second object 1150. In this example, a pair of the drive device systems 102 are coupled to a respective one of a pair of the receivers 1109. The drive terminal connector 152 of each of the drive device systems 102 is coupled to the receiver terminal end 296 (FIG. 31) such that a torque applied by the drive terminal connector 152 to the receiver terminal end 296 transfers to move or change the position of the wheel body 1118, and the second object 1150 coupled to the drive device system 102. In one example, the second object 1150 includes, but is not limited to a bicycle, a scooter, a do-it-yourself hobby project, a dolly, a ladder or the like.

Figure 33:
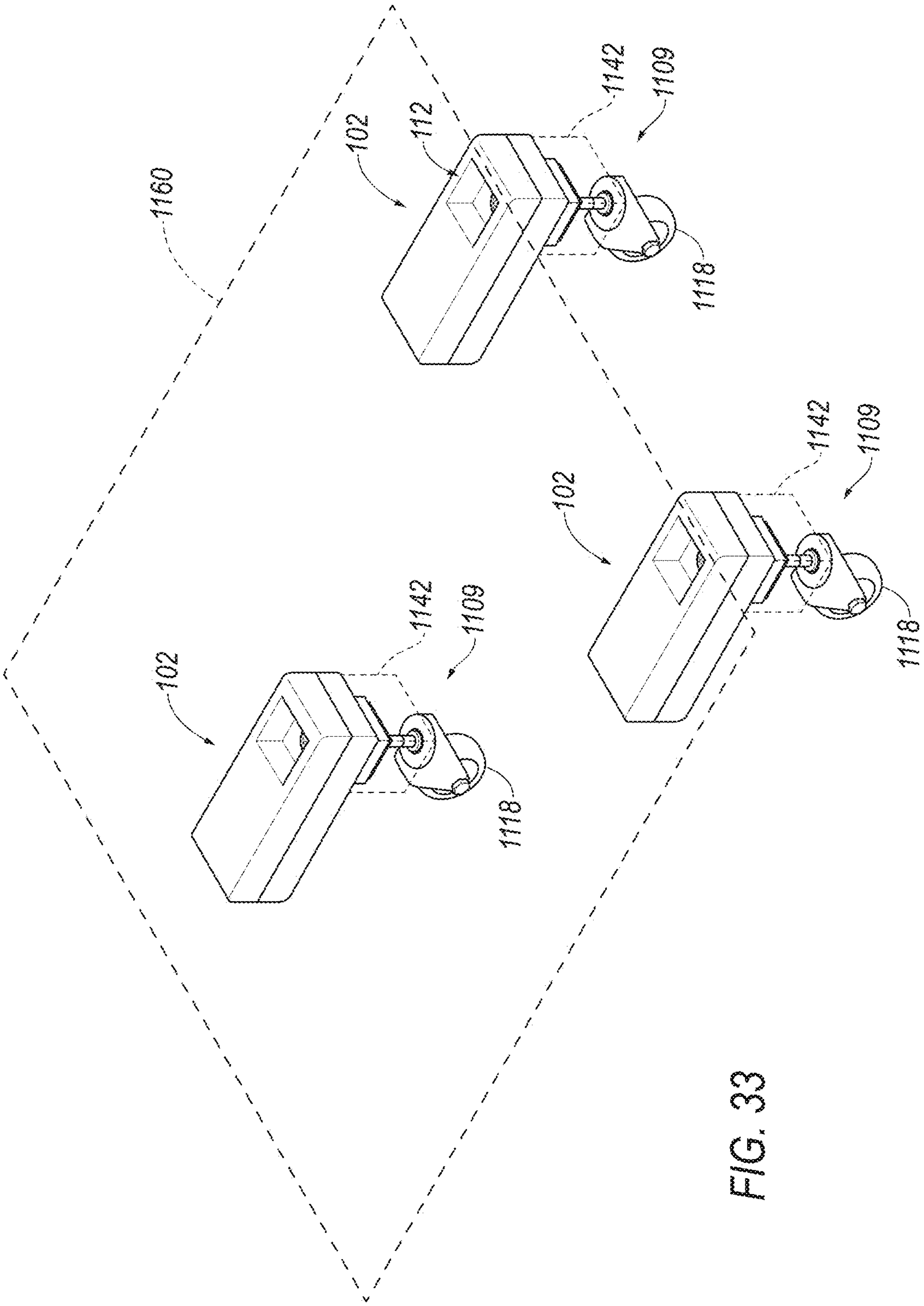
FIG. 33 is a schematic illustration of a third object coupled to the receiver and drive device system of FIG. 29 and driven by the drive device system to change a position of the third object.

With reference to FIG. 33, a plurality of the receivers 1109 may be coupled to a third object 1160 to move or change the position of the third object 1160. In this example, three of the drive device systems 102 are coupled to a respective one of three of the receivers 1109. The drive terminal connector 152 of each of the drive device systems 102 is coupled to the receiver terminal end 296 (FIG. 31) such that a torque applied by the drive terminal connector 152 to the receiver terminal end 296 transfers to move or change the position of the wheel body 1118, and the third object 1160 coupled to the drive device system 102. In one example, the third object 1160 includes, but is not limited to a wheelbarrow, a golf bag, a golf cart, a do-it-yourself hobby project, a camera tripod or the like.

Figure 34:
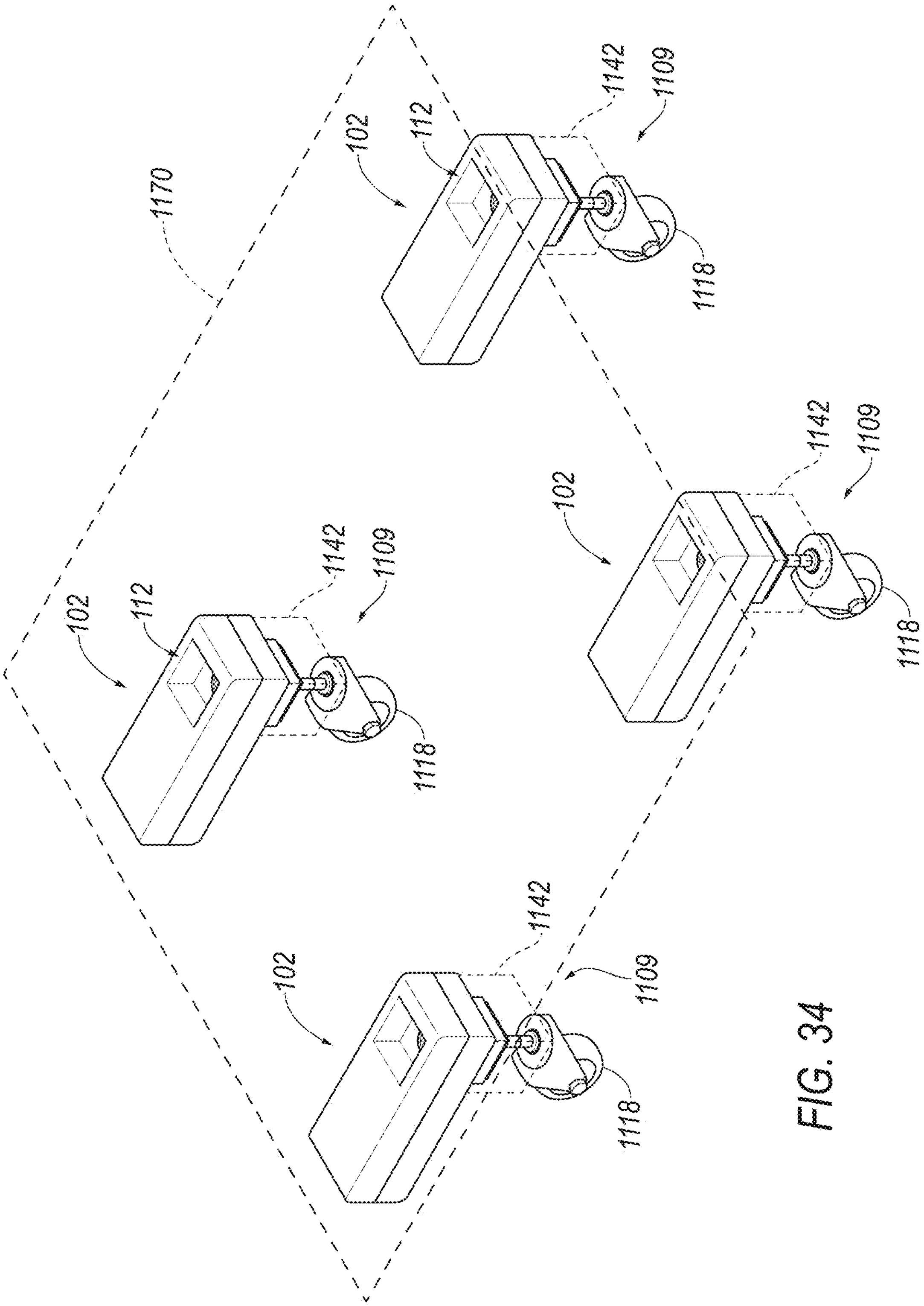
FIG. 34 is a schematic illustration of a fourth object coupled to the receiver and drive device system of FIG. 29 and driven by the drive device system to change a position of the fourth object.

With reference to FIG. 34, a plurality of the drive device systems 102 and the receivers 1109 may be coupled to a fourth object 1170 to move or change the position of the fourth object 1170. In this example, four of the drive device systems 102 are coupled to a respective one of four of the receivers 1109. The drive terminal connector 152 of each of the drive device systems 102 is coupled to the receiver terminal end 296 (FIG. 31), such that a torque applied by the drive terminal connector 152 to the receiver terminal end 296 transfers to move or change the position of the wheel body 1118, and the fourth object 1170 coupled to the drive device system 102. In one example, the fourth object 1170 includes, but is not limited to a skateboard, a scooter, a walker, a do-it-yourself hobby project, a stroller, a cart, a wheelchair, a lawnmower, a snowblower, a cooler, a golf bag, a golf cart, a chair, a table, a desk, a workbench, a bed, a dolly, a camera crane, a small appliance, a generator, a car jack, a shipping container, a recreational vehicle, a tracked vehicle or the like.

Figure 35:
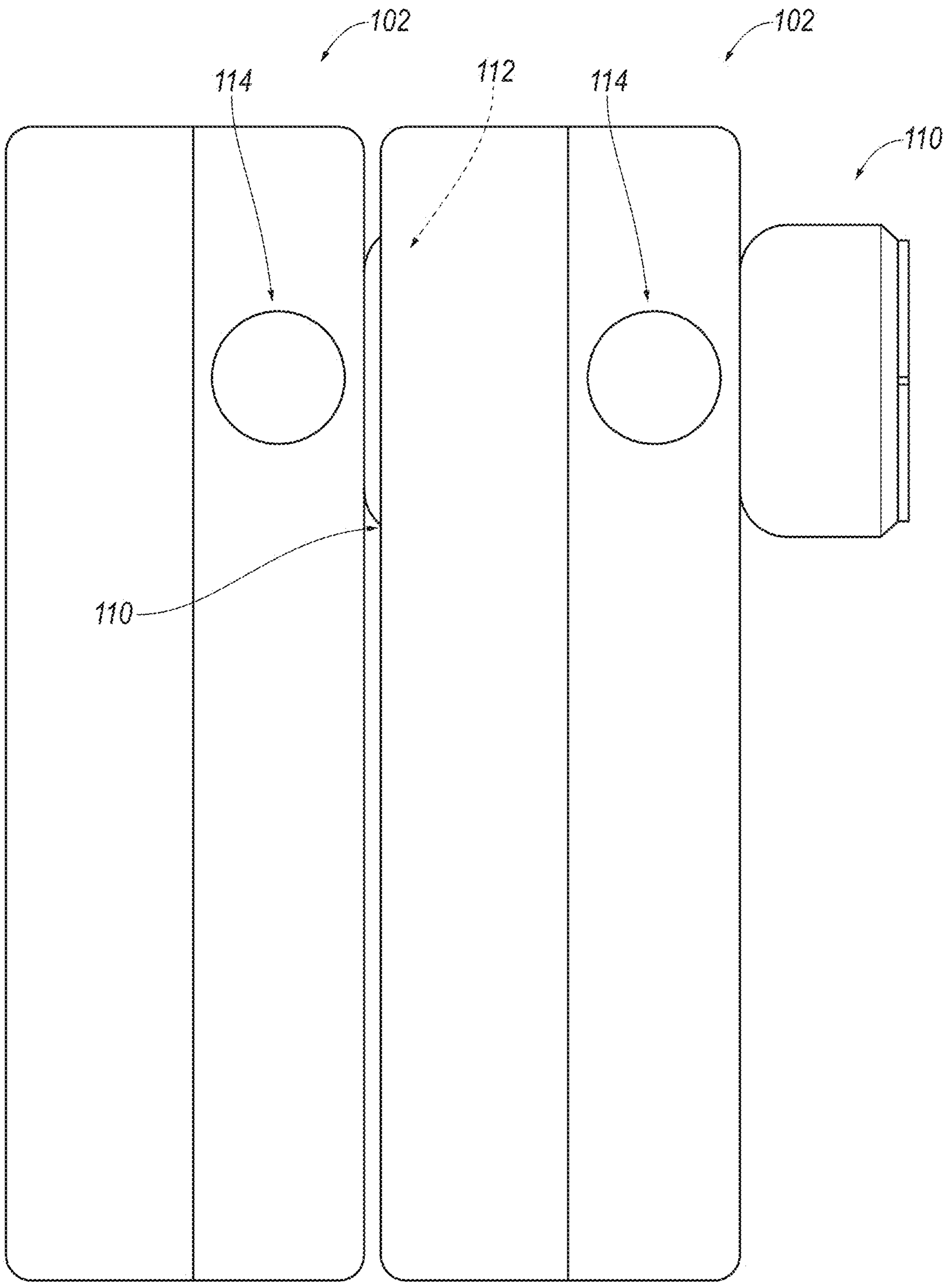
FIG. 35 is a side view of a pair of the drive device systems coupled together in a stack or first orientation.
Figure 36:
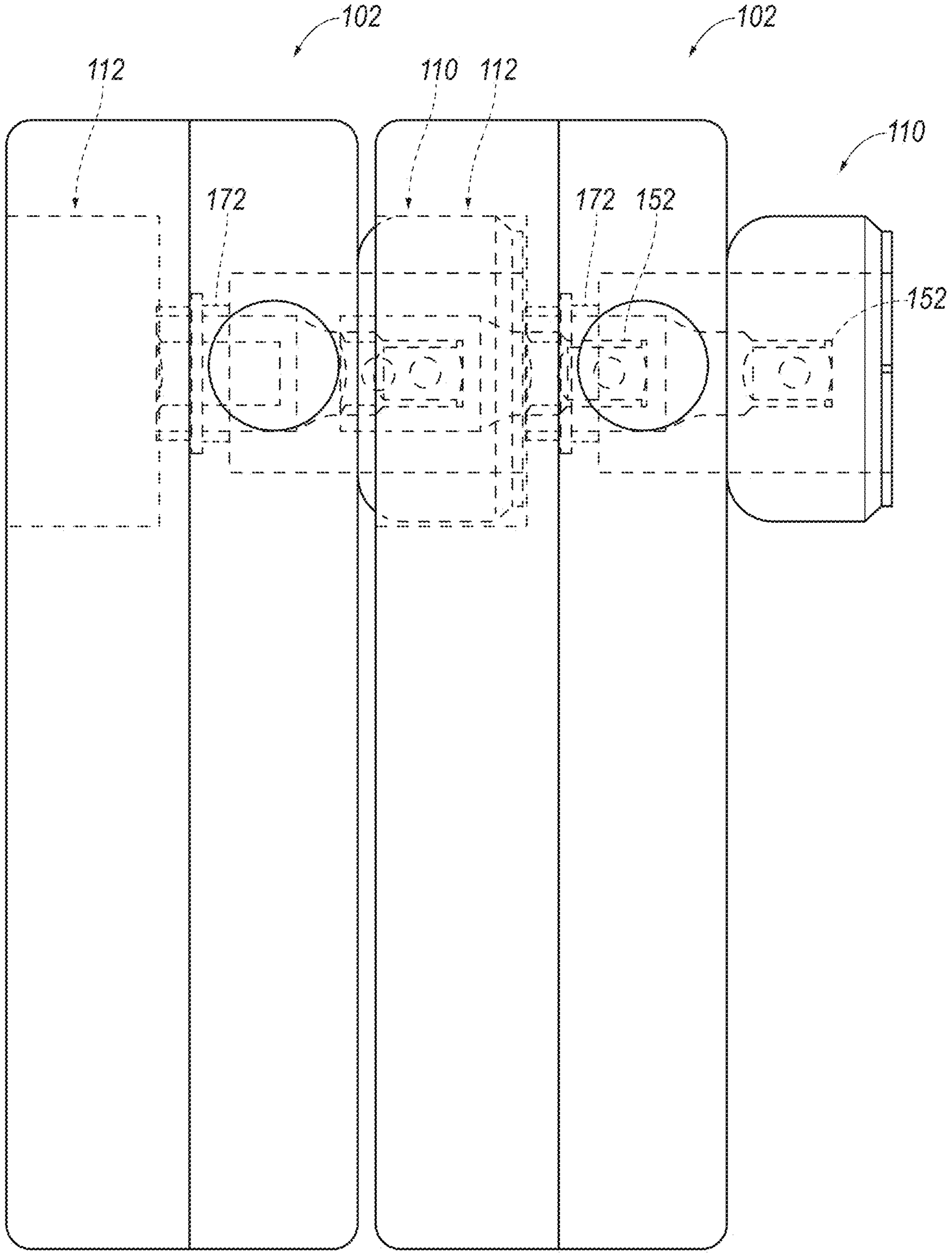
FIG. 36 is a side view of the pair of the drive device systems coupled together in a stack, in which internal components are illustrated in hidden lines.

With reference to FIG. 35, two of the drive device systems 102 are shown coupled together. In this example, the drive coupler 110 of a first one of the drive device systems 102 is coupled to the driven coupler 112 of a second one of the drive device systems 102 so as to be arranged in a stack. With reference to FIG. 36, the drive terminal connector 152 of the first one of the drive device systems 102 is engaged with the driven terminal connector 172 and the communication terminals 161 are in communication with the communication terminals 174. The torque from the drive terminal connector 152 drives the driven terminal connector 172 and can be used to increase the output of the drive terminal connector 152 of the second one of the drive device systems 102. The drive device systems 102 may be operated singly or in unison as will be discussed.

Figure 37:
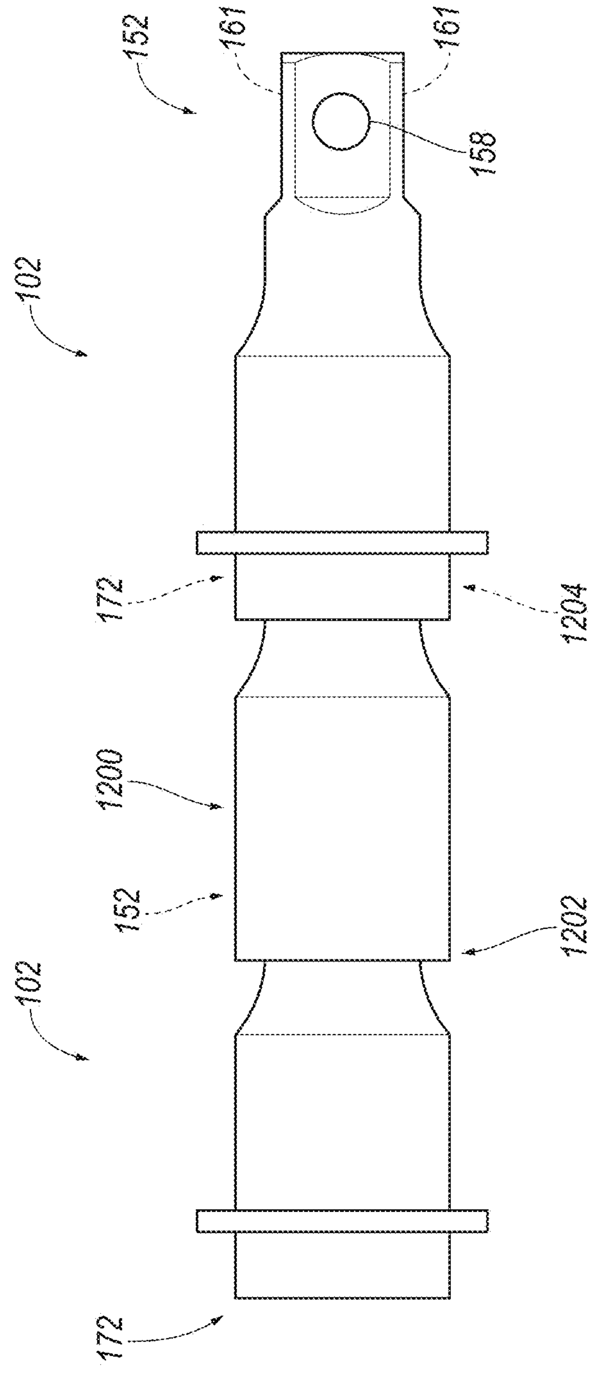
FIG. 37 is a side view of a connecting shaft coupled to a driven terminal connector and a drive terminal connector.

In one example, with reference to FIG. 37, a connecting shaft 1200 may be used to couple the two of the drive device systems 102 together. FIG. 37 is a detail view of the driven terminal connector 172 and drive terminal connector 152 of one of the drive device systems 102 coupled to another driven terminal connector 172 and drive terminal connector 152 of another one of the drive device systems 102 via the connecting shaft 1200. It should be noted that in other examples, the connecting shaft 1200 may not be used as depending on a length of the drive terminal connector 152, the drive terminal connector 152 may be able to mate with another driven terminal connector 172 or the like without the connecting shaft 1200.

Figure 38:
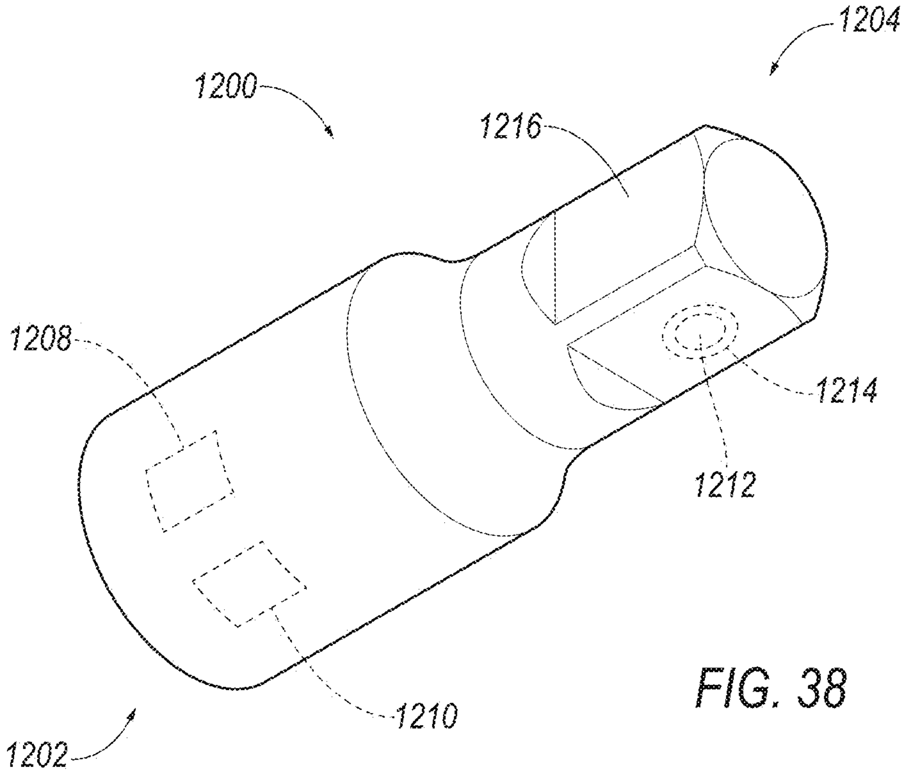
FIG. 38 is a perspective view of the connecting shaft.

With reference to FIG. 38, the connecting shaft 1200 generally has a length that enables the interconnection of one of the drive terminal connector 152 with another of the driven terminal connector 172, for example. In one example, the connecting shaft 1200 includes a connecting driven end 1202 opposite a connecting driving end 1204, and connecting communication strips 1206. The connecting shaft 1200 may be composed of any suitable material, including, but not limited to metal, metal alloy or polymer-based material, and may be cast, forged, additively manufactured, etc.

Figure 39:
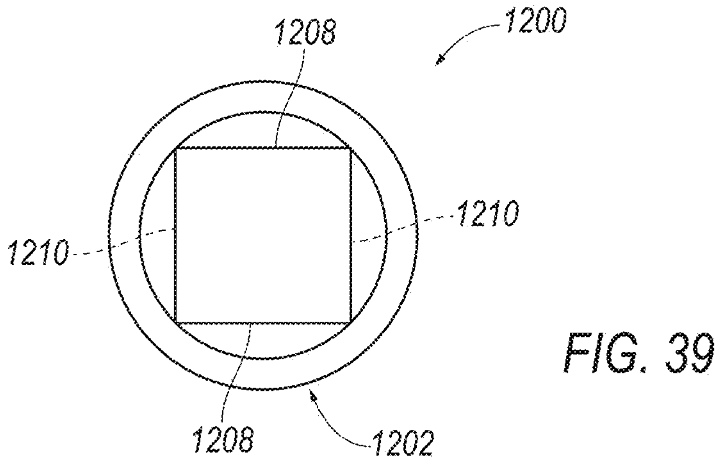
FIG. 39 is an end view of the connecting shaft.

The connecting driven end 1202 may comprise a female terminal end and the connecting driving end 1204 may comprise a male terminal connector. With reference to FIG. 39, the connecting driven end 1202 may comprise a socket, such as a hexagonal or square socket, however, it should be understood that the connecting driven end 1202 may comprise any suitable male or female connector. It should be noted that while the connecting driven end 1202 is illustrated herein as comprising a female terminal connector and the connecting driving end 1204 is illustrated herein as comprising a male terminal connector, both the connecting driven end 1202 and the connecting driving end 1204 may comprise the same type of terminal connector (female or male), and thus, the connecting driven end 1202 and the connecting driving end 1204 shown herein is merely an example.

The connecting driven end 1202 includes driven communication terminals 1208. The driven communication terminals 1208 may comprise electrical or magnetic contacts, which enable the transfer of power, data, commands, etc. from one of the drive device systems 102 or the sensing device 104 to the controller 124 of the drive device system 102 via the communication strips 1206. In addition, the connecting driven end 1202 may also include connecting detent channels 1210. The connecting detent channels 1210 may comprise channels, grooves or recesses defined in the connecting driven end 1202 that receive a respective one of the second detent balls 158 when coupled to another one of the drive device systems 102 or the sensing device 104.

Figure 40:
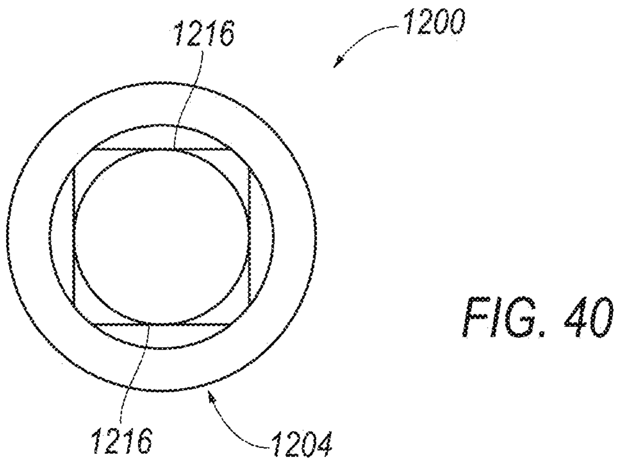
FIG. 40 is another end view of the connecting shaft.
Figure 41:
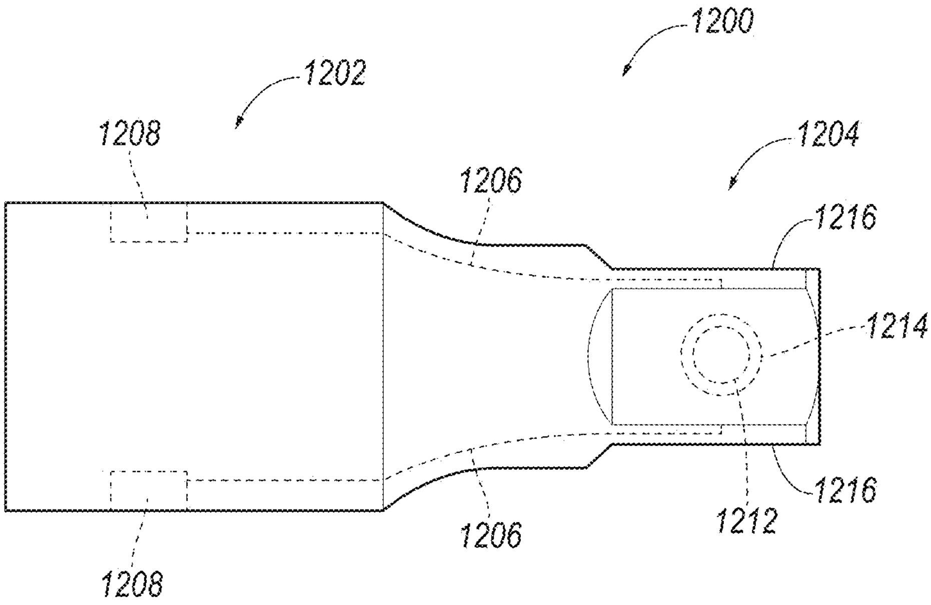
FIG. 41 is a side view of the connecting shaft.

With reference to FIG. 40, the connecting driving end 1204 comprises a hexagonal or square socket bit, however, it should be understood that the connecting driving end 1204 may comprise any suitable male or female connector. In one example, with reference to FIG. 41, the connecting driving end 1204 may include at least one pair of opposed connecting detent balls 1212. The opposed connecting detent balls 1212 are received within a corresponding one of a pair of connecting recesses 1214 defined in the connecting driving end 1204, and are movable between a first position, in which the opposed connecting detent balls 1212 extend beyond a perimeter or exterior surface of the connecting driving end 1204, and a second position, in which the opposed connecting detent balls 1212 are recessed within the perimeter or exterior surface of the connecting driving end 1204. In the first position, the opposed connecting detent balls 1212 assist in coupling the connecting driving end 1204 to another one of the drive device systems 102 or an object. In the second position, the opposed connecting detent balls 1212 permit the uncoupling of connecting driving end 1204 from the one of the drive device system 102 or the object. In one example, each of the opposed connecting detent balls 1212 may include a respective biasing member or spring, which biases or applies a spring force to maintain the opposed connecting detent balls 1212 in the first position. It should be noted that while the opposed connecting detent balls 1212 are described and illustrated herein as being coupled to the connecting driving end 1204, the opposed connecting detent balls 1212 may be optional.

In one example, the connecting driving end 1204 also includes drive communication terminals 1216. The drive communication terminals 1216 may comprise electrical or magnetic contacts, which enable the transfer of power, data, commands, etc. from the drive device system 102 to the controller 124 of another one of the drive device systems 102 via the communication strips 1206. Generally, with reference back to FIG. 41, the communication strips 1206 electrically couple the driven communication terminals 1208 to the drive communication terminals 1216 to enable the transfer of power, data, commands, etc. from the connecting driven end 1202 to the connecting driving end 1204. This provides communication between the drive device system 102, the sensing device 104, the receiver 109, the object or combinations thereof coupled together via the connecting shaft 1200. In one example, the communication strips 1206 comprise electrical or magnetic strips, which are coupled to an interior surface of the connecting shaft 1200. It should be noted that other techniques may be employed to enable communication along the connecting shaft 1200 and the use of the communication strips 1206 is merely an example.

Figure 42:
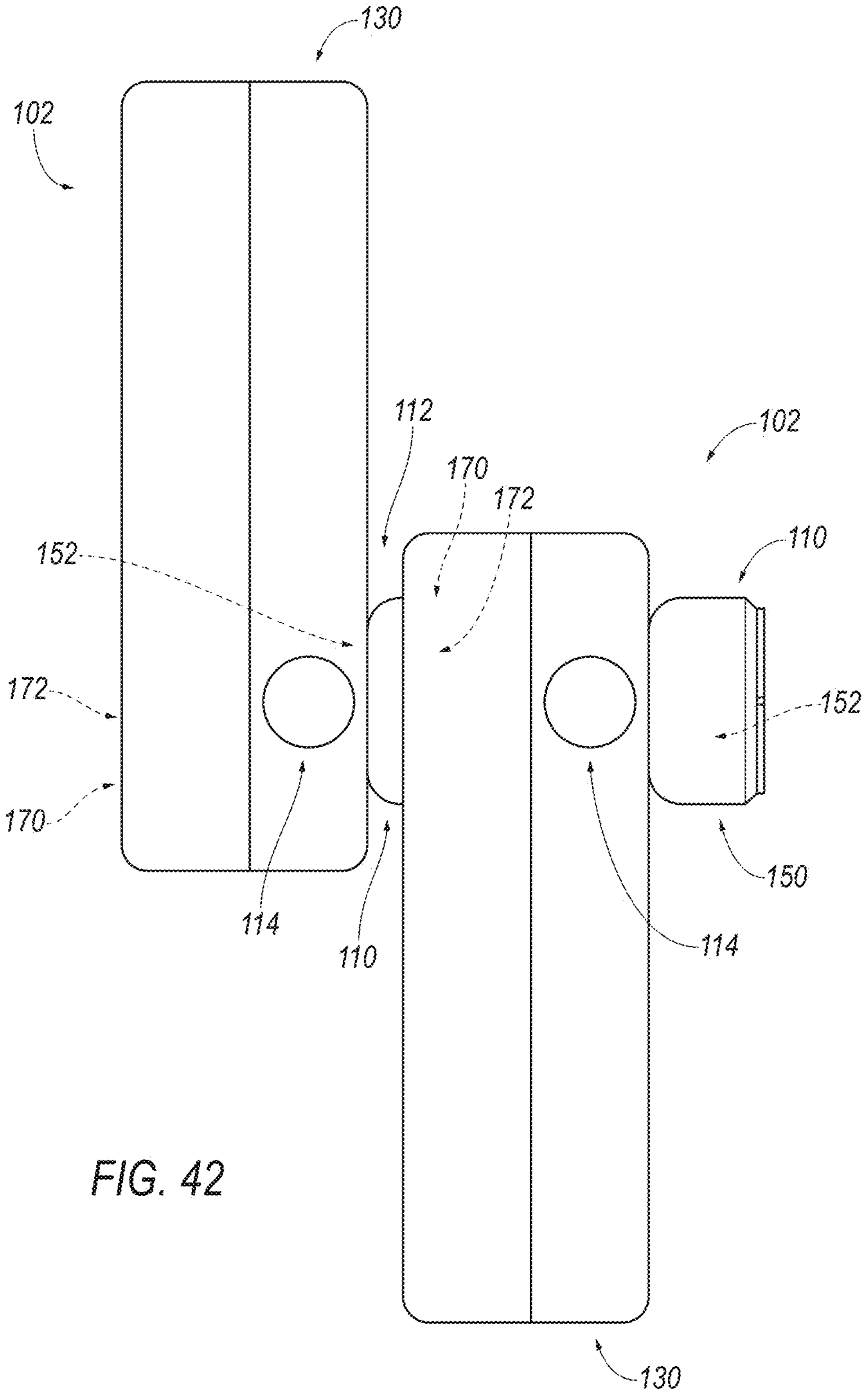
FIG. 42 is a side view of two of the drive device systems of FIG. 2 coupled together in a second orientation.

In addition, it should be noted that although the drive device systems 102 are shown coupled together in FIGS. 35 and 36 in a substantially parallel orientation, the drive device systems 102 may be coupled together in various orientations due to the configuration of the head 150 and the driven receptacle 170. For example, with reference to FIG. 42, two of the drive device systems 102 are shown coupled together, with the first one of the drive device system 102 orientated at about 180 degrees relative to the other of the drive device system 102. In this example, the drive coupler 110 of a first one of the drive device systems 102 is coupled to the driven coupler 112 of a second one of the drive device systems 102 so that the housing 130 of the first one of the drive device system 102 is about 180 degrees from the housing 130 of the second one of the drive device system 102. The drive terminal connector 152 of the first one of the drive device systems 102 is engaged with the driven terminal connector 172 and the communication terminals 161 are in communication with the communication terminals 174. The torque from the drive terminal connector 152 drives the driven terminal connector 172 and can be used to increase the output of the drive terminal connector 152 of the second one of the drive device systems 102. The drive device systems 102 may be operated singly or in unison as will be discussed.

Figure 43:
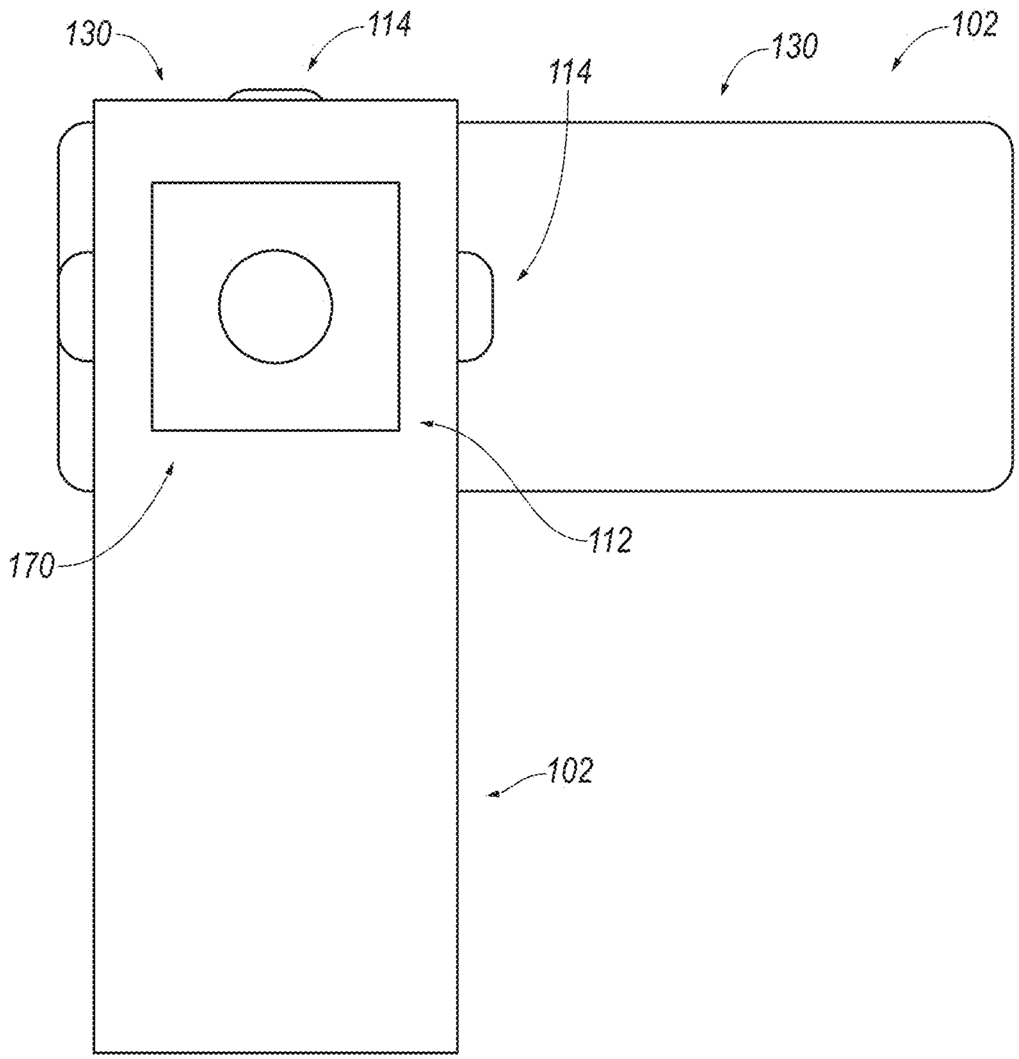
FIG. 43 is a rear view of two of the drive device systems of FIG. 2 coupled together in a third orientation.
Figure 44:
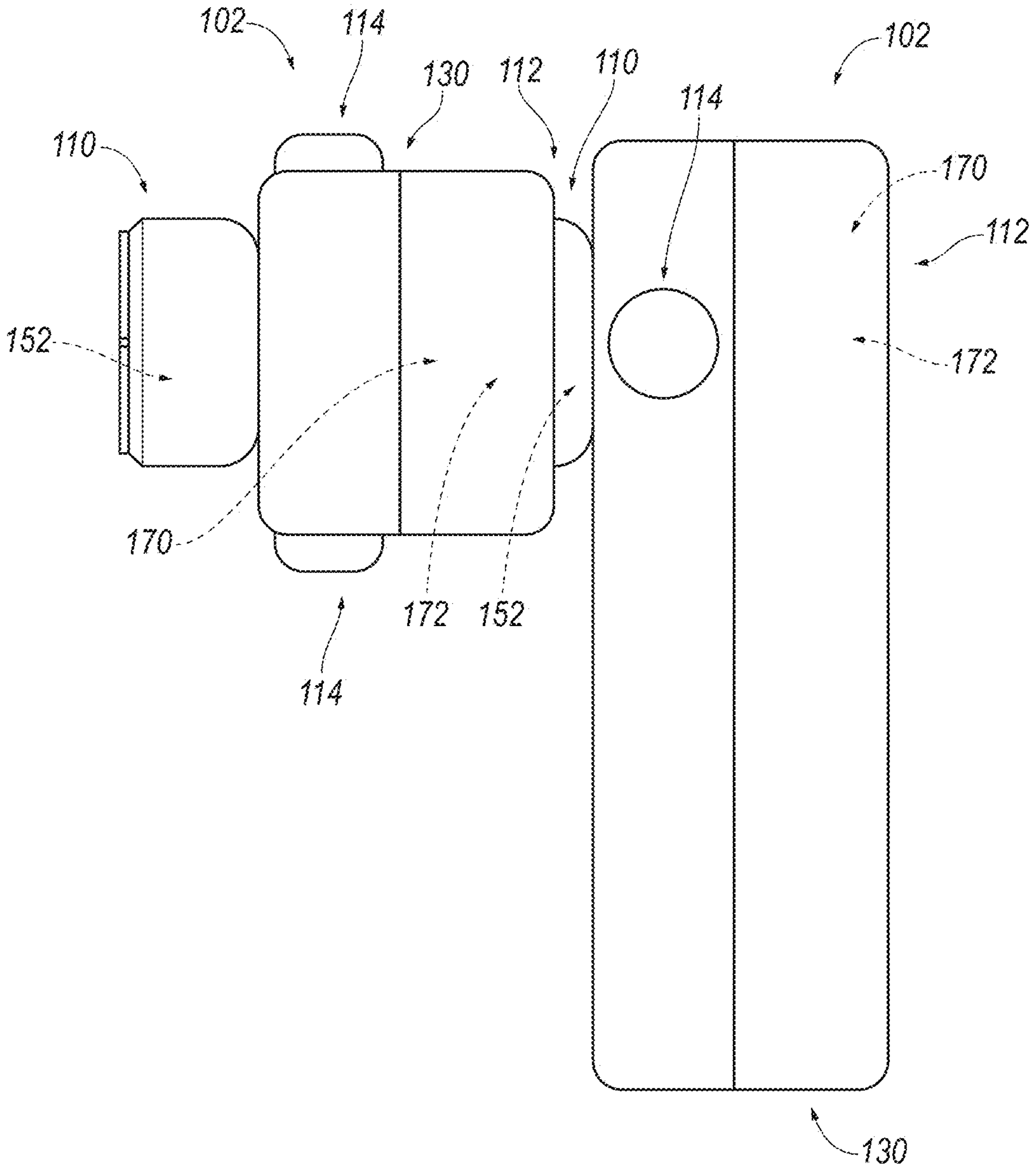
FIG. 44 is a side view of two of the drive device systems of FIG. 2 coupled together in the third orientation.

With reference to FIGS. 43 and 44, two of the drive device systems 102 are shown coupled together in another exemplary orientation, with the first one of the drive device system 102 orientated at about 90 degrees relative to the other of the drive device system 102. In this example, with reference to FIG. 44, the drive coupler 110 of a first one of the drive device systems 102 is coupled to the driven coupler 112 of a second one of the drive device systems 102 so that the housing 130 of the second one of the drive device system 102 is about 90 degrees from the housing 130 of the second one of the drive device system 102. The drive terminal connector 152 of the first one of the drive device systems 102 is engaged with the driven terminal connector 172 and the communication terminals 161 are in communication with the communication terminals 174. The torque from the drive terminal connector 152 drives the driven terminal connector 172 and can be used to increase the output of the drive terminal connector 152 of the second one of the drive device systems 102. The drive device systems 102 may be operated singly or in unison as will be discussed.

Figure 45:
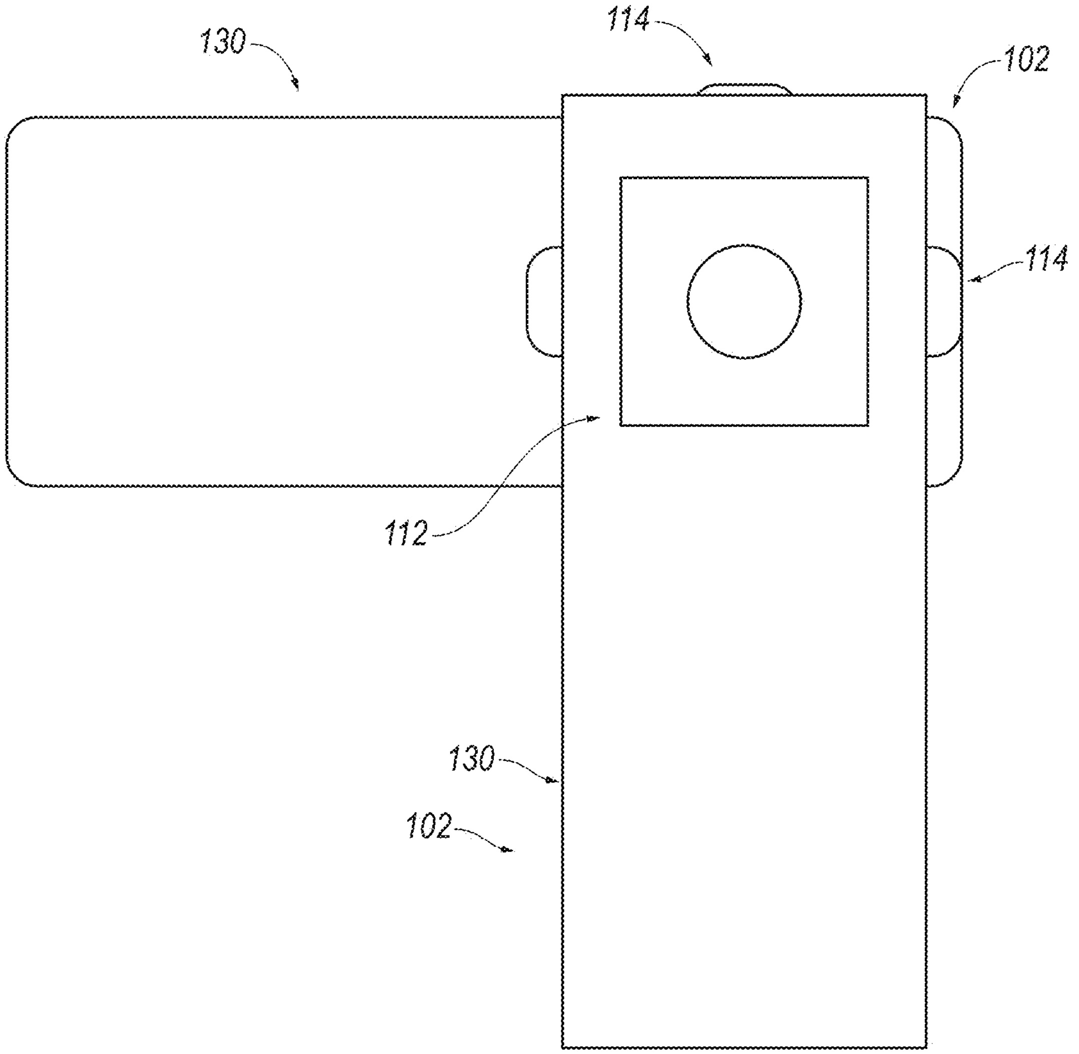
FIG. 45 is a rear view of two of the drive device systems of FIG. 2 coupled together in a fourth orientation.
Figure 46:
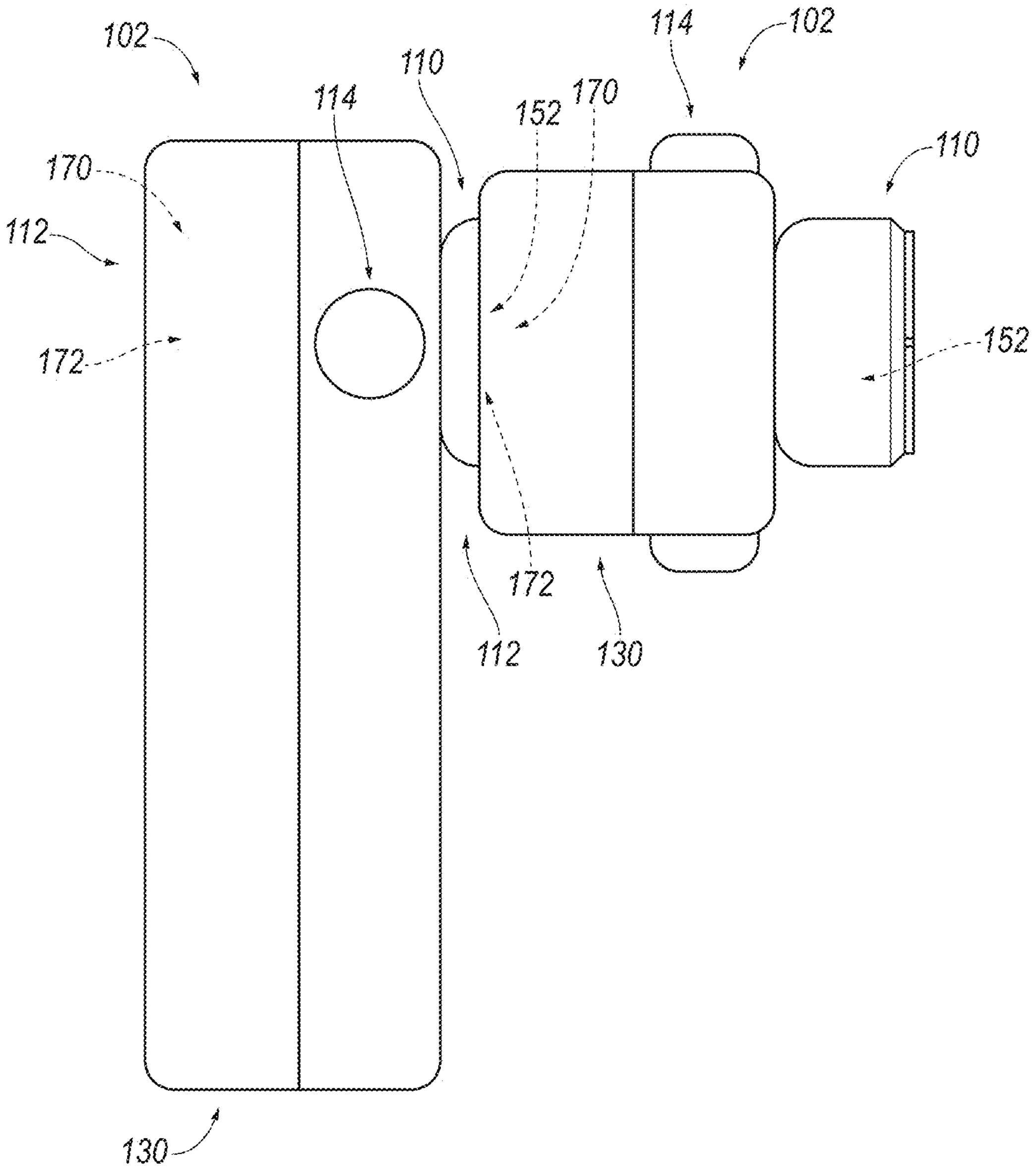
FIG. 46 is a side view of two of the drive device systems of FIG. 2 coupled together in the fourth orientation.

With reference to FIGS. 45 and 46, two of the drive device systems 102 are shown coupled together in another exemplary orientation, with the first one of the drive device system 102 orientated at about 270 degrees relative to the other of the drive device system 102. In this example, with reference to FIG. 46, the drive coupler 110 of a first one of the drive device systems 102 is coupled to the driven coupler 112 of a second one of the drive device systems 102 so that the housing 130 of the second one of the drive device system 102 is about 270 degrees from the housing 130 of the second one of the drive device system 102. The drive terminal connector 152 of the first one of the drive device systems 102 is engaged with the driven terminal connector 172 and the communication terminals 161 are in communication with the communication terminals 174. The torque from the drive terminal connector 152 drives the driven terminal connector 172 and can be used to increase the output of the drive terminal connector 152 of the second one of the drive device systems 102. The drive device systems 102 may be operated singly or in unison as will be discussed.

Figure 47:
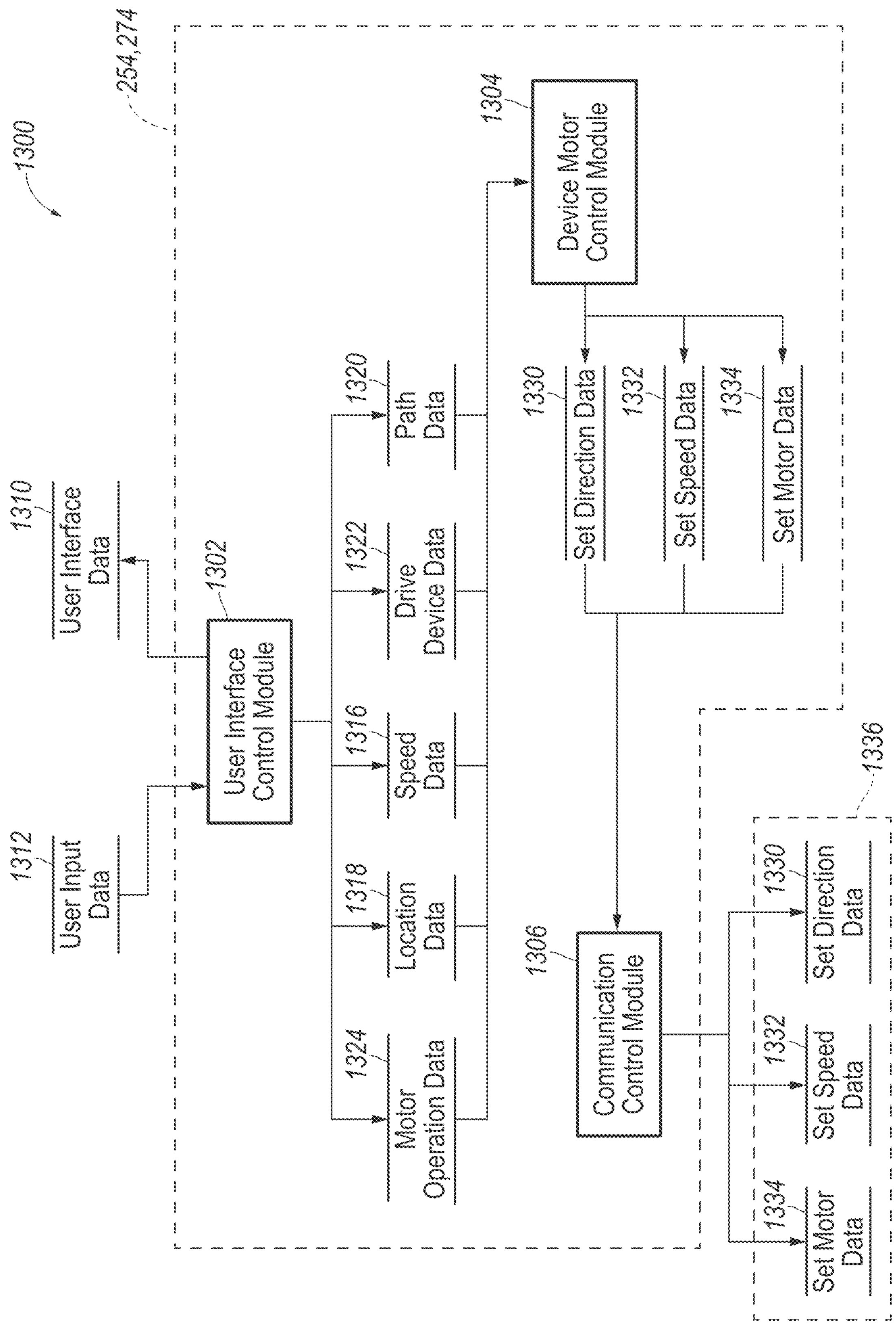
FIG. 47 is a dataflow diagram illustrating a multiple device control system of the system of FIG. 1, in accordance with various examples.

In one example, when two or more of the drive device system 102 are coupled together, the remote control 106 and/or the personal electronic device 108 may be used to control the drive device systems 102 to operate singly or in unison. In this regard, as shown in more detail with regard to FIG. 47 and with continued reference to FIGS. 1-46, a dataflow diagram illustrates various examples of a multiple device control system 1300, which may be embedded within the remote controller 254 and the personal controller 274. Various examples of the multiple device control system 1300 according to the present disclosure can include any number of sub-modules embedded within the remote controller 254 and the personal controller 274. As can be appreciated, the sub-modules shown in FIG. 47 can be combined and/or further partitioned to similarly control the one or more drive device systems 102 by the remote control 106 or the personal electronic device 108. Inputs to the multiple device control system 1300 may be received from the remote human-machine interface 250 (FIG. 1), the personal human-machine interface 270 (FIG. 1), received from other control modules (not shown) associated with the remote control 106 and the personal electronic device 108, and/or determined/modeled by other sub-modules (not shown) within the remote controller 254 and the personal controller 274. In various examples, the multiple device control system 1300 includes a user interface control module 1302, a device motor control module 1304 and a communication control module 1306.

The user interface control module 1302 outputs user interface data 1310. The user interface data 1310 comprises data for the rendering on the remote human-machine interface 250 or the personal human-machine interface 270 a user interface, such as a graphical user interface, which enables a user to interact with the one or more drive device systems 102. In one example, the user interface rendered by the user interface data 1310 enables the user to draw or select with an input device, such as a stylus, finger and the like, an object coupled to the one or more drive device systems 102 along with a location of the drive device systems 102 on the object and a path of movement for the object. The user may also input dimensions for the object, and the user interface control module 1302 may determine an object coordinate system based on the object dimensions. The user interface rendered by the user interface data 1310 also enables the user to input a desired speed for the motor 116 of the one or more drive device system 102, along with a desired mode of operation for the motor 116 of the one or more drive device system 102.

The user interface control module 1302 receives as input user input data 1312. The user input data 1312 comprises data generated by a user's interaction with the remote human-machine interface 250 or the personal human-machine interface 270. The user interface control module 1302 processes the user input data 1312 and sets speed data 1316, location data 1318, path data 1320, drive device data 1322 and motor operation data 1324 for the device motor control module 1304. The speed data 1316 is a speed for the operation of the motor 116. The location data 1318 comprises a position of each of the one or more drive device systems 102. In one example, the position of each of the drive device systems 102 relative to the object may be received with the user input data 1312, or determined from a position of each of the drive device systems 102 relative to the object as drawn on the user interface. For example, the user may drag and drop or pin a graphical representation of each of the drive device systems 102 onto a graphical representation of the object. The user interface control module 1302 may determine a position of each of the drive device systems 102 relative to the object coordinate system based on the dimensions of the object and the location of the drive device systems 102 as positioned relative to the object coordinate system. The graphical representation of the drive device systems 102 may also include identification data regarding the particular drive device system 102, such as the device data 332, a serial number or the like. In addition, a photograph, blueprint, sketch, drawing, video or the like may be received as input and processed by the user interface control module 1302 to determine the location of the object and the drive device systems 102 relative to the object. In other examples, each of the drive device systems 102 may cooperate with the remote communication system 252 or the personal communication system 272 to perform a radio frequency triangulation to determine the location of the drive device systems 102 relative to the remote controller 254 or the personal controller 274.

The path data 1320 comprises a path of movement or manipulation of the object, which is defined in the coordinate system. The distance or path for the object to move can be entered with the user input data 1312. In other examples, a data stream from the sensing device 104 or the imaging system 126 may be used to determine a starting position, to detect change of position if needed, to stop, to change position, etc. As another example, the user input data 1312 may be received from a joystick or the like that enables the user to input the path data 1320 substantially in real-time. As a further example, the user input data 1312 may indicate a master one of the drive device systems 102, and the remaining drive device systems 102 may be controlled by the remote controller 254 or the personal controller 274 to follow the speed and rotation of the master one of the drive device systems 102.

The drive device data 1322 comprises a number of the drive device systems 102 coupled to the object. The motor operation data 1324 comprises a mode of operation for the motor 116, such as the regular output mode, the hammer output mode, the synchronized output mode, etc.

The device motor control module 1304 receives as input the motor operation data 1324. Based on the mode of operation of the motor 116, the location of the motor 116 on the object, the speed of the motor 116, and the path of travel for the object, the device motor control module 1304 determines set direction data 1330, set speed data 1332 and set motor data 1334. The direction data 1330 comprises data that indicates a direction of rotation for the output shaft 190, such as clockwise or counterclockwise. The speed data 1332 comprises data that indicates a speed for the rotation of the drive terminal connector 152. The motor data 1334 comprises data that indicates the mode of operation for the motor 116, which may include an identifier for the particular motor 116 that is to operate at the set speed and direction. For example, the remote controller 254 or the personal controller 274 may implement a master/slave point and line algorithm based on a position of the motors 116. A master one of the motors 116 may be aligned to 12 o'clock and other motors 116 may follow about that line and function.

The communication control module 1306 receives as input the set direction data 1330, the set speed data 1332 and the set motor data 1334. The communication control module 1306 outputs the set direction data 1330, the set speed data 1332 and the set motor data 1334 as motor data 1336 for the one or more drive device systems 102. In one example, the remote controller 254 or the personal controller 274 implements instructions of a master algorithm that designates one of the motor 116 of the drive device systems 102 as a master motor that receives the control signals and operate multiple ones of the motors 116; and receives the control signals and communicates those control signals to multiple ones of the motors 116. In another example, a signal can be sent to multiple motors 116 to operate the same function at the same speed. A bypass function can also be available, which enables communication between motors 116 in the instance of an issue with an adjacent one of the motors 116. For example, if 400 drive device systems 102 are coupled together mechanically and electrically to move a pipe, with all of the drive device systems 102 daisy chained together and the motor 116 of the fifth drive device system 102 stops functioning, the bypass function allows the remaining drive device systems 102 (so the $6^{th}$ drive device system 102 to the $400^{th}$ drive device system 102) to continue to operate and perform the task. The bypass function may also adjust a timing of the subsequent motors 116 downstream ($6^{th}$ to $400^{th}$) to ensure substantially synchronous motion of the assembly of the drive device systems 102 during performance of the task.

For example, in the instance of four of the drive device system 102 coupled to an object, such as a desk chair, at each wheel of the desk chair, the multiple device control system 1300 may enable the motor 116 of a particular one of the drive device systems 102 to drive one of the wheels of the desk chair to rotate the desk chair. In another example, two or more of the motors 116 may be driven substantially synchronously to move the desk chair in a horizontal, or other input path.

In addition, the multiple device control system 1300 may be used to control two or more of the drive device systems

102 when they are coupled together such as shown in FIGS. 35, 36 and 42-46. For example, the user may interact with the user interface data 1310 to input a hammer mode operation for the drive device systems 102. The device motor control module 1304 may set the set direction data 1330, the set speed data 1332 and the set motor data 1334 for outputting by the communication control module 1306 such that the motors 116 operate in a hammer mode in which each motor 116 of the drive device systems 102 is commanded to hammer at a predetermined time offset such that as each of the motors 116 hammer the combined output results in a substantially continuous impact, thereby maximizing the output of the motors 116.

Further, the multiple device control system 1300 may be used to control the two or more of the drive device systems 102 when they are coupled together such as shown in FIGS. 35, 36 and 42-46 so that the motors 116 of the two or more drive device systems 102 synchronized. For example, based on the location data 1318, the remote controller 254 or the personal controller 274 may output the set direction data 1330, the set speed data 1332 and the set motor data 1334 such that the output of the motors 116 occurs at substantially the same time. In other words, the output of each of the drive device system 102 is lifting, moving or ceasing to operate at the same time. This ensures that fragile items are lifted, moved or stopped at all contact points at substantially the same time. In one example, the remote controller 254 or the personal controller 274 may include a time delay or time data in the motor data 1336 that provides a time to activate the motor 116 based on the location data 1318, for example. The remote controller 254 or the personal controller 274 may also provide a shutdown sequence in the instance of a low charge of one or more of the power source 118 when two or more of the drive device systems 102 are coupled together. In one example, the remote controller 254 or the personal controller 274 may command the motor 116 with the low power enter a neutral position when power is low to allow the other motors 116 to continue the task. In another example, the user input data 1312 may receive an override request as input, which may instruct the motors 116 to continue with low power if the task is close to completion. In yet another example, the drive device systems 102 may power share between each other to provide supplemental power in the instance one of the drive device systems 102 has low power.

It should be noted that the housing 130 of the drive device systems 102 and/or the sensing housing 236 of the sensing device 104 may also include an Ethernet connector and/or a power switch. The Ethernet connector and the power switch are each in communication with the respective one of the controller 124 and the sensing controller 234. In addition, each of the housing 130 and the sensing housing 236 may be hermetically sealed. The drive terminal connector 152 may be coupled to sockets of various sizes. Either one of the wheel body 1016 and the wheel body 1118 may be configured to rotate and swivel. In addition, the drive device system 102 may include the sensor 230, such that the sensor 230 need not be coupled to the drive device system 102 via the sensing device 104. The receiver 109 and/or the object may also include one or more batteries, which may wirelessly or through a wired connection, recharge the power source 118 of the drive device system 102.

In addition, it should be noted that the drive device system 102 may interface with robots, machines or the like using the communication system 122. Thus, the communication system 122 is not limited to receiving data and commands from the remote control 106 and/or the personal electronic device 108.

Further, it should be noted that while the drive device system 102 has been described herein as including the communication system 122, in some examples, the drive device system 102 need not include the communication system 122. In these instances, the controller 124 may be responsive to input received from the human-machine interface 120, such as a switch or a button of the human-machine interface 120, to drive the motor 116 to output torque to the output shaft 190.

In addition, it should be noted that one or more batteries or battery packs can be configured to be coupled to the driven coupler 112 such that power from the one or more batteries or battery packs can be communicated to the power source 118 to charge the power source 118, for example. In addition, the controller 124 may output on the human-machine interface 120 one or more notifications regarding a level of the power source 118 to inform the user of an amount of charge of the battery.

In another example, the drive device system 102 may be operable to load itself into an object, such as a vehicle, based on the scanning of an optical panel. For example, one or more optical panels with polygonal shapes, such as circles, squares, etc. may be coupled to the object. A corresponding optical panel may be coupled to the drive device system 102, and when the optical panels are aligned, the drive device system 102 may determine a location of the drive device system 102 relative to the object, which enables the controller 124 to control the motor 116 to move the drive device system 102 relative to the object. In another example, stereo vision may be provided by the imaging system 126 and/or the sensor system 129, which may act as a level line indicator, stop line indicator and/or a reference marker to move the drive device system 102 relative to the object. In other examples, the path of travel for the drive device system 102 is received as input to the human-machine interface 120, for example, by drawing the path on the touchscreen interface associated with human-machine interface 120.

Figure 48:
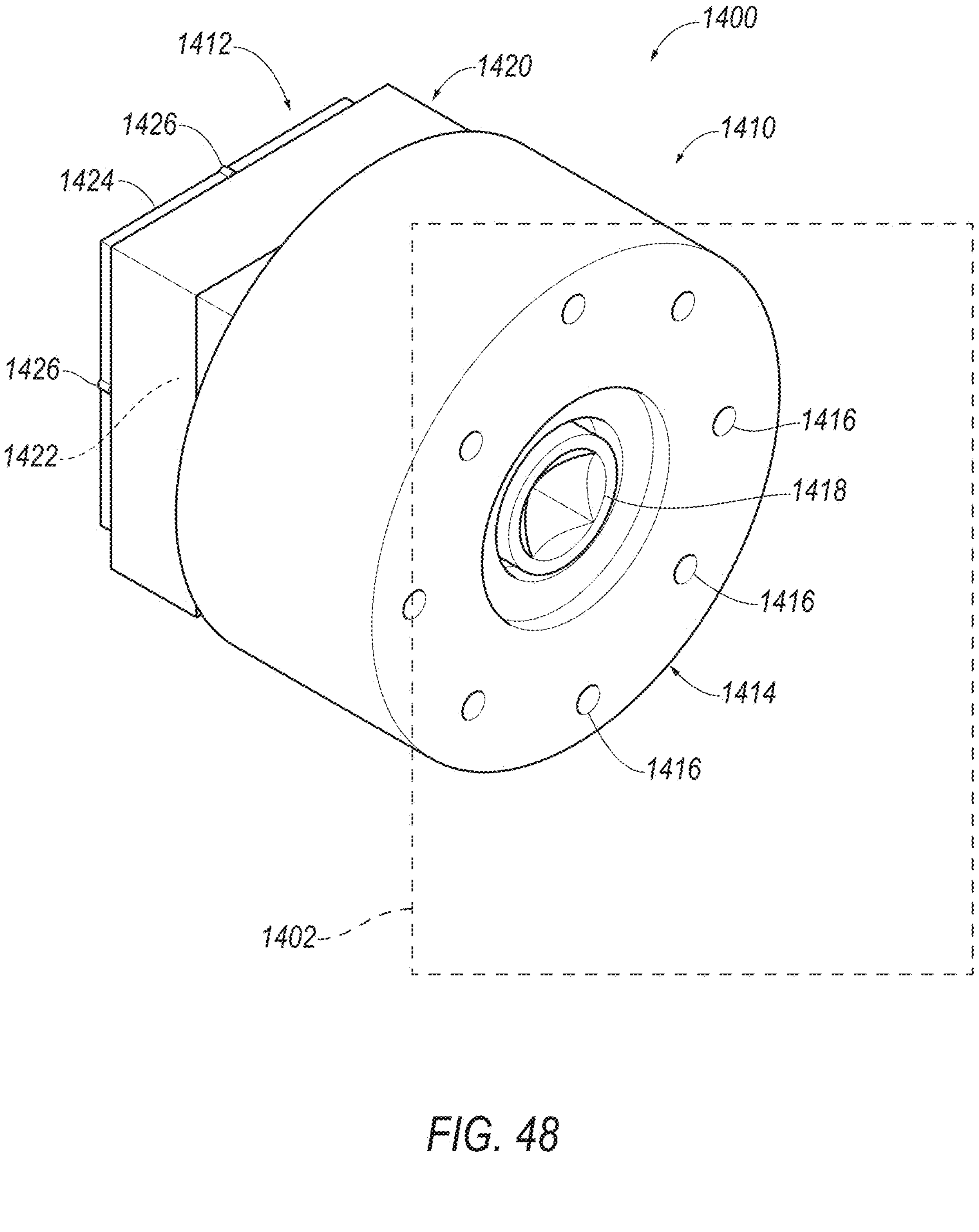
FIG. 48 is a schematic perspective view of a connector in accordance with various examples.
Figure 49:
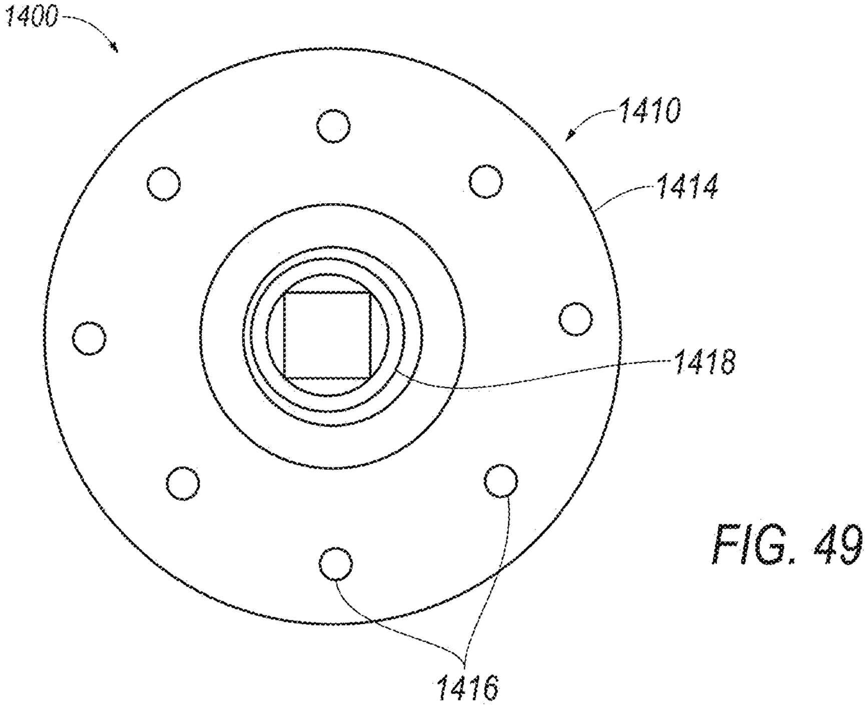
FIG. 49 is an end view of the connector of FIG. 48.

In addition, it should be noted that in certain examples, a connector 1400 may be used with a drill 1402 or the like to enable the drill 1402 to interface with one of the drive device systems 102 or the receiver 109. For example, with reference to FIG. 48, the connector 1400 includes a drill connector 1410 and a receiver connector 1412. Generally, the connector 1400 includes a geometric shaped head that provides anti-torque while being used with one of the drive device systems 102 or the receiver 109. For example, the connector 1400 may enable the drill 1402 to turn a lead screw from a trailer jack. The connector 1400 may be composed of a metal, metal alloy or polymer-based material, and can be cast, additively manufactured, etc. The drill connector 1410 comprises any suitable interface for coupling the connector 1400 to the drill 1402. For example, with reference to FIGS. 48 and 49, the drill connector 1410 comprises a chuck 1414 that includes mating posts 1416 for coupling the connector 1400 to a receiver on the drill 1402. The chuck 1414 also includes a throughbore 1418, which enables a drill bit or the like to pass through the drill connector 1410 and into the receiver connector 1412.

Figure 50:
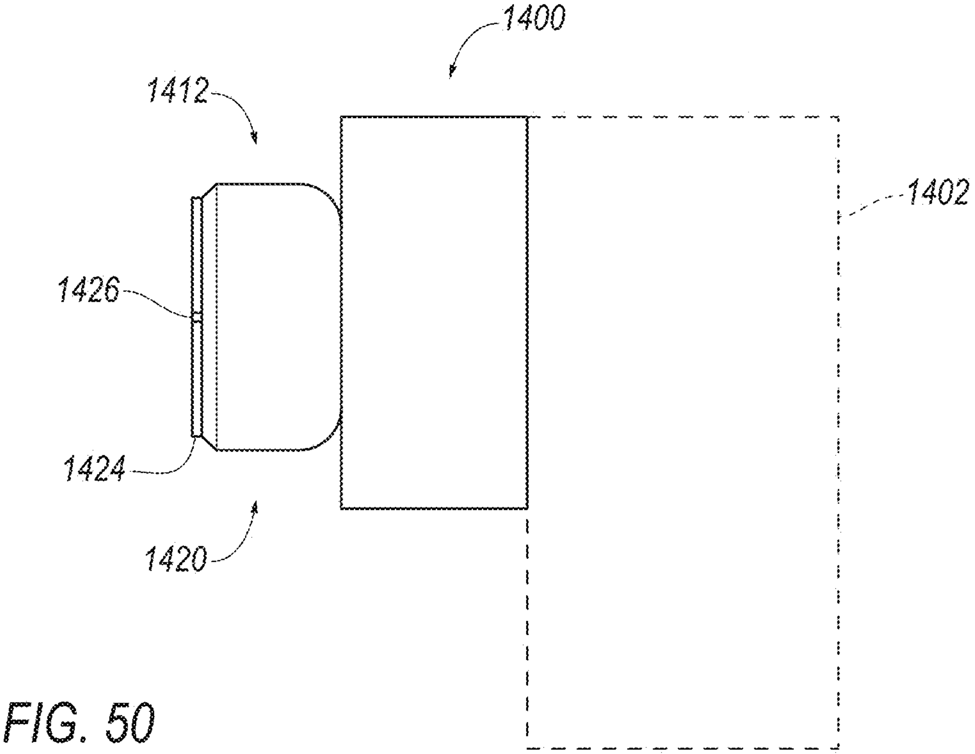
FIG. 50 is a side view of the connector of FIG. 48.

The receiver connector 1412 includes a connector head 1420. The connector head 1420 is non-circular so as to inhibit rotation of the drill 1402 when coupled to the one of the drive device systems 102 or the receiver 109. In one example, the connector head 1420 is substantially rectangular or square, but the connector head 1420 may have any desired non-circular polygonal shape. The connector head 1420 defines a connector drive receptacle 1422. The connector drive receptacle 1422 surrounds the drill bit or the like, which extends through the throughbore 1418 and permits one of the drive device systems 102 or the receiver 109 to be driven by the drill 1402. With reference to FIG. 50, the connector head 1420 may include a connector lip 1424, which is tapered. The connector lip 1424 surrounds a perimeter of the connector head 1420 to assist in coupling the connector head 1420 to another one of the drive device systems 102 or the receiver 109, for example.

In one example, the connector lip 1424 includes at least one or a plurality of first detent latches 1426. The first detent latches 1426 are spaced apart about a perimeter of the connector lip 1424. In this example, the connector lip 1424 includes about four of the first detent latches 1426, but the receiver connector 1412 may include any number of the first detent latches 1426 depending upon the shape of the connector head 1420. The first detent latches 1426 are received within a corresponding one of the detent channels 176 (FIGS. 4A-4B) to couple the receiver connector 1412 to the driven coupler 112. The first detent latches 1426 are defined in the connector lip 1424 and are movable between at least a first position in which the first detent latches 1426 are received within the detent channel 176, and a second position, in which the first detent latches 1426 are recessed within the perimeter of the connector lip 1424. In the first position, the first detent latches 1426 assist in coupling the connector 1400 to another one of the drive device systems 102 or the receiver 109. In the second position, the first detent latches 1426 permit the uncoupling of the one of the drive device systems 102, the receiver 109 or the object. In one example, each of the first detent latches 1426 may include a respective biasing member or spring, which biases or applies a spring force to maintain the first detent latches 1426 in the first position.

Figure 51:
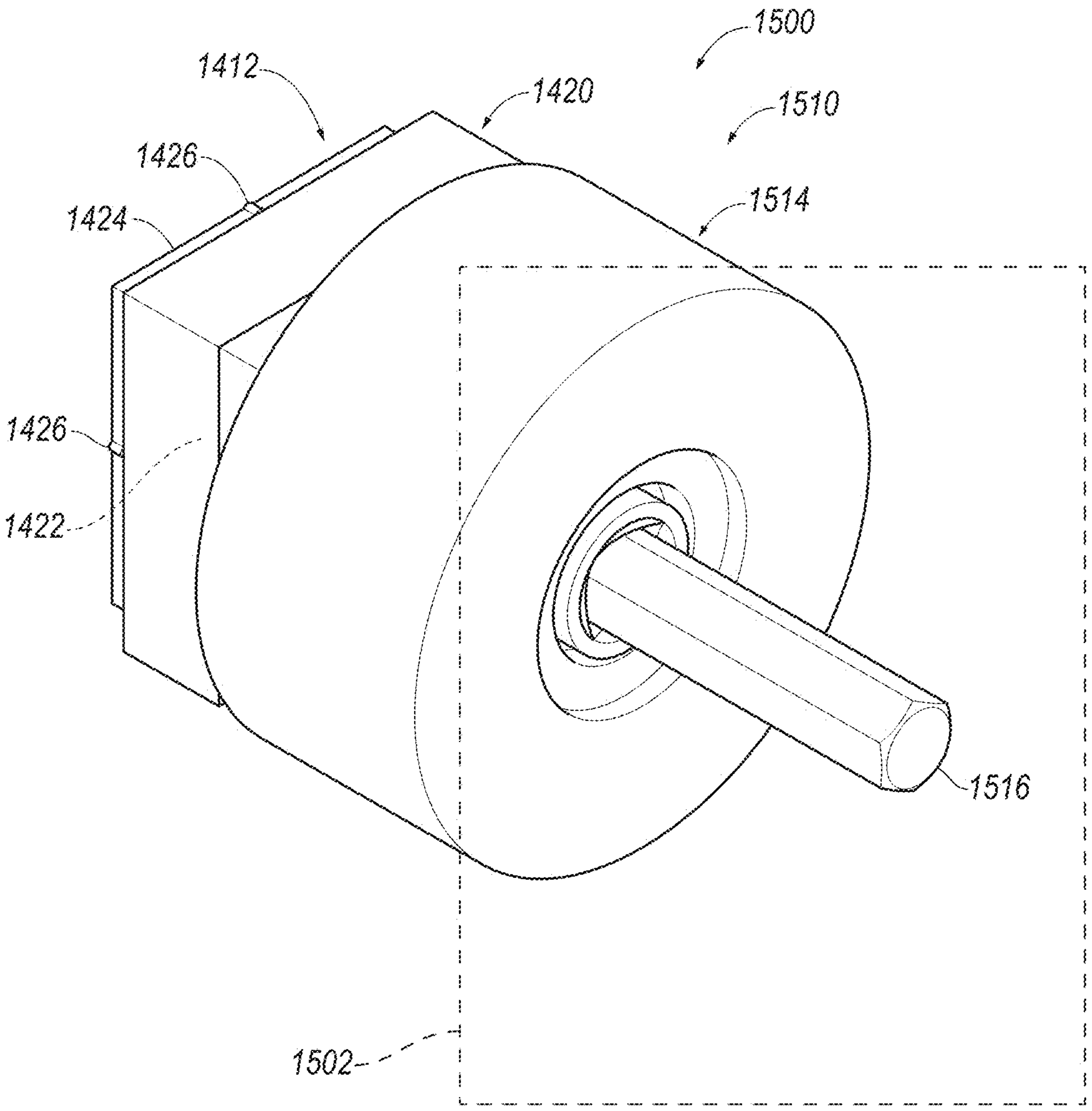
FIG. 51 is a schematic perspective view of another exemplary connector in accordance with various examples.

In addition, it should be noted that in certain examples, a connector 1500 may be used with a drill 1502 or the like to enable the drill 1502 to interface with one of the drive device systems 102 or the receiver 109. For example, with reference to FIG. 51, the connector 1500 includes a drill connector 1510 and the receiver connector 1412. Generally, the connector 1500 includes a geometric shaped head that provides anti-torque while being used with one of the drive device systems 102 or the receiver 109. For example, the connector 1500 may enable the drill 1502 to be attached to the receiver 109, which is coupled to an office fan to rotate the office fan. In one example, the connector 1500 may also include a communication system, such as the communication system 122 in a separate housing that is coupled to the connector 1500, which provides two-way communication between the drill 1502 and the receiver 109. This allows a user to remotely cause the drill 1502 to operate to drive the drive device system 102 or the receiver 109 coupled to the drill 1502 via the connector 1500. As a further example, a plurality of the drill 1502 may be coupled to a respective one of a plurality of the receivers 109 along with a plurality of the communication systems, such as the communication system 122 in the separate housing, to drive an object, such as a cart, to rotate shafts or axles associated with the object with two, four or eight wheel drive, for example. In this example, the remote controller 254 or the personal controller 274 may be employed to synchronize the output of the drills 1502 such that the movement of the object was substantially uniform or synchronized.

Figure 52:
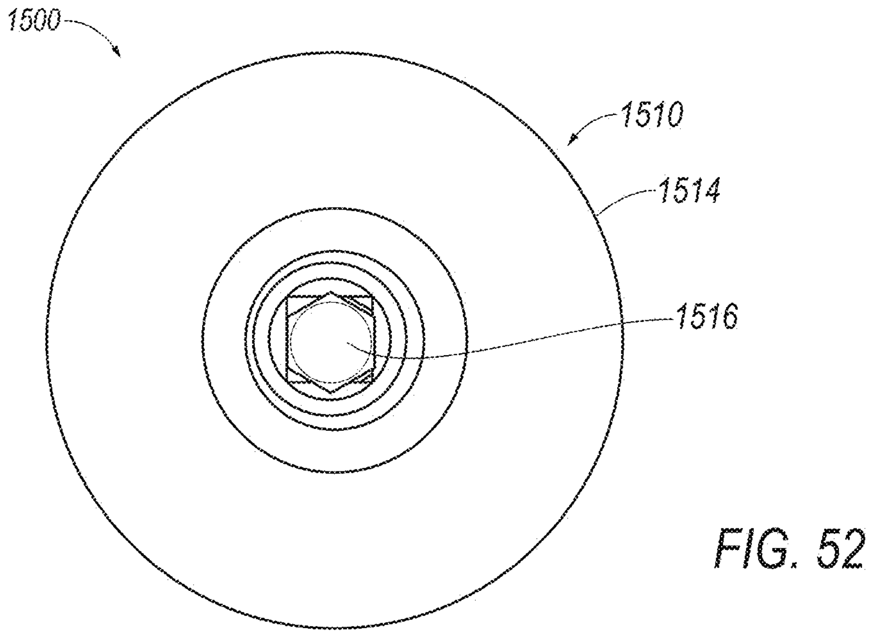
FIG. 52 is an end view of the connector of FIG. 51.

The connector 1500 may be composed of a metal, metal alloy or polymer-based material, and can be cast, additively manufactured, etc. The drill connector 1510 comprises any suitable interface for coupling the connector 1500 to the drill 1502. For example, with reference to FIG. 52, the drill connector 1510 comprises a chuck 1514 that includes a drill bit 1516. The drill bit 1516 can be coupled to a corresponding chuck of the drill 1502 to couple the connector 1500 to the drill 1502.

Figure 53:
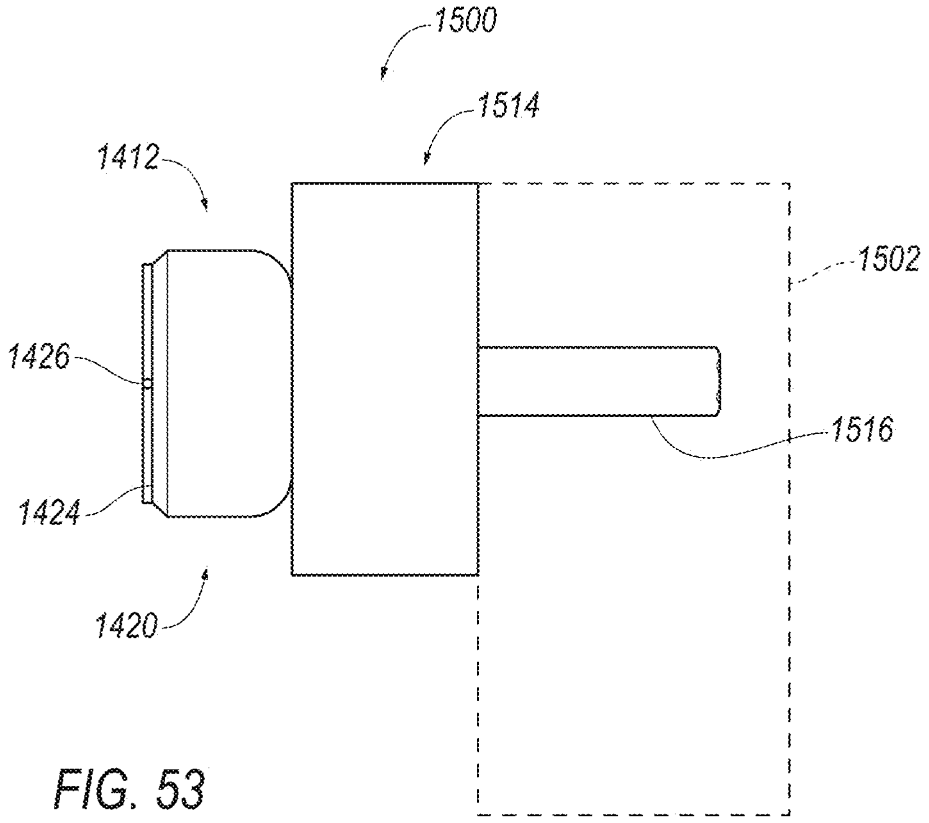
FIG. 53 is a side view of the connector of FIG. 51.

The receiver connector 1412 includes the connector head 1420 that is non-circular so as to inhibit rotation of the drill 1502 when coupled to the one of the drive device systems 102 or the receiver 109. The connector head 1420 defines the connector drive receptacle 1422. The connector drive receptacle 1422 surrounds the drill bit 1516, which permits one of the drive device systems 102 or the receiver 109 to be driven by the drill 1502. With reference to FIG. 53, the connector head 1420 may include the connector lip 1424 that surrounds a perimeter of the connector head 1420 to assist in coupling the connector head 1420 to another one of the drive device systems 102 or the receiver 109, for example. The connector lip 1424 includes the first detent latches 1426.

Figure 54:
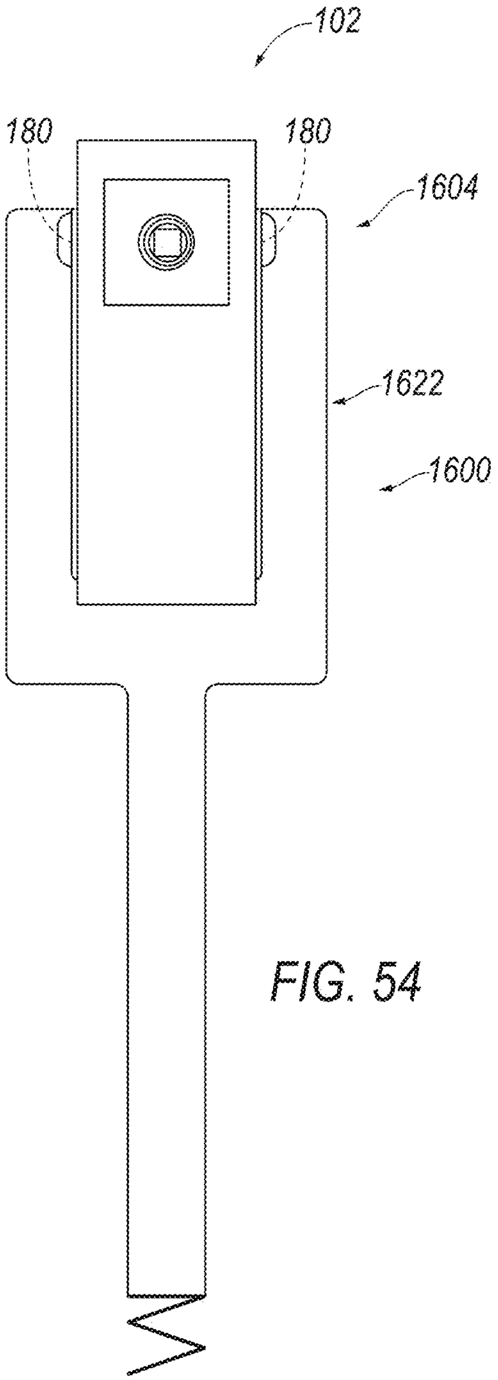
FIG. 54 is a front view of the drive device system of FIG. 2 coupled to a pole.
Figure 55:
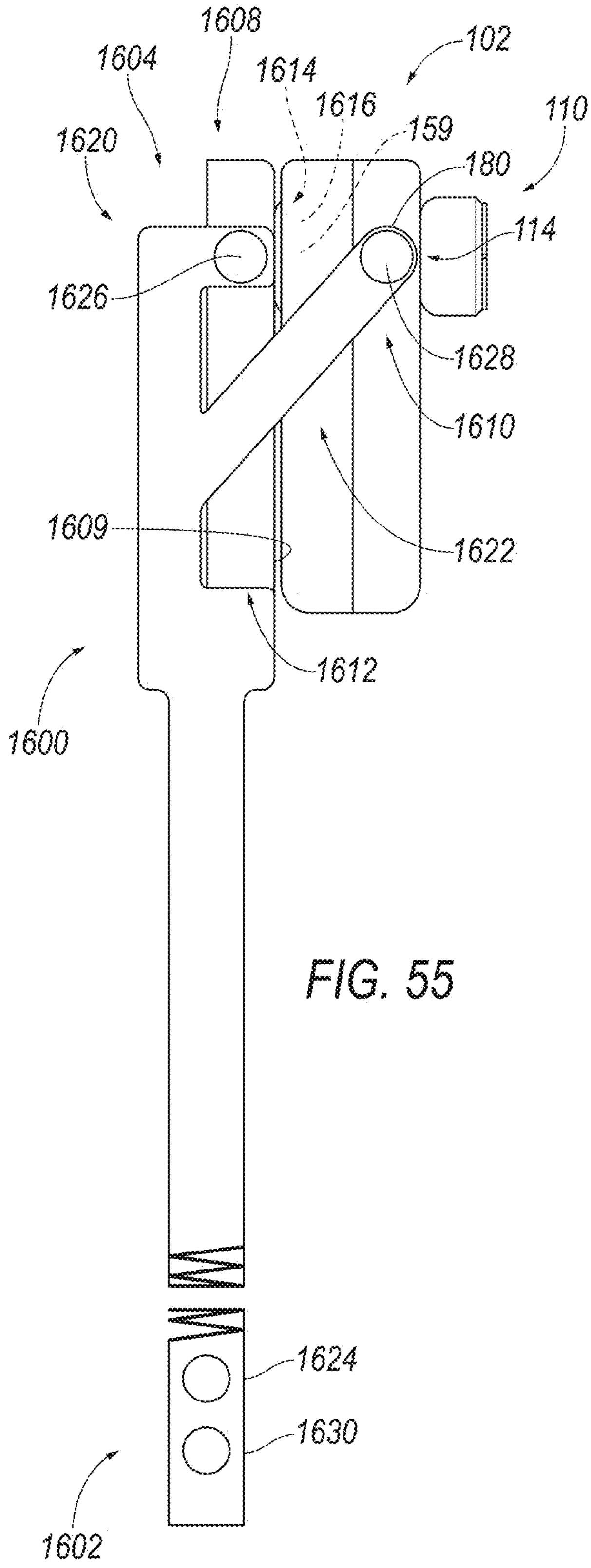
FIG. 55 is a side view of the drive device system and pole of FIG. 54.

In addition, with reference to FIGS. 54 and 55, it should be noted that one or more objects may be used in conjunction with the drive device system 102 to position the drive device systems 102 to perform a task. In one example, a pole 1600 may be used with one or more of the drive device systems 102 to position the one or more drive device system 102 at a desired location. It should be noted that while the pole 1600 is described and illustrated herein as comprising a single pole, the pole may be comprise multiple poles connected together, such as a tripod, a telescoping pole or the like. The pole 1600 may have a predetermined length, which enables the positioning of the drive device system 102 in hard to reach places. The pole 1600 may be composed of a metal, metal alloy or polymer-based material, and can be cast, additively manufactured, etc. The pole 1600 may include a base 1602 (FIG. 55), which is graspable by a user. The pole 1600 may include a pole head 1604 opposite a terminal end of the base 1602, which may be coupled to the drive device system 102. For example, with reference to FIG. 55, the pole head 1604 may include a pole coupling portion 1608 and a pole release 1610. The pole coupling portion 1608 couples the drive device system 102 to the pole 1600. In one example, the pole coupling portion 1608 may comprise a connector 1612 that extends outwardly from a planar coupling surface 1609. Generally, the connector 1612 includes a geometric shaped head that provides anti-torque while being used with one of the drive device systems 102. The connector 1612 includes a connector head 1614. The connector head 1614 is non-circular so as to inhibit rotation of the drive device system 102 when coupled to the pole 1600. In one example, the connector head 1614 is substantially rectangular or square, but the connector head 1614 may have any desired non-circular polygonal shape. The connector head 1614 may include a connector lip 1616, which is tapered. The connector lip 1616 surrounds a perimeter of the connector head 1614 to assist in coupling the connector head 1614 to the drive device system 102.

In one example, the connector lip 1616 includes the first detent latches 159. The first detent latches 159 are spaced apart about a perimeter of the connector lip 1616. In this example, the connector lip 1616 includes about four of the first detent latches 159, but the connector 1612 may include any number of the first detent latches 159 depending upon the shape of the connector head 1614. The first detent latches 159 are received within a corresponding one of the detent channels 176 (FIGS. 4A-4B) to couple the connector 1612 to the driven coupler 112 of the drive device system 102. The first detent latches 159 are defined in the connector lip 1616 and are movable between at least a first position in which the first detent latches 159 are received within the detent channel 176, and a second position, in which the first detent latches 159 are recessed within the perimeter of the connector lip 1616. In the first position, the first detent latches 1426 assist in coupling the connector head 1614 to the drive device system 102. In the second position, the first detent latches 159 permit the uncoupling of the drive device system 102. In one example, each of the first detent latches 159 may include a respective biasing member or spring, which biases or applies a spring force to maintain the first detent latches 159 in the first position.

In one example, the pole release 1610 includes a first release system 1620 and a second release system 1622. The first release system 1620 is coupled to and in communication with the first detent latches 159 coupled to the connector lip 1616 and the release system 114 of the drive device system 102 connected to the pole 1600. In one example, the first release system 1620 includes a first release button 1624, which is in communication with a first release actuator 1626 and a second release actuator 1628. The first release button 1624 may be coupled to the pole 1600 at the base 1602 for easy access by the user.

The first release actuator 1626 may comprise any suitable mechanism to move the first detent latches 159 from at least the first position to the second position to release the drive device system 102 from the connector head 1614. For example, the first release actuator 1626 may comprise a pair of links, which are responsive to a depression of the first release button 1624 to move the first detent latches 159. In this example, a depression or movement of the first release button 1624 causes the respective link to move inward, which in turn, pulls the first detent latches 159 inward, against the force of the spring, such that the first detent latch 159 is recessed or in the second position. It should be noted that the use of the links is merely an example, as the first detent latches 159 may be electrically controlled and movable via a solenoid or the like, for example.

The second release actuator 1628 may comprise any suitable mechanism to move the release system 114 of the drive device system 102 coupled to the pole 1600 to release the drive device system 102 from an object to which it is coupled. For example, the second release actuator 1628 may comprise a pair of links, which are responsive to a depression of the second release actuator 1628 to move and depress the release buttons 180 of the drive device system 102. In this example, a depression or movement of the first release button 1624 causes the respective link to move, which in turn, pushes the release buttons 180 inward so that the first detent latches 159 on the drive coupler 110 are recessed or in the second position to release the drive device system 102 from the object. It should be noted that the use of the links is merely an example, as the first detent latches 159 may be electrically controlled and movable via a solenoid or the like, for example.

Thus, generally, the first release system 1620 comprises any suitable mechanical or electromechanical mechanism to release the drive device system 102 from the connector head 1614 and to release the drive device system 102 from the object to which it is coupled. In addition, in certain instances, the release of the drive device system 102 from the pole 1600 and the object may be accomplished by an input received to one of the remote control 106 and/or personal electronic device 108.

The second release system 1622 includes a second release button 1630, which is in communication with the second release actuator 1628. The second release button 1630 may be coupled to the pole 1600 at the base 1602 for easy access by the user. In this example, a depression or movement of the second release button 1630 causes the respective link of the second release actuator 1628 to move, which in turn, pushes the release buttons 180 inward so that the first detent latches 159 on the drive coupler 110 are recessed or in the second position to release the drive device system 102 from the object.

Figure 56:
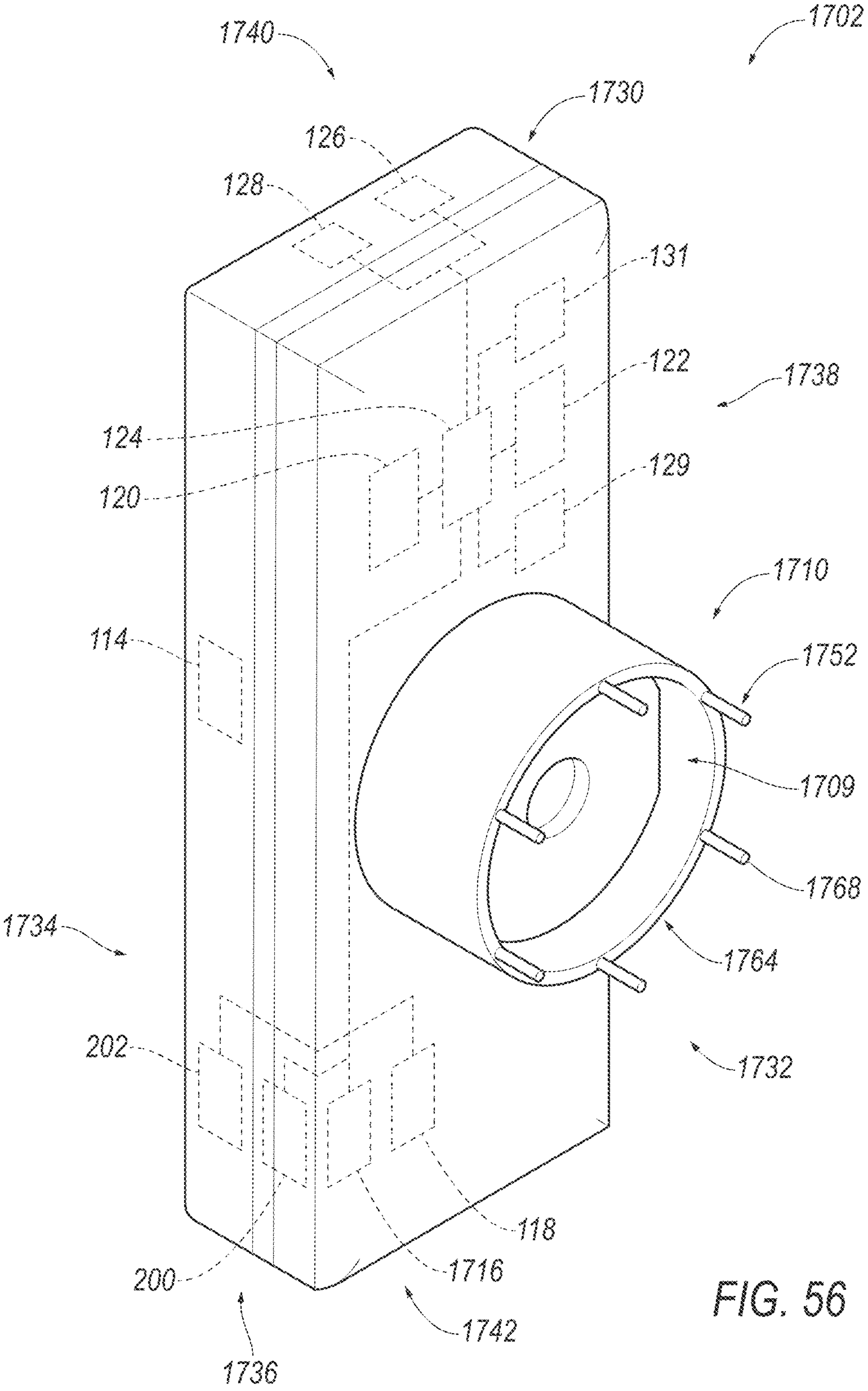
FIG. 56 is a schematic perspective view of another exemplary drive device system for use with the system of FIG. 1, which includes an exemplary receiver.

In addition, it should be noted that in other examples, the drive device system 102 may be configured differently for use with the portable system 100. For example, with reference to FIG. 56, a drive device system 1702 is shown. The drive device system 1702 may be used individually or coupled together with the drive device system 102 to manipulate the object. Generally, the drive device system 1702 is responsive to one or more control signals from the remote control 106 and/or the personal electronic device 108 (FIG. 1) to manipulate an object, such as a position of the object. In certain instances, a receiver 1709 may be coupled to the object and may be configured to communicate information regarding the object to the drive device system 1702. The drive device system 1702 may be used with or without the receiver 1709 to move or manipulate the position of the object. Given the compact size of the drive device system 1702, a user may easily connect the drive device system 1702 and the receiver 1709, if employed, to the object to manipulate the position of the object without requiring assistance. This enables a user to use the drive device system 1702 to manipulate the position of heavy, awkward and/or cumbersome objects without requiring the user seek additional assistance.

Figure 57:
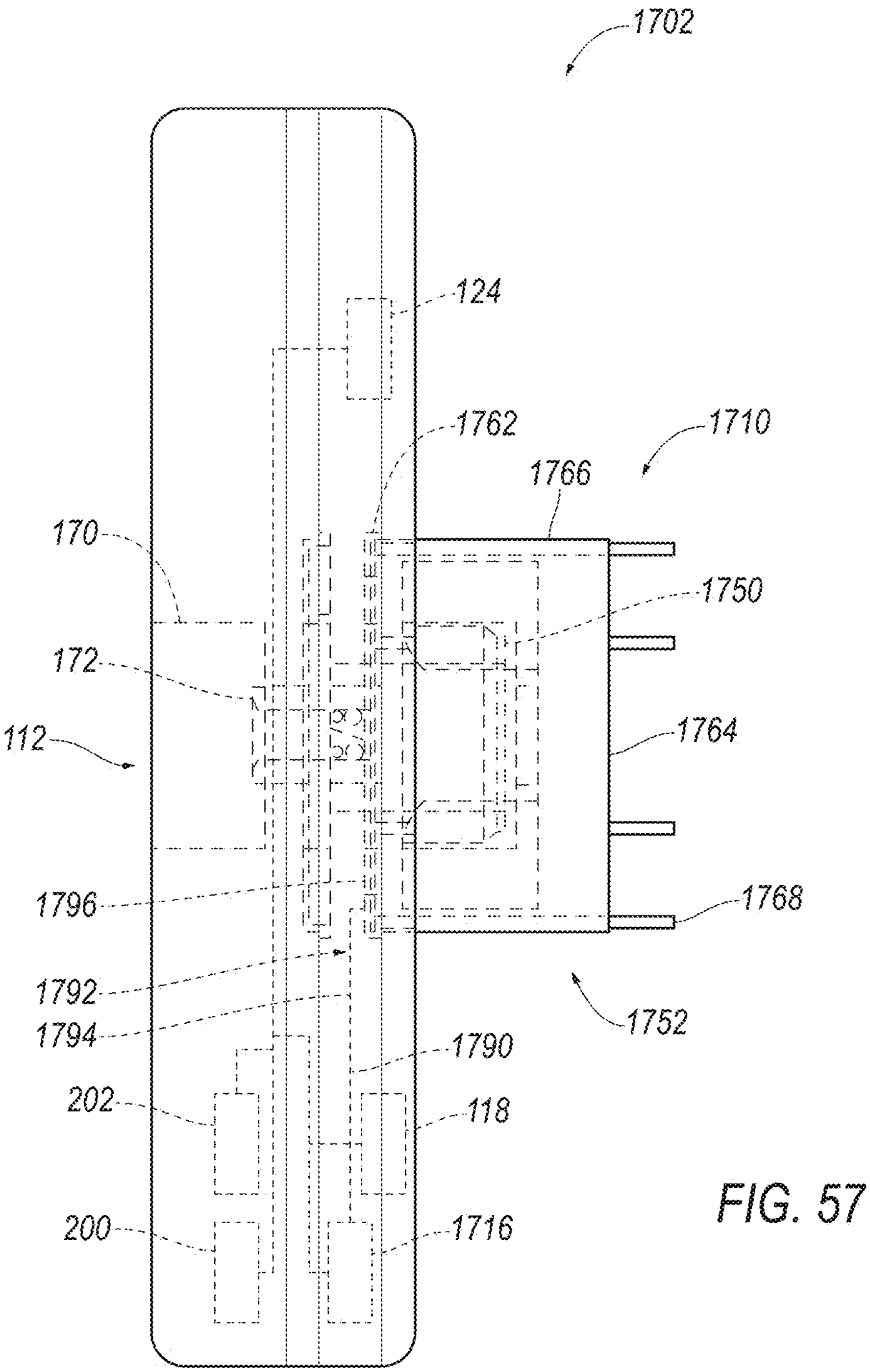
FIG. 57 is a side view of the drive device system of FIG. 56.

In one example, the drive device system 1702 includes a first, drive coupler 1710, the second, driven coupler 112 (FIG. 57), a motor 1716, the power source 118, the human-machine interface 120, the communication system 122 and the controller 124. Optionally, the drive device system 1702 may also include the release system 114, the imaging system 126, the illumination system 128 and the sensor system 129. In certain instances, the drive device system 1702 may also include the temperature management system 131. At least a portion of the motor 1716, the power source 118, the human-machine interface 120, the communication system 122, the controller 124, the imaging system 126, the illumination system 128, the sensor system 129 and the temperature management system 131 may be disposed within a housing 1730 associated with the drive device system 1702. The driven coupler 112 includes the driven receptacle 170 and the driven terminal connector 172 (FIG. 57).

In one example, the housing 1730 is substantially rectangular, however, the housing 1730 may have any desired shape. Generally, the housing 1730 may be composed of a polymer-based material, however, the housing 1730 may also be composed of a metal or metal alloy. The housing 1730 includes a first side 1732 opposite a second side 1734, a third side 1736 opposite a fourth side 1738, and a first end 1740 opposite a second end 1742. Each of the first side 1732, the second side 1734, the third side 1736, the fourth side 1738, the first end 1740 and the second end 1742 are substantially smooth, flat or planar, and may include beveled or rounded corners and edges. It should be noted that one or more of the first side 1732, the second side 1734, the third side 1736, the fourth side 1738, the first end 1740 and the second end 1742 may include a texture, such as knurling or the like, to facilitate grasping of the drive device system 1702 by a user.

In one example, the drive coupler 1710 is coupled to the first side 1732, and the driven coupler 112 is coupled to the second side 1734. Thus, generally, the drive coupler 1710 is positioned on the drive device system 1702 so as to be opposite the driven coupler 112. As will be described, this may facilitate a transfer of torque and/or power from one of the drive device systems 102 and/or the sensing device 104 to the drive device system 1702 when coupled together. In this example, the first side 1732 defines an opening 1744, which is sized and shaped to enable the drive coupler 1710 to be coupled to the motor 1716 (FIG. 58).

If employed, the release system 114 may coupled to the drive device system 1702 such that at least a portion of the release system 114 is movable relative to each of the third side 1736 and the fourth side 1738. The imaging system 126 may be coupled to the first end 1740 to provide the imaging system 126 with a field of view in front of the drive device system 1702. The illumination system 128 may be coupled to the first end 1740 so as to be visible when the drive device system 1702 is coupled to another one of the drive device systems 102, the sensing device 104, the receiver 1709 and/or the object. It should be noted, however, that the imaging system 126 and/or the illumination system 128 may be coupled to any one of the first side 1732, the second side 1734, the third side 1736, the fourth side 1738, the first end 1740 and the second end 1742. Further, in certain instances, the illumination system 128 may be coupled to more than one of the first side 1732, the second side 1734, the third side 1736, the fourth side 1738, the first end 1740 and the second end 1742.

Figure 58:
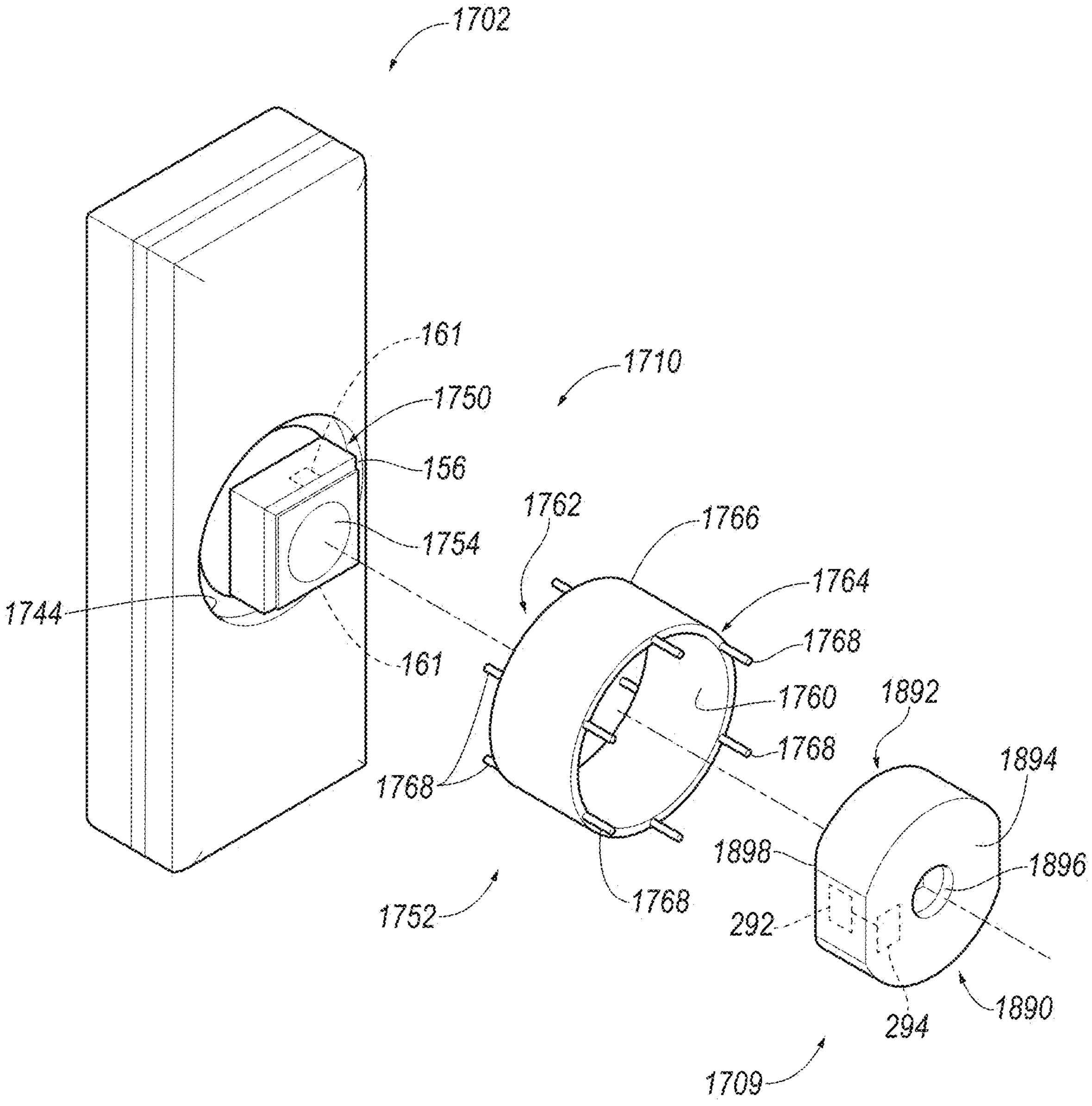
FIG. 58 is a partially exploded view of the drive device system of FIG. 56.

With reference to FIG. 58, the drive coupler 1710 includes a head 1750 and an object drive connector 1752. The head 1750 extends outwardly from the first side 1732 so as to be exposed on an exterior surface or portion of the housing 1730. In one example, the head 1750 is coupled to the housing 1730 so as to project outwardly from the first side 1732. The head 1750 is non-circular or has a non-circular geometry so as to inhibit rotation of the drive device system 1702 when coupled to the receiver 1709. In one example, the head 1750 is substantially rectangular or square, but the head 1750 may have any desired non-circular polygonal shape. The head 1750 extends outwardly from the first side 1732 and may define a receptacle 1754. The head 1750 may include a lip 1756, which is tapered. The lip 1756 surrounds a perimeter of the head 1750 to assist in coupling the head 1750 to the receiver 1709.

In one example, the head 1750 includes the communication terminals 161. As described, the communication terminals 161 may comprise electrical or magnetic contacts, which permit communication between the drive device system 1702 and the receiver 109 and/or the object. For example, the communication terminals 161 may be in communication with the receiver 1709 to permit data from the receiver 1709 to be transmitted to the controller 124 of the drive device system 1702.

The object drive connector 1752 is coupled to the motor 1716 and transmits torque from the motor 1716 to the object. In one example, the object drive connector 1752 is substantially annular and defines a connector bore 1760. The connector bore 1760 is sized such that the object drive connector 1752 may be positioned about the head 1750 and the receiver 1709. The object drive connector 1752 includes a first connector side 1762 opposite a second connector side 1764. The first connector side 1762 is interconnected to the second connector side 1764 via a connector sidewall 1766. In one example, the first connector side 1762 and the second connector side 1764 each include at least one or a plurality of prongs 1768. Each of the prongs 1768 extend outward or axially outward from the respective one of the first connector side 1762 and the second connector side 1764. In one example, each of the first connector side 1762 and the second connector side 1764 include about six of the prongs 1768, however, the first connector side 1762 and the second connector side 1764 may include any number of the prongs 1768 and the first connector side 1762 and the second connector side 1764 may include a different number of the prongs 1768, if desired. The prongs 1768 are illustrated and described herein as being the same on each of the first connector side 1762 and the second connector side 1764, but in other examples, the prongs 1768 associated with the first connector side 1762 may be different than the prongs 1768 associated with the second connector side 1764. The prongs 1768 of the first connector side 1762 are coupled to the motor 1716, and the prongs 1768 of the second connector side 1764 may be coupled to the object. Generally, the first connector side 1762 and a portion of the connector sidewall 1766 is positioned within the opening 1744 of the housing 1730 to be coupled to the motor 1716.

The motor 1716 is enclosed within the housing 1730. In one example, the motor 1716 is an electric motor, which may receive current from the power source 118 based on one or more control signals from the controller 124. The motor 1716 may be operable in one or a plurality of output modes or modes of operation, including, but not limited to a regular output mode, a hammer output mode, a synchronized output mode, etc. Thus, generally, the motor 1716 is in communication with the power source 118 and the controller 124. With reference to FIG. 57, the motor 1716 includes an output shaft 1790, which is coupled to the object drive connector 1752 via a gear set 1792. For example, the output shaft 1790 may include a drive gear 1794 at a terminal end, which meshingly engages with a driven gear 1796. The driven gear 1796 is coupled to the object drive connector 1752 and the driven terminal connector 172. The drive gear 1794 and the driven gear 1796 may comprise bevel gears. In one example, the driven gear 1796 includes a plurality of slots, bores or the like defined about a circumference of the driven gear 1796, which are each configured to receive a respective one of the prongs 1768 of the first connector side 1762. The coupling of the driven gear 1796 to the prongs 1768 of the object drive connector 1752 results in the driven gear 1796 driving the object drive connector 1752 and the object drive connector 1752 rotating with the rotation of the driven gear 1796. When the prongs 1768 of the second connector side 1764 are coupled to the object, the rotation of the object drive connector 1752 results in a manipulation of the position or a rotation of the object. For example, the prongs 1768 may be coupled to spokes associated with a tire or the like.

It should be noted that other gear arrangements or drive arrangements may be employed to transfer torque from the output shaft 1790 of the motor 116 to the object drive connector 1752, including, but not limited to a planetary gear set, etc. Generally, the motor 1716 may rotate the output shaft 1790 in either a clockwise or a counterclockwise direction based on one or more control signals received from the controller 124.

The power source 118 may be in wired communication with the motor 1716 to transfer power to the motor 1716 based on one or more control signals from the controller 124. Alternatively, or in addition, the power source 118 for the motor 1716 may comprise an external power source, or a power source external to the housing 1730. For example, the drive device system 1702 may also include the power receiver 200. In addition, the housing 1730 may include an induction charging pad 202 disposed proximate one of the first side 1732, the second side 1734, the third side 1736, the fourth side 1738, the first end 1740 and the second end 1742.

The receiver 1709 is coupled or mounted to the object. In one example, the receiver 1709 may be configured for use with a specific type of object and may include predefined or factory set data regarding the particular type of object. With reference to FIG. 58, the receiver 1709 may include a receiver coupler 1890, the receiver communication system 292 and the receiver controller 294. In certain instances, the receiver 1709 may not include the receiver communication system 292 and the receiver controller 294, but may include a scannable code, such as a QR code or the like, which includes a link to the information associated with the receiver 1709. The receiver communication system 292 and the receiver controller 294 may be disposed within the receiver coupler 1890. The receiver coupler 1890 may be composed of a suitable polymer-based material, metal or metal alloy. The receiver 1709 may also include a power source disposed within the receiver coupler 1890 and in communication with the receiver communication system 292 and the receiver controller 294, including, but not limited to a battery. The receiver 1709 may also include an inductive charging pad and/or a power receiver to power the receiver 1709 and/or recharge the power source associated with the receiver 1709.

Figure 59:
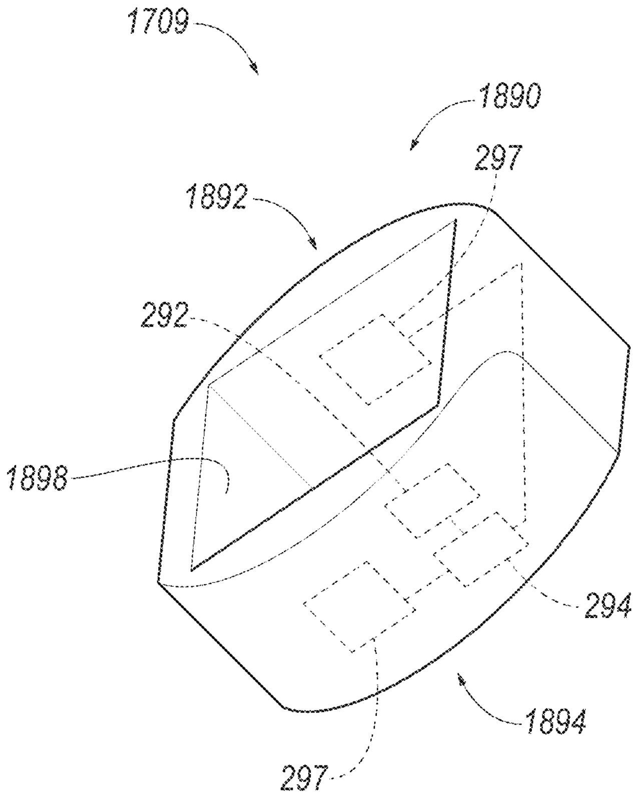
FIG. 59 is a front perspective view of the receiver for use with the drive device system of FIG. 56.

The receiver coupler 1890 is stationary and is coupled to the object. The receiver coupler 1890 includes a first receiver side 1892 opposite a second receiver side 1894, and a receiver bore 1896 is defined through the receiver coupler 1890 so as to be in communication with the and the receiver controller 294. With reference to FIG. 59, the first receiver side 1892 defines a socket 1898, including, but not limited to a square socket. In this example, the first receiver side 1892 is sized and shaped to receive the head 1750 of the drive device system 1702 to couple the drive device system 1702 to the object. As the receiver coupler 1890 is coupled to the object and is stationary, the position of the object is manipulated by the rotation of the object drive connector 1752.

It should be noted that the first receiver side 1892 may comprise other types of receptacles that cooperate with the drive device system 1702 to couple the object to the drive device system 1702, and the use of a socket is merely an example. The socket 1898 may also include the communication terminals 297. The communication terminals 297 may comprise electrical or magnetic contacts, which enable the transfer of power, data, commands, etc. from the receiver 1709 to the controller 124 of the drive device system 1702 via the communication terminals 161 on the head 1750.

With reference to FIG. 58, the second receiver side 1894 is substantially planar or flat to be positioned against the object. The receiver bore 1896 is in communication with the socket 1898 and is defined through the second receiver side 1894 to permit a mechanical fastener, such as a bolt, screw, or the like to be received through the receiver bore 1896 to couple the receiver 1709 to the object. The receptacle 1754 defined in the head 1750 provides clearance for the head of the mechanical fastener when the head 1750 is coupled to the socket 1898.

It should be noted that the controller 124 of the drive device system 1702 may perform the device control system 300 and method 400 discussed herein with regard to the drive device system 102 and may be responsive to inputs or commands received from the remote control system 500 and the method 600 discussed herein with regard to the drive device system 102. The controller 124 of the drive device system 1702 may also be responsive to inputs or commands received from the multiple device control system 1300. In addition, the receiver controller 294 of the receiver 1709 may perform the receiver control system 700 and the method 800 discussed herein with regard to the receiver 109.

It should be noted that the use of the remote control 106 and/or the personal electronic device 108 is merely an example of a system and a method to interact with the drive device system(s) 102, 1702, the sensing device 104 and/or the receiver 109. In this regard, it should be noted that any function performed by the remote control 106 and/or the personal electronic device 108 and their associated controllers 254, 274 may be performed by one or more controllers or processors associated with a machine, such as a robot. Thus, while the description references various human-machine interfaces, in certain examples, one or more of the interface(s) may comprise machine-machine interface(s).

Those skilled in the art will appreciate that various forms of the present disclosure may be practiced in conjunction with any type of object that would benefit from the drive device systems 102, and the use of the drive device systems 102 with the objects discussed herein are merely examples. Further, it should be noted that many alternative or additional functional relationships or physical connections may be present in the present disclosure. In addition, while the figures shown herein depict an example with certain arrangements of elements, additional intervening elements, devices, features, or components may be present in an actual example. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "about" denotes within 10% to account for manufacturing tolerances. In addition, the term "substantially" denotes within 10% to account for manufacturing tolerances.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

The present disclosure may be described herein in terms of functional and/or logical block components and various processing steps. It should be appreciated that such block components may be realized by any number of hardware, software, and/or firmware components configured to perform the specified functions. For example, the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that the present disclosure may be practiced in conjunction with any number of systems, and that the systems described herein are merely examples.

For the sake of brevity, conventional techniques related to signal processing, data transmission, signaling, control, machine learning models, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C." In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical. Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system for manipulating a position of an object, the system comprising:

at least one drive device system, the at least one drive device system comprising:
- a housing;
- an electric motor disposed within the housing;
- a coupler exposed to an exterior portion of the housing;
- a driven coupler recessed within the housing and defined opposite the coupler;
- a drive mechanism coupled to the electric motor;
- a controller disposed within the housing and in communication with the electric motor; and
- a communication system in communication with the controller; and at least one receiver configured to be coupled to the object, the at least one receiver comprising:
- a receiver coupler configured to receive the coupler of the at least one drive device system to manipulate the position of the object; and
- a receiver communication system configured to communicate with the communication system of the at least one drive device system, the receiver communication system configured to communicate data associated with the at least one receiver or the object.

2. The system according to claim 1, further comprising a master controller configured to communicate with the at least one drive device system.

3. The system according to claim 1, wherein the at least one drive device system comprises a wireless power source disposed within the housing and configured to power the electric motor.

4. The system according to claim 3, wherein the wireless power source is selected from the group consisting of a battery, a vibrational generator, a thermal power generator, and a storage component.

5. The system according to claim 1, further comprising a wired power receiver coupled to the electric motor, the wired power receiver configured to receive electrical power from an external power supply.

6. The system according to claim 1, further comprising mechanical latches disposed within the housing of the at least one drive device system, the mechanical latches configured to engage with the receiver coupler.

7. The system according to claim 1, further comprising an induction charging pad disposed proximate an exterior portion of the housing of the at least one drive device system.

8. The system according to claim 1, further comprising at least one second drive device system, the at least one second drive device system comprising:
- a second housing;
- a second coupler exposed to an exterior portion of the second housing; and
- a second drive mechanism extending at least partially into the second coupler, wherein the at least one second drive device system is configured to be coupled to the at least one drive device system.

9. The system according to claim 8, further comprising a plurality of the at least one second drive device system arranged in a stack and configured to be coupled together.

10. The system according to claim 1, wherein the drive mechanism is configured to be operated manually.

11. The system according to claim 1, further comprising a human-machine interface disposed on an exterior surface of the housing, and the human-machine interface is communicatively coupled to the controller.

12. The system according to claim 1, wherein the coupler and the driven coupler each have a non-circular geometry.

13. The system according to claim 1, further comprising at least one illumination system coupled to the housing, the at least one illumination system in communication with the controller.

14. The system according to claim 1, further comprising at least one imaging system coupled to the housing, the at least one imaging system in communication with the controller.

15. The system according to claim 1, further comprising at least one status light coupled to the housing, the at least one status light in communication with the controller.

16. The system according to claim 1, wherein the at least one receiver comprises at least one wheel configured to be coupled to at least one drive device system, wherein the at least one drive device system and the at least one wheel is configured to manipulate the position of the object.

17. The system according to claim 16, wherein the at least one wheel is rotationally mounted to a shaft such that the at least one wheel is configured to swivel.

18. The system according to claim 1, wherein the drive mechanism extends at least partially into the coupler.

19. A system for manipulating a position of an object, the system comprising:

a plurality of drive device systems, with each drive device system comprising:

a housing;

an electric motor disposed within the housing;

a coupler exposed to an exterior portion of the housing;

a drive mechanism coupled to the electric motor;

a controller disposed within the housing and in communication with the electric motor; and a communication system in communication with the controller, the plurality of drive device systems communicatively coupled to each other; and at least one receiver configured to be coupled to the object, the at least one receiver comprising:

a receiver coupler configured to receive the coupler of one of the plurality of drive device systems to manipulate the position of the object; and a receiver communication system configured to communicate with the communication system of the one of the plurality of drive device systems, the receiver communication system configured to communicate data associated with the at least one receiver or the object.

20. A system for manipulating a position of an object, the system comprising:

at least one drive device system, the at least one drive device system comprising:

a housing;

mechanical latches disposed within the housing;

an electric motor disposed within the housing;

a coupler exposed to an exterior portion of the housing, the coupler having a non-circular geometry;

a drive mechanism coupled to the electric motor and the drive mechanism is coupled to the coupler;

a controller disposed within the housing and in communication with the electric motor;

a communication system in communication with the controller; and a human-machine interface coupled to the housing and in communication with the controller; and at least one receiver configured to be coupled to the object, the at least one receiver including a receiver coupler configured to receive at least a portion of the coupler of the at least one drive device system to manipulate the position of the object, and the mechanical latches are configured to engage with the receiver coupler.

* * * * *